US009114530B2

(12) United States Patent
Tsusaka et al.

(10) Patent No.: US 9,114,530 B2
(45) Date of Patent: Aug. 25, 2015

(54) CONTROL DEVICE AND CONTROL METHOD OF ROBOT ARM, ROBOT, CONTROL PROGRAM, AND INTEGRATED ELECTRONIC CIRCUIT

(71) Applicant: PANASONIC INTELLECTUAL PROPERTY MANAGEMENT CO., LTD., Osaka (JP)

(72) Inventors: Yuko Tsusaka, Osaka (JP); Yudai Fudaba, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 89 days.

(21) Appl. No.: 13/951,828

(22) Filed: Jul. 26, 2013

(65) Prior Publication Data

US 2013/0310977 A1    Nov. 21, 2013

Related U.S. Application Data

(63) Continuation of application No. PCT/JP2012/004927, filed on Aug. 2, 2012.

(30) Foreign Application Priority Data

Sep. 6, 2011    (JP) .................................. 2011-193882

(51) Int. Cl.
    B25J 9/16       (2006.01)
    G05B 19/423    (2006.01)
(52) U.S. Cl.
    CPC .............. *B25J 9/163* (2013.01); *B25J 9/1656* (2013.01); *G05B 19/423* (2013.01); *G05B 2219/36442* (2013.01); *G05B 2219/40391* (2013.01)

(58) Field of Classification Search
    CPC ................. G05B 19/00; G05B 19/423; G05B 2219/40144; G05B 19/056; G05B 19/237; G05B 19/416; G05B 2219/36442; G05B 2219/37357; G05B 2219/40391; B25J 3/00; B25J 13/08; B25J 13/084; B25J 9/1656; B25J 9/1694; B25J 9/163
    See application file for complete search history.

(56) References Cited

U.S. PATENT DOCUMENTS 5,046,022 A * 9/1991 Conway et al. ................ 700/250
5,912,540 A * 6/1999 Kosaka et al. ............. 318/568.14

(Continued)

FOREIGN PATENT DOCUMENTS

JP    59-157715    9/1984
JP    6-23682      2/1994

(Continued)

OTHER PUBLICATIONS

International Preliminary Report on Patentability and Written Opinion of the International Searching Authority issued Mar. 20, 2014 in International (PCT) Application No. PCT/JP2012/004927.

(Continued)

*Primary Examiner* — Bao Long T Nguyen
(74) *Attorney, Agent, or Firm* — Wenderoth, Lind & Ponack, L.L.P.

(57) ABSTRACT

A robot arm system for controlling a motion of a robot arm includes an order determining section for determining an order of teaching information based on at least one or more pieces of perceptual information about circumference environment of the robot arm used by a person to operate the robot arm and change the motion of the robot arm that is sensed by the person, reaction time information as time information from a time when the person receives the perceptual information to a time when the person operates robot arm, and dispersion information about a dispersion level between at least one or more pieces of the teaching information or the perceptual information, and creates motion information about the robot arm based on the teaching information and the order determined by the order determining section.

17 Claims, 46 Drawing Sheets

(56) References Cited

U.S. PATENT DOCUMENTS

| | | | |
|---|---|---|---|
| 6,292,712 B1* | 9/2001 | Bullen | 700/245 |
| 6,327,518 B1* | 12/2001 | Kaneko et al. | 700/245 |
| 6,430,472 B1* | 8/2002 | Boillot et al. | 700/245 |
| 6,714,840 B2* | 3/2004 | Sakaue et al. | 700/245 |
| 6,895,305 B2* | 5/2005 | Lathan et al. | 700/245 |
| 7,127,325 B2* | 10/2006 | Nagata et al. | 700/245 |
| 8,326,456 B2* | 12/2012 | Sakata et al. | 700/245 |
| 2009/0055019 A1* | 2/2009 | Stiehl et al. | 700/249 |
| 2011/0160910 A1* | 6/2011 | Preisinger et al. | 700/275 |
| 2011/0190932 A1 | 8/2011 | Tsusaka et al. | |
| 2011/0190938 A1* | 8/2011 | Ekelund et al. | 700/264 |
| 2014/0172143 A1* | 6/2014 | Fudaba et al. | 700/108 |

FOREIGN PATENT DOCUMENTS

| | | |
|---|---|---|
| JP | 06-337711 | 12/1994 |
| JP | 2003-081598 | 3/2003 |
| JP | 2003-275975 | 9/2003 |
| JP | 2003-281287 | 10/2003 |
| JP | 4759660 | 8/2011 |

OTHER PUBLICATIONS

International Search Report mailed Nov. 6, 2012 in International (PCT) Application No. PCT/JP2012/004927.

Kenta Tanaka et al., "Desired Trajectory and Sensory Feedback Control Law Synthesis for an Origami-Folding Robot Based on the Statistical Feature of Direct Teaching by a Human", Journal of the Robotics Society of Japan, Jul. 2009, vol. 27, No. 6, pp. 685-695, with an English abstract.

* cited by examiner

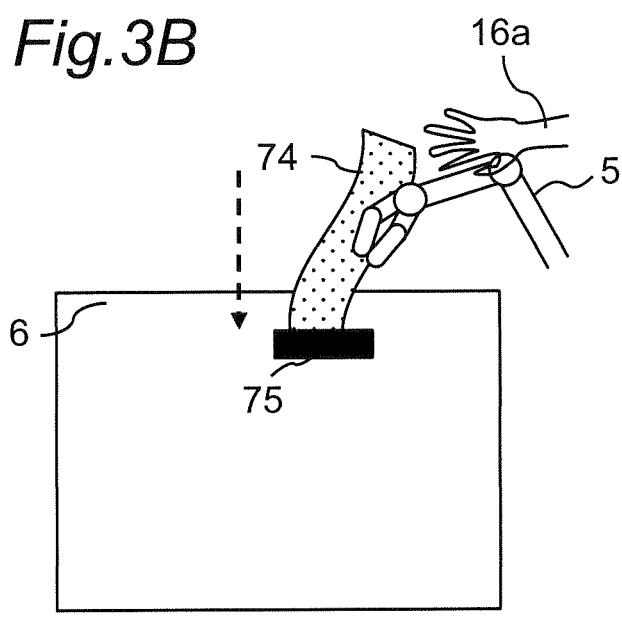

Fig. 10

| TASK ID | MOTION ID | POSITION AND ORIENTATION (m) (x, y z, $\phi$, $\theta$, $\psi$) | TIME (sec) | USER ID | DATE AND HOUR | SKILL LEVEL (P) |
|---|---|---|---|---|---|---|
| 1 | 1 | 0.1,0.1,0,0,0,0 | 0.37 | 1 | 2010/4/14 9:00 | 0.00107 |
| 1 | 2 | 0.1,0.2,0,0,0,0 | 0.2 | 1 | 2010/4/14 9:00 | 0.00107 |
| : | : | : | : | : | : | : |
| 1 | 8 | 0.2,0.1,0,0,0,0 | 0.37 | 1 | 2010/4/14 9:00 | 0.00107 |
| : | : | : | : | : | : | : |
| 2 | 1 | 0.1,0.1,0.4,0,0,0 | 0.3 | 2 | 2010/4/15 13:15 | 0.00173 |
| : | : | : | : | : | : | : |
| 2 | 8 | 0.2,0.2,0.4,0,0,0 | 0.15 | 2 | 2010/4/15 13:15 | 0.00173 |
| : | : | : | : | : | : | : |

Fig.11A

| ENVIRONMENT ID | TASK ID | MOTION ID | FORCE (N) (fx,fy,fz, fφ,fθ,fψ) | OBJECT POSITION (m) | SOUND VOLUME (dB) | ENVIRONMENT TYPE FLAG (32 bits) |
|---|---|---|---|---|---|---|
| 1 | 1 | 1 | 0,0,5,0,0,0 | | 1 | 0 TO 5 BITS:1 REMAIN:0 |
| : | : | | : | | | |
| 7 | 1 | 7 | : | | 1 | 0 TO 5 BITS:1 REMAIN:0 |
| 8 | 1 | 8 | 2,3,5,3,3,3 | | 1 | 0 TO 5 BITS:1 REMAIN:0 |
| : | : | | : | | | |
| 20 | 2 | 1 | : | | 2 | |
| : | : | | : | | | |
| 30 | 2 | 7 | 4,1,5,0,3,6 | | 2 | |
| 31 | 2 | 8 | 4,1,8,0,3,6 | | ∘ ∘ | |

Fig.11B

| | fx | fy | fz | fφ | fθ | fψ | - | v | 8 | 9 | 10 | 11 | 12 | 13 | 14 | 15 | 16 | 17 | 18 | ... | 31 |
|---|---|---|---|---|---|---|---|---|---|---|---|---|---|---|---|---|---|---|---|---|---|
| NUMBER OF BITS | 0 | 1 | 2 | 3 | 4 | 5 | 6 | 7 | 8 | 9 | 10 | 11 | 12 | 13 | 14 | 15 | 16 | 17 | 18 | ... | 31 |
| VALUE | 0 | 0 | 0 | 0 | 0 | 0 | 1 | 0 | 0 | 0 | 0 | 0 | 0 | 0 | 0 | 0 | 0 | 0 | 0 | ... | 0 | fx, fy, fz, fφ, fθ, fψ: FORCE
-: OBJECT POSITION
v: SOUND VOLUME
8–31: UNUSED

Fig.22

| TASK ID | MOTION ID | POSITION ORIENTATION (m) (x, y z, $\phi$, $\theta$, $\psi$) | TIME (sec) | PRESENCE/NON-PRESENCE OF SECTION DESIRED VALUE | USER ID | DATE AND HOUR | SKILL LEVEL (P) |
|---|---|---|---|---|---|---|---|
| 1 | 1 | 0.1,0.1,0,0,0,0 | 0.37 | 0 | 1 | 2010/4/14 9:00 | 0.0010 |
| 1 | 2 | 0.1,0.2,0,0,0,0 | 0.2 | 1 | 1 | 2010/4/14 9:00 | 0.0018 |
| : | : | : | : | | : | : | : |
| 1 | 8 | 0.2,0.1,0,0,0,0 | 0.37 | 1 | 1 | 2010/4/14 9:00 | 0.0057 |
| : | : | : | : | | : | : | : |
| 2 | 1 | 0.1,0.1,0.4,0,0,0 | 0.3 | 0 | 2 | 2010/4/15 13:15 | 0.0033 |
| : | : | : | : | | : | : | : |
| 2 | 8 | 0.2,0.2,0.4,0,0,0 | 0.15 | 1 | 2 | 2010/4/15 13:15 | 0.0041 |
| : | : | : | : | | : | : | : |

TASK USING EYES, EARS, AND FORCE

TASK USING ONLY FORCE

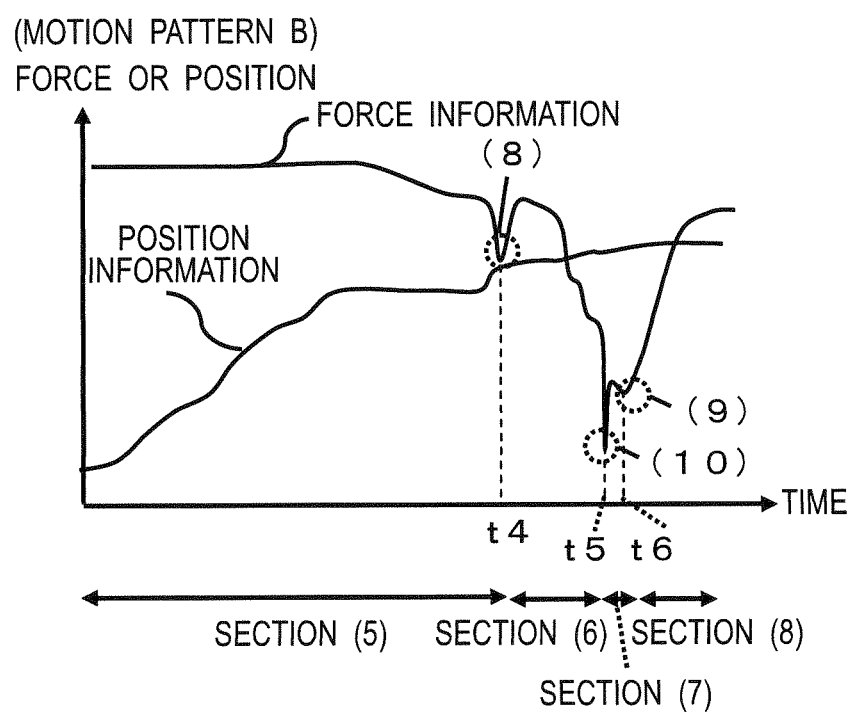

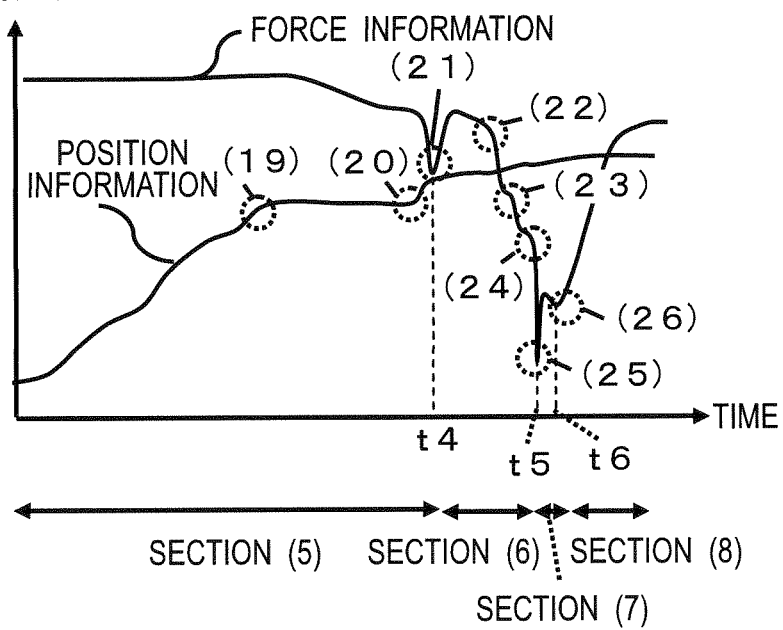

Fig.31

| | | SECTION (1) OR SECTION (5) | SECTION (2) OR SECTION (6) | SECTION (3) OR SECTION (7) | SECTION (4) OR SECTION (8) |
|---|---|---|---|---|---|
| DISPERSION LEVEL | MOTION PATTERN A | 9.892 | 2.0 | 1.91 | 1.7 |
| | MOTION PATTERN B | 3.01 | 3.5 | 1.6 | 1.5 |
| REACTION TIME (msec) | MOTION PATTERN A | -1 | 350 | 280 | -1 |
| | MOTION PATTERN B | -1 | 410 | 80 | -1 |
| NUMBER OF USED ENVIRONMENTAL INFORMATION | MOTION PATTERN A | 3 | 3 | 3 | 3 |
| | MOTION PATTERN B | 1 | 1 | 1 | 1 |
| SKILL LEVEL | MOTION PATTERN A | 0.0010 | 0.0018 | 0.0021 | 0.0057 |
| | MOTION PATTERN B | 0.0033 | 0.0013 | 0.0041 | 0.0066 |
| ORDER | | MOTION PATTERN B | MOTION PATTERN A | MOTION PATTERN B | MOTION PATTERN B |

(3) IN FIG. 34A AND
(5) IN FIG. 34B (4) IN FIG. 34A AND
(6) IN FIG. 34B

CONTROL DEVICE AND CONTROL METHOD OF ROBOT ARM, ROBOT, CONTROL PROGRAM, AND INTEGRATED ELECTRONIC CIRCUIT

CROSS-REFERENCE TO RELATED APPLICATIONS

This is a continuation application of International Application No. PCT/JP2012/004927, with an international filing date of Aug. 2, 2012, which claims priority of Japanese Patent Application No.: 2011-193882 filed on Sep. 6, 2011, the content of which is incorporated herein by reference.

TECHNICAL FIELD

The technical field relates to a control device and control method of a robot arm, a robot having the control device of a robot arm, a control program of a robot arm, and an integrated electronic circuit, which are used for creating and teaching information about motions of the robot.

BACKGROUND ART

In recent years, robots for home use such as care robots or housetask support robots are being developed actively. Since robots for home use, which are different from industrial robots, are operated by people who are not trained in robots for home use, motions should be simply taught. Further, since a motion environment in which the robots do tasks varies according to individual homes, the robots should flexibly cope with a wide variety of home environments.

Further, model changes at manufacturing sites have been frequently observed in order to realize small lot production in great varieties. For this reason, a number of factories introduce cell production system, and tasks are done by manpower. Particularly tasks that treat flexible objects such as tasks for inserting flexible substrates are complicated and thus it is difficult for robots to automatize the tasks. It is significant that tasks in factories and domestic tasks and care tasks, which are done mainly by manpower at present, are supported by robots as the population ages and fewer babies are born and taskforce reduces in the future. Therefore, in order to realize robots that support manpower tasks, it is necessary that robots are easily operated by untrained people and flexibly move in a wide variety of environmental fluctuations.

As a system for teaching the motions of robots, a teaching system that uses a teaching pendant or programing is provided for industrial use. However, it is difficult for people who are not trained in domestic robots to operate such a system. Further, it is difficult to teach a task for moving while feeding back a contact force, such as insertion of a flexible substrate in order to cope with environmental fluctuation. On the other hand, a direct teaching system for directly holding a robot arm to operate is provided (see Japanese Unexamined Patent Publication No. 59-157715). This system enables the motions of a robot to be directly created only by means of induction of a robot arm to a desired direction, and the system that is very effective in view of an intuitive operation.

On the other hand, in order to move a robot in a wide variety of environments, a system for creating teaching data for basic tasks and creating teaching data for increasing/decreasing or combining (editing) the basic workpieces when an environment fluctuates is present (see Japanese Unexamined Patent Publication No. 06-337711). Further, a sensory feedback system for correcting a motion trajectory through a feedback signal from a force sensor and simultaneously moving a robot arm is provided (see Japanese Unexamined Patent Publication No. 06-023682). In this system, when burr is removed by a robot, a measured value of the force sensor is measured and a burr generating state is observed so that the motion of the robot can be corrected according to the condition of the burr. Further, a system, with which a person directly holds a robot arm and laws of sensory feedback performed by the person at a time of a task is extracted, is provided (see "Desired Trajectory and Sensory Feedback Control Law Synthesis for an Origami-Folding Robot based on the Statistical Feature of Direct Teaching by a Human" written by Kenta Tanaka, Robotics Society of Japan, Vol. 27 No. 6 (P. 685 to P. 695) July, 2009)(hereinafter, this literature is called as "K. Tanaka's Literature"). In both Japanese Unexamined Patent Publication No. 06-023682 and K. Tanaka's Literature stated above, desired environmental conditions are sensed and a motion is made while feedback is being performed, thereby making it possible to flexibly coping with an environmental fluctuation.

Further, a system for evaluating a person's skilled technique is provided (see Japanese Unexamined Patent Publication No. 2003-281287).

SUMMARY OF THE INVENTION

However, in Japanese Unexamined Patent Publication No. 59-157715, untrained people can operate robots, but cannot adapt to tasks in an environment that fluctuates during the motion such as a task for inserting flexible substrates in factories. Japanese Unexamined Patent Publication No. 06-337711 can adapt to environmental fluctuation by means of increase, reduction, and combination of basic workpieces, but cannot adapt to tasks in an environment that fluctuates during the motion such as a task for inserting flexible substrates in factories. Japanese Unexamined Patent Publication No. 06-023682 can adapt to tasks in an environment that fluctuates during the motion, but since this is a teaching system using a teaching pendant or programming, it is difficult to do programming that adapts to an environmental fluctuation which is difficult to be formulated in the case of flexible substrates and the like. It is difficult for people who are untrained in robots to do even tasks that enable programming in the programming system. In K. Tanaka's Literature, since human sensory feedback laws are extracted through an intuitive operation, a simple operation can be performed, and this can adopt to tasks in an environment that fluctuates during the motion. However, people are trained by repeating the same tasks at many times while feedback from an environment being performed. When trained, people make a prediction from training experiences and can do tasks without feedback from an environment. For example, when flexible substrates are inserted, people recognize how the flexible substrates contact with insertion slots of connectors through eyes or force, and change an insertion direction or a force level so as to do the tasks. However, when trained, people can do the tasks without sensing the force. For this reason, since people do not give sensory feedback, it is difficult for the system of K. Tanaka's Literature stated above to extract the sensory feedback.

Untrained people teaches while applying a force to flexible substrates and sensing how the substrates bend with their hands, but trained people can predict the force to be applied that bends flexible substrates from their experiences. As being trained, people move a robot arm before their hands sense the force at the time when the flexible substrates bend.

FIG. 34A and FIG. 34B are graphs where the force to be applied to a flexible substrate is plotted when direct teaching is done for the task for inserting the flexible substrate by using direct teaching. The force to be applied to the flexible substrate is detected by an object force detecting section. A person senses the force applied to a flexible substrate via a held robot arm with its hand at teaching, and moves the robot arm according to the force sensed by the hand so as to do the insertion task (sensory feedback). FIG. 34A is data about an untrained person and the graph when a person performs the operation while sensing a force. FIG. 34B is data about a trained person and the graph when the person performs the operation depending on a prediction without sensing a force during a certain section. Further, FIG. 34C, FIG. 34D, and FIG. 34E illustrate conditions in which the flexible substrate is being inserted using the robot arm.

(3) of FIG. 34A and (5) of FIG. 34B illustrate places that touch an inner surface of an insertion slot at completion of insertion in a flexible substrate inserting task (state of FIG. 34D). (4) of FIG. 34A is a place where a person senses the force of (3) in FIG. 34A and the force is released (state of FIG. 34E). In general, as to the reaction time, it is known that it takes 200 milliseconds for people to take action after receiving sense stimuli (see "Virtual Reality Studies" The Virtual Reality Society of Japan version, P. 97, supervising-edited by Susumu Tate and Makoto Sato and Michitaka Hirose, issued by Kogyo Chosakai Publishing Co., Ltd.).

In this example, the reaction time from reception of sense stimuli in (3) of FIG. 34A to taking action in (4) of FIG. 34A is 206 milliseconds as shown in (1) of FIG. 34A. On the other hand, (6) of FIG. 34B is similarly a place where the force is released, but a reaction time (2) from (5) of FIG. 34B to (6) of FIG. 34B is 84 milliseconds that is short. In general, since the reaction time is 200 milliseconds, (6) of FIG. 34B is a place where a person takes action before sensing the force in (5) of FIG. 34B.

Further, in Japanese Unexamined Patent Publication No. 2003-281287, based on evaluations of techniques of skilled people a database is made, but motions of a robot arm is not created by using the techniques of skilled people in the database. In order to allow people's technical motions to be automatically made using the robot arm, an environmental fluctuation is sensed, and a motion to be made for the environmental fluctuation should be extracted as a feedback law. Further, after a range of movement and controlled performance of the robot arm and a sensor to be arranged are taken into consideration, the motions should be created.

Accordingly, when trained, people make motions depending on not sensory feedback but prediction, and thus people's teaching data is obtained by direct teaching so that the people's feedback laws cannot be extracted unlike Non-Patent Document 1. That is to say, since the system in K. Tanaka's Literature does not enable the feedback laws to be extracted, this cannot cope with a fluctuation of a peripheral environment during the motions, and thus the motions are not created flexibly according to the environmental fluctuation.

Therefore, one non-limiting and exemplary embodiment provides a control device and a control method of a robot arm, a robot, a control program, and an integrated electronic circuit that enables people to easily teach motions of the robot arm and can create motions flexibly to environmental fluctuation.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature: a control device of a robot arm for controlling a motion of the robot arm, comprising:

a first information obtaining section that obtains a plurality of pieces of time-series teaching information at a time when a person operates the robot arm and teaches a motion;

a second information obtaining section that obtains (i) reaction time information and (ii) dispersion information at the time of teaching the robot arm;

an order determining section that determines an order of the plurality of pieces of teaching information obtained by the first information obtaining section based on the reaction time information and the dispersion information obtained by the second information obtaining section; and a motion creating section that creates motion information as information about the motion of the robot arm based on the plurality of pieces of teaching information and the order, wherein the time-series teaching information includes at least one or more of a position, an orientation, and a speed of the robot arm, the reaction time information is time information from a time when the person receives perceptual information to a time when the person operates the robot arm, the perceptual information being at least one of information about a force applied from the robot arm to a target object for a task by the robot arm, information about a position of the target object for the task by the robot arm, and sound information of a circumference environment, the dispersion information is information about a dispersion level in chronological order between at least one or more pieces of the teaching information in chronological order and the perceptual information in chronological order, and the motion of the robot arm is controlled based on the motion information created by the motion creating section.

These general and specific aspects may be implemented using a system, a method, an integrated electronic circuit, a computer program, a computer readable recording medium in which a program is recorded, and any combination of a control device, a system, a method, an integrated electronic circuit, a computer program, and a computer-readable recording medium in which the program is recorded.

With the control device and the control method of the robot arm, the robot, the control program of the robot arm and an integrated electronic circuit, people can easily teach motions of the robot arm, and can create motions flexible to environmental fluctuation.

BRIEF DESCRIPTION OF THE DRAWINGS

These and other aspects and features of the present disclosure will be apparent from the following description related to embodiments taken in conjunction with the accompanying drawings, in which:

FIG. 3B is a view describing the motion for teaching insertion of the flexible substrate according to the first embodiment of the present invention;

FIG. 3C is a view describing the motion for teaching insertion of the flexible substrate according to the first embodiment of the present invention;

FIG. 10 is a view describing a list of teaching information about a teaching information database according to the first embodiment of the present invention;

FIG. 11A is a view describing a list of environment information of an environment information database according to the first embodiment of the present invention;

FIG. 11B is a view describing environment type flags in the environment information database according to the first embodiment of the present invention;

FIG. 22 is a view describing a list of the teaching information of the teaching information database according to the second embodiment of the present invention;

FIG. 28B is a graph illustrating the relationship between the position, the force, the object position, and the sound volume at the time teaching by a person according to the second embodiment of the present invention;

FIG. 30B is a graph illustrating the relationship between the position, the force, the object position, and the sound volume at the time teaching by a person according to the second embodiment of the present invention;

FIG. 31 is a view illustrating a dispersion level dispatched by a dispersion level detecting section, a reaction time detected by a reaction time detecting section, and an order determined by an order determining section according to the second embodiment of the present invention;

DETAILED DESCRIPTION

Figure 1:
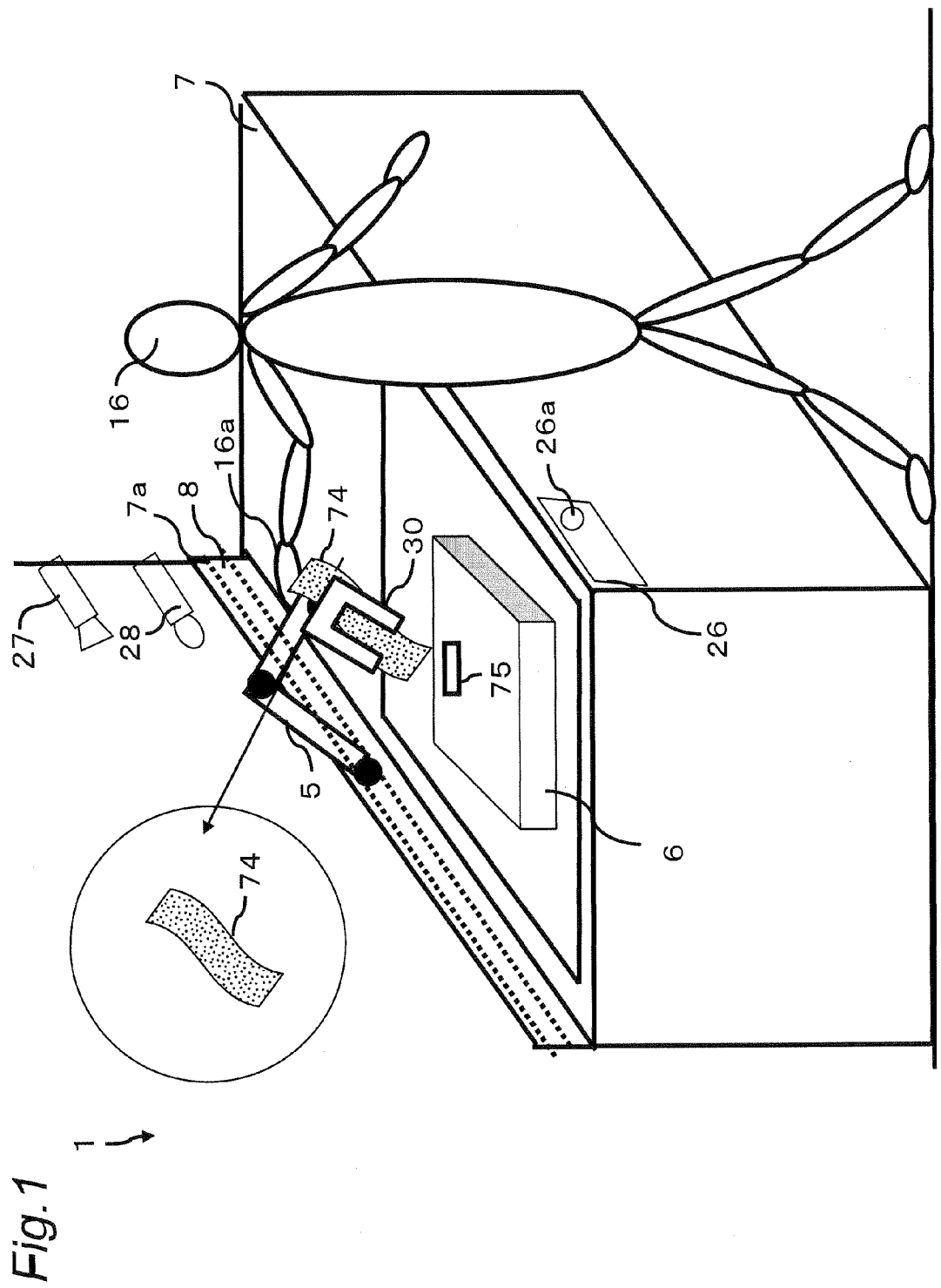
FIG. 1 is a view illustrating an outline of a configuration of a robot according to a first embodiment of the present invention.

Before continuing to describe the present invention, like parts in the accompanying drawings are designated by like reference symbols.

The embodiments of the present invention are described in detail below with reference to the accompanying drawings.

Before detailed description of the embodiments of the present invention with reference to the drawings, various aspects of the present invention are described below.

Examples of the disclosed technique are as follows.

According to a first aspect of the present invention, there is provided a control device of a robot arm for controlling a motion of the robot arm, comprising:

a first information obtaining section that obtains a plurality of pieces of time-series teaching information at a time when a person operates the robot arm and teaches a motion;

a second information obtaining section that obtains (i) reaction time information and (ii) dispersion information at the time of teaching the robot arm;

an order determining section that determines an order of the plurality of pieces of teaching information obtained by the first information obtaining section based on the reaction time information and the dispersion information obtained by the second information obtaining section; and a motion creating section that creates motion information as information about the motion of the robot arm based on the plurality of pieces of teaching information and the order, wherein the time-series teaching information includes at least one or more of a position, an orientation, and a speed of the robot arm, the reaction time information is time information from a time when the person receives perceptual information to a time when the person operates the robot arm, the perceptual information being at least one of information about a force applied from the robot arm to a target object for a task by the robot arm, information about a position of the target object for the task by the robot arm, and sound information of a circumference environment, the dispersion information is information about a dispersion level in chronological order between at least one or more pieces of the teaching information in chronological order and the perceptual information in chronological order, and the motion of the robot arm is controlled based on the motion information created by the motion creating section.

In this configuration, when teaching information is ranked, motion information can be created based on teaching information with the highest skill level, for example. Further, a person can easily teach motions of a robot arm and motions that are flexible to environmental fluctuation can be created.

According to a second aspect of the present invention, there is provided the control device of the robot arm according to the first aspect, wherein the perceptual information is obtained by the second information obtaining section, the dispersion level is levels of fluctuations in chronological order in respective directions as to the teaching information about the position or the orientation of the robot arm, or the perceptual information about the force information, or the position information about the object, or the sound information obtained by the second information obtaining section.

According to the aspect, when a position or an orientation of the robot arm at a time of teaching by a person, force information, or a fluctuation level of position information about an object or sound information at a time when the object contacts that is a dispersion level is obtained so that teaching information is ranked, motion information can be created based on teaching information with highest skill level, for example. Further, a person can easily teach motions of a robot arm and motions that are flexible to environmental fluctuation can be created.

According to a third aspect of the present invention, there is provided the control device of the robot arm according to the first or second aspect, wherein the perceptual information is obtained by the second information obtaining section, the control device further comprising:

a dispersion level calculating section that calculates dispersion levels in chronological order as information about the dispersion levels between the teaching information obtained by the first information obtaining section and the perceptual information obtained by the second information obtaining section, wherein the dispersion levels calculated by the dispersion level calculating section is obtained as the dispersion information by the second information obtaining section.

According to the aspect, when the position or the orientation of the robot arm at a time of teaching by the person, the force information, a fluctuation level of the position information of an object or the sound information at the time when the object contacts that is a dispersion level is calculated so that teaching information is ranked, motion information can be created based on teaching information with the highest skill level, for example. Further, a person can easily teach motions of a robot arm and motions that are flexible to environmental fluctuation can be created.

According to a fourth aspect of the present invention, there is provided the control device of the robot arm according to any one of the first to third aspects, wherein the perceptual information is obtained by the second information obtaining section, the control device further comprising:

a perceptual information presenting section that presents only information minimum needed to complete the operation in the information obtained by the second information obtaining section as a force, a position of the object or a sound volume at a time when the person operates the robot arm, wherein the perceptual information in the information obtained by the second information obtaining section is information whose type is same as the perceptual information presented by the perceptual information presenting section.

This configuration can limit information that is presented to the person.

According to a fifth aspect of the present invention, there is provided the control device of the robot arm according to any one of the first to fourth aspects, wherein the perceptual information is obtained by the second information obtaining section, the order determining section determines teaching information using less pieces of the perceptual information in the plurality of pieces of teaching information as information with higher priority.

With this configuration, the teaching information that is taught by the person can be ranked.

According to a sixth aspect of the present invention, there is provided the control device of the robot arm according to any one of the first to fourth aspects, wherein the order determining section determines teaching information based on the information about a shorter reaction time in the plurality of pieces of teaching information as information with higher priority.

With this configuration, the teaching information that is taught by the person can be ranked.

According to a seventh aspect of the present invention, there is provided the control device of the robot arm according to any one of the first to fourth aspects, wherein the perceptual information is obtained by the second information obtaining section, the control device further comprising:

a reaction time calculating section that adds the reaction times for each perceptual information and calculates total reaction time information, wherein the order determining section determines the teaching information where the total reaction time information calculated by the reaction time calculating section in the plurality of pieces of teaching information is larger as information with higher priority.

With this configuration, the teaching information that is taught by the person can be ranked.

According to an eighth aspect of the present invention, there is provided the control device of the robot arm according to any one of the first to fourth aspects, wherein the order determining section determines teaching information where the dispersion level is smaller in the plurality of pieces of teaching information as information with higher priority.

With this configuration, the teaching information that is taught by the person can be ranked.

According to a ninth aspect of the present invention, there is provided the control device of the robot arm according to any one of the first to eighth aspects, further comprising: a determining section that determines whether the robot arm normally moves based on the motion information created by the motion creating section, wherein when the determining section determines that the normal motion is not made based on the motion information, the motion creating section creates motion information as the information about the motion of the robot arm based on teaching information different from the teaching information.

According to a tenth aspect of the present invention, there is provided the control device of the robot arm according to the ninth aspect, wherein the motion creating section creates motion information as information about the motion of the robot arm based on the teaching information with highest priority in the plurality of pieces of teaching information, when the determining section determines that the motion is not normally made based on the motion information, the motion creating section creates motion information as the information about the motion of the robot arm based on teaching information with second highest priority.

With this configuration, motion information about the robot arm that is adaptable to environmental fluctuation can be created.

According to an 11th aspect of the present invention, there is provided the control device of the robot arm according to the ninth aspect, wherein the motion creating section determines motion information that should be corrected based on the order, the control device further comprising:

a control law extracting section that extracts control law information as information for controlling the motion based on the motion information; and an order rearranging section that, when the determining section determines that the motion is not normally made based on the motion information, rearranges the control law into a control law of second highest priority, wherein the motion creating section corrects the motion information according to the control law rearranged by the order rearranging section and creates the motion information.

With this configuration, motion information about the robot arm that is adaptable to environmental fluctuation can be created.

According to a 12th aspect of the present invention, there is provided the control device of the robot arm according to the ninth aspect, wherein the order determining section respectively weights the reaction time information and the dispersion information, and determines the order of the plurality of pieces of teaching information.

With this configuration, motion information about the robot arm that is adaptable to environmental fluctuation can be created.

According to a 13th aspect of the present invention, there is provided the control device of the robot arm according to any one of the first to 12th aspects, further comprising: a section desired value setting section that sets a plurality of section desired values as end time points of a plurality of sections obtained by dividing the motion information, wherein the order determining section determines the order of the teaching information at the sections of up to the section desired values set by the section desired value setting section, the motion creating section creates the motion information at the respective sections based on the teaching information with highest priority.

With this configuration, motion information about the robot arm that is adaptable to environmental fluctuation can be created.

According to a 14th aspect of the present invention, there is provided a robot, comprising:

the robot arm; and the control device of the robot arm that controls the robot arm, according to any one of the first to 13th aspects.

In this configuration, when teaching information is ranked, motion information can be created based on teaching information with the highest skill level, for example.

According to a 15th aspect of the present invention, there is provided a control method of a robot arm for controlling a motion of the robot arm, comprising:

obtaining a plurality of pieces of time-series teaching information at a time when a person operates the robot arm and teaches a motion, by a first information obtaining section;

obtaining (i) reaction time information and (ii) dispersion information at the time of teaching the robot arm, by a second information obtaining section;

determining an order of the plurality of pieces of teaching information obtained by the first information obtaining section based on the reaction time information and the dispersion information obtained by the second information obtaining section, by an order determining section, the time-series teaching information including at least one or more of a position, an orientation, and a speed of the robot arm, the reaction time information being time information from a time when the person receives perceptual information to a time when the person operates the robot arm, the perceptual information being at least one of information about a force applied from the robot arm to a target object for a task done by the robot arm, information about a position of the target object for the task done by the robot arm, and sound information of a circumference environment, the dispersion information being information about dispersion levels in chronological order between at least one or more pieces of the teaching information in chronological order or the perceptual information in chronological order;

creating motion information as information about the motion of the robot arm based on the plurality of pieces of teaching information and the order, by a motion creating section; and controlling the motion of the robot arm based on the motion information created by the motion creating section.

In this configuration, when teaching information is ranked, motion information can be created based on teaching information with the highest skill level, for example. Further, the person can easily teach motions of the robot arm and motions that are flexible to environmental fluctuation can be created.

According to a 16th aspect of the present invention, there is provided a computer-readable recording medium including a control program of a robot arm for controlling a motion of the robot arm, the program allowing a computer to execute:

a step of obtaining a plurality of pieces of time-series teaching information at a time when a person operates the robot arm and teaches a motion, by a first information obtaining section;

a step of obtaining (i) reaction time information and (ii) dispersion information at the time of teaching the robot arm, by a second information obtaining section;

a step of determining an order of the plurality of pieces of teaching information obtained by the first information obtaining section based on the reaction time information and the dispersion information obtained by the second information obtaining section, by an order determining section, the time-series teaching information including at least one or more of a position, an orientation, and a speed of the robot arm, the reaction time information being time information from a time when the person receives perceptual information to a time when the person operates the robot arm, the perceptual information being at least one of information about a force applied from the robot arm to a target object for a task by the robot arm, information about a position of the target object for the task by the robot arm, and sound information of a circumference environment, the dispersion information being information about dispersion levels in chronological order between at least one or more pieces of the teaching information in chronological order or the perceptual information in chronological order;

a step of creating motion information as information about the motion of the robot arm based on the plurality of pieces of teaching information and the order, by a motion creating section; and a step of controlling the motion of the robot arm based on the motion information created by the motion creating section.

In this configuration, when teaching information is ranked, motion information can be created based on teaching information with the highest skill level, for example. Further, the person can easily teach motions of the robot arm and motions that are flexible to environmental fluctuation can be created.

According to a 17th aspect of the present invention, there is provided an integrated electronic circuit of a robot arm for controlling a motion of the robot arm, comprising:

a first information obtaining section that obtains a plurality of pieces of time-series teaching information at a time when a person operates the robot arm and teaches a motion;

a second information obtaining section that obtains (i) reaction time information and (ii) dispersion information at the time of teaching the robot arm;

an order determining section that determines an order of the plurality of pieces of teaching information obtained by the first information obtaining section based on the reaction time information and the dispersion information obtained by the second information obtaining section; and a motion creating section that creates motion information as information about the motion of the robot arm based on the plurality of pieces of teaching information and the order, wherein the time-series teaching information includes at least one or more of a position, an orientation, and a speed of the robot arm, the reaction time information is time information from a time when the person receives perceptual information to a time when the person operates the robot arm, the perceptual information is at least one piece of information about a force applied from the robot arm to a target object for a task done by the robot arm, information about a position of the target object for the task done by the robot arm, and sound information of a circumference environment, the dispersion information is information about dispersion levels in chronological order between at least one or more pieces of the teaching information in chronological order or the perceptual information in chronological order, and the motion of the robot arm is controlled based on the motion information created by the motion creating section.

In this configuration, when teaching information is ranked, motion information can be created based on teaching information with the highest skill level, for example. Further, the person can easily teach motions of the robot arm and motions that are flexible to environmental fluctuation can be created.

Embodiments of the present invention are described below with reference to the drawings.

First Embodiment

A configuration of a robot system (robot) 1 according to the first embodiment of the present invention will be described.

As shown in FIG. 1, a case where an end of a flexible substrate 74 is inserted to be mounted to an insertion slot 75 of a connector of a printed board for a device 6 such as a television, a DVD recorder, or a mobile telephone in cell production in factories is described as an example. The connector is one example of a target object for a task (for example, an insertion task) to be done by the robot arm 5, and the flexible substrate 74 is one example of a component held by the robot arm 5.

The robot arm 5 of the robot system 1 is mounted to a wall surface 7a of a task bench 7, a base end of the robot arm 5 is movably supported to a rail 8 fixed to the wall surface 7a, and the robot arm 5 can move on the rail 8 to a lateral direction such as a horizontal direction along the rail 8 by a force of a person 16.

A side surface of the task bench 7 has a data input IF 26 such as an operation panel 26 where a button 26a and the like is arranged.

A hand 30 for holding the flexible substrate 74 is mounted to a tip end of the robot arm 5.

An image capturing device 27 such as a camera is arranged on the side surface of the task bench 7, and images the flexible substrate 74 and the insertion slot 75.

A sound collecting device 28 such as a microphone is arranged on the side surface of the task bench 7, and measures a sound volume near the insertion slot 75.

The robot system 1 is a robot for doing the task for inserting the flexible substrate 74 into the insertion slot 75 of the device 6.

A summary of an operating procedure of the robot system 1 will be described first. A configuration of the robot system 1 will be described in detail later.

Figure 2:
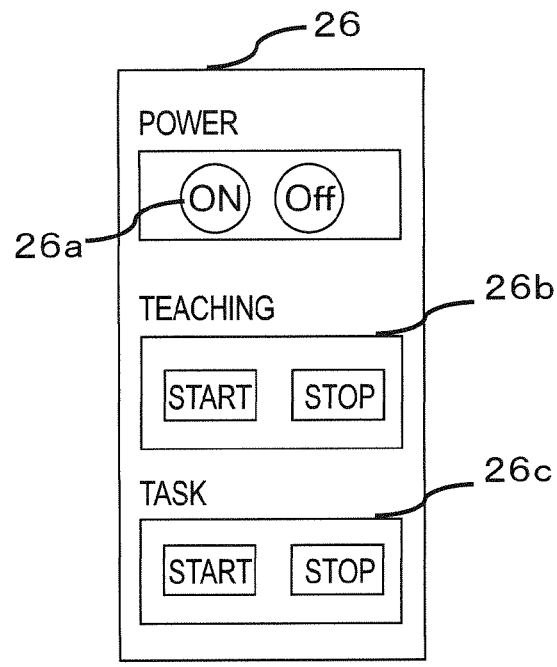
FIG. 2 is a view describing a data input IF of a peripheral device according to the first embodiment of the present invention.

The person 16 powers on through input (for example, the power button 26a of the operation panel 26 in FIG. 2 is pressed into "ON") into an motion switching section 23 from the data input IF 26 arranged on the side surface of the task bench 7.

The robot system 1 is operated in a manner that a hand 16a of the person 16 presses input (for example, the teaching start button of a teaching switch 26b on the operation panel 26 in FIG. 2) into the motion switching section 23 from the data input IF 26 arranged on the side surface of the task bench 7. As a result, a teaching mode is set by the motion switching section 23, described later, and the robot arm 5 moves based on the force applied by the person 16 so that the motions of the robot arm 5 is taught. Concretely, as shown in FIG. 3A to FIG. 3D, the person 16 operates the robot arm 5 while holding the robot arm 5 with the hand 16a, and teaches the robot arm 5 to insert the flexible substrate 74 into the insertion slot 75.

The taught teaching information and information about the circumference environment are stored in a teaching information database 17A and an environmental information (perceptual information) database 18 via an motion creating section 13, described later. Further, when the teaching information and the information about the circumference environment are obtained by the teaching information obtaining section (first information obtaining section) 98 and the information obtaining section (second information obtaining section) 97, the teaching information obtaining section 98 obtains chronologically a plurality of pieces of information such as information at a time when the person 16 is inexperienced in the teaching task and information at a time of being skilled in the teaching task (for example, information at an inexperienced time and information at a skilled time).

The motion creating section 13, described later, creates motion information about the robot arm 5 using the information at the inexperienced time and the information at the skilled time. The person 16 presses the data input IF 26 (for example, the start button or the like of the task switch 26c on the operation panel 26 in FIG. 2) arranged on the side surface of the task bench 7 with the hand 16a of the person 16, so that the robot system 1 operates to start the motion generated by the motion creating section 13.

Figure 4:
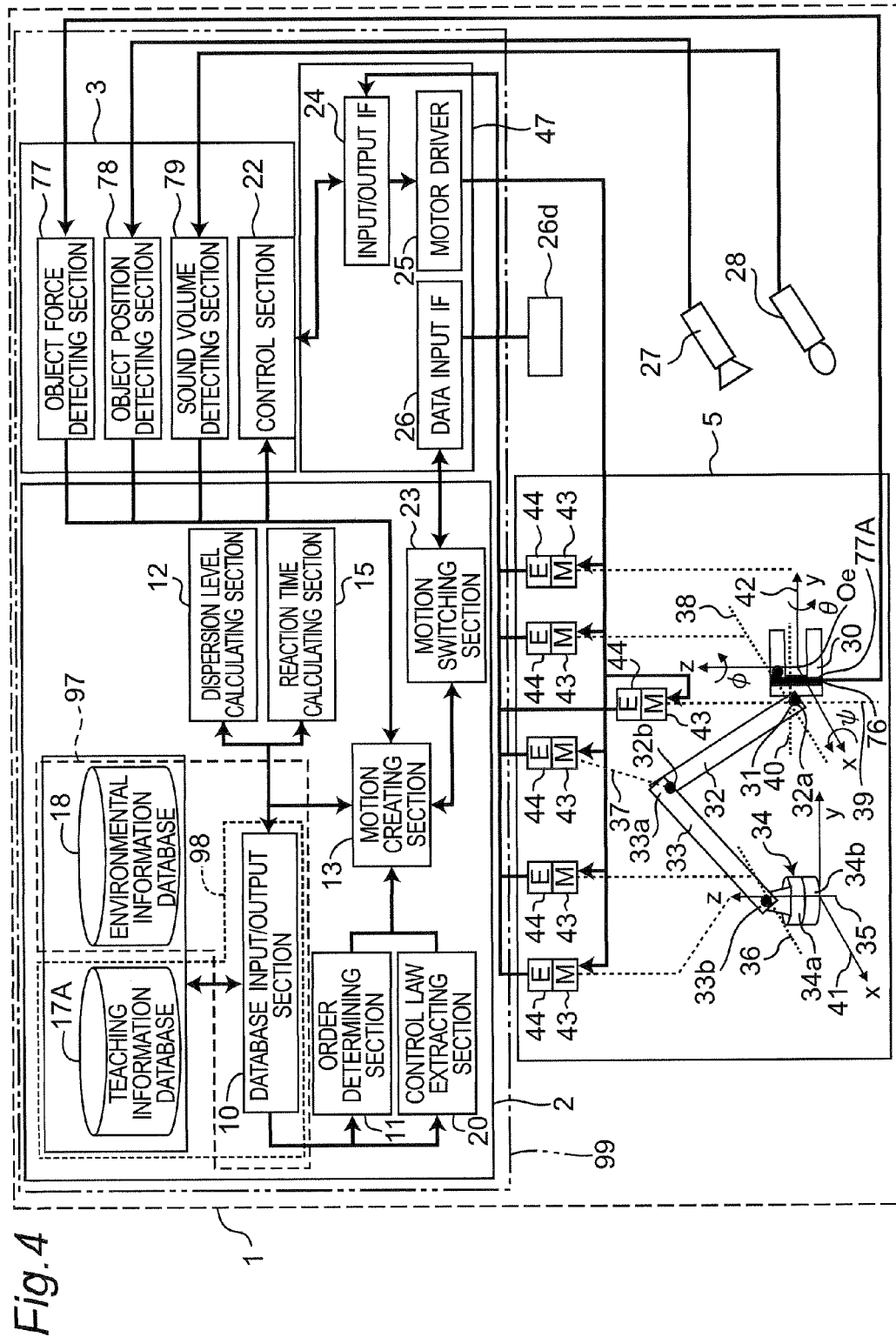
FIG. 4 is a block diagram illustrating a detailed configuration of the robot according to the first embodiment of the present invention.

The robot system 1 according to the first embodiment will be described in detail below. FIG. 4 is a detailed configurational view of the robot arm 5, a control device 3 of the robot arm 5, a motion creating apparatus 2 for creating a motion of the robot arm 5 (creating motion information), and a peripheral device 47.

<<Robot Arm 5>>

The robot arm 5 according to the first embodiment is a multiple-joint robot arm including a multiple link manipulator with a degree of freedom of 6 as one example. The robot arm 5 includes the hand 30, a front arm link 32 having a wrist section 31 to which the hand 30 is attached at its point 32a, an upper arm link 33 whose tip end 33a is rotatably connected to a proximal end 32b of the front arm link 32, and a pedestal 34 to which a proximal end 33b of an upper arm link 33 is rotatably connected and supported. The pedestal 34 is connected to the movable rail 8, but may be fixed to a constant position. The wrist section 31 has three rotary shafts at a fourth joint 38, a fifth joint 39, and a sixth joint 40, so that the relative orientation (orientation) of the hand 30 can be varied with respect to the front arm link 32. That is to say, in FIG. 4, the fourth joint 38 can change a relative orientation about a transverse axis ($\psi$) of the hand 30 with respect to the wrist section 31. The fifth joint 39 can change a relative orientation of the hand 30 with respect to the wrist section 31 around the ordinate axis ($\Phi$) perpendicular to the transverse axis of the fourth joint 38. The sixth joint 40 can change a relative orientation of the hand 30 with respect to the wrist section 31 around a transverse axis ($\theta$) perpendicular to both of a transvers axis ($\psi$) of the fourth joint 38 and the ordinate axis ($\phi$) of the fifth joint 39. The other end of the front arm link 32 can rotate about the third joint 37 with respect to the tip of the upper arm link 33, namely, the transverse axis parallel with a transverse axis of the fourth joint 38. The other end of the upper arm link 33 can rotate about the second joint 36 with respect to the pedestal 34, namely, a transverse axis parallel with the transverse axis of the fourth joint 38. Further, an upper movable section 34a of the pedestal 34 can rotate about the first joint 35 with respect to a lower fixing section 34b of the pedestal 34, namely, an ordinate axis parallel with the ordinate axis of the fifth joint 39.

As a result, the robot arm 5 constitutes a multiple link manipulator of six degrees of freedom, which is rotatable about the six shafts in total.

The respective joints (concretely, the first joint 35 to the sixth joint 40) constituting the rotating portions of the shafts have a rotary driving device such as a motor 43, and an encoder 44 for detecting a rotary phase angle (namely, a joint angle) of a rotating shaft of the motor 43.

The motor 43 of the first embodiment is disposed inside the respective joints of the robot arm 5. The motor 43 is provided to one of two link members constituting each of the joints, and is controlled to be driven by a motor driver 25, described later.

The rotating shaft of the motor 43 provided to the joint of one link member in each of the respective joints is connected to the other link member and the rotating shaft is rotated regularly and reversely, so that the other link member can be rotated about each of the shafts of the first joint 35 to the sixth joint 40 with respect to the one link member.

Reference numeral 41 designates an absolute coordinate system whose relative positional relationship is fixed with respect to the lower fixing section 34b of the pedestal 34, and reference numeral 42 designates a hand coordinate system whose relative positional relationship is fixed with respect to the hand 30. An origin position $O_e$ (x, y, z) of the hand coordinate system 42 viewed from the absolute coordinate system 41 is a hand position (a position of the hand 30) of the robot arm 5, and ($\phi$, $\theta$, $\psi$) that is an orientation of the hand coordinate system 42 viewed from the absolute coordinate system 41 and expressed by a roll angle, a pitch angle, and a yaw angle is defined as a hand orientation of the robot arm 5, and the hand position and an orientation vector are defined as a vector $r=[x, y, z, \phi, \theta, \psi]^T$.

Figure 5A:
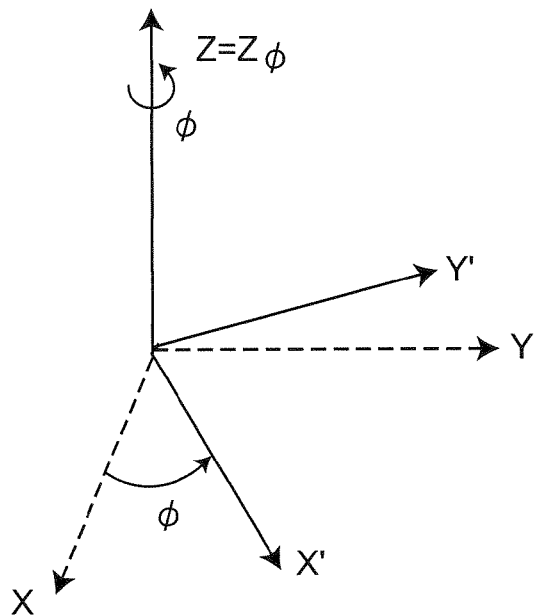
FIG. 5A is a view relating to a coordinate system according to the first embodiment of the present invention.
Figure 5B:
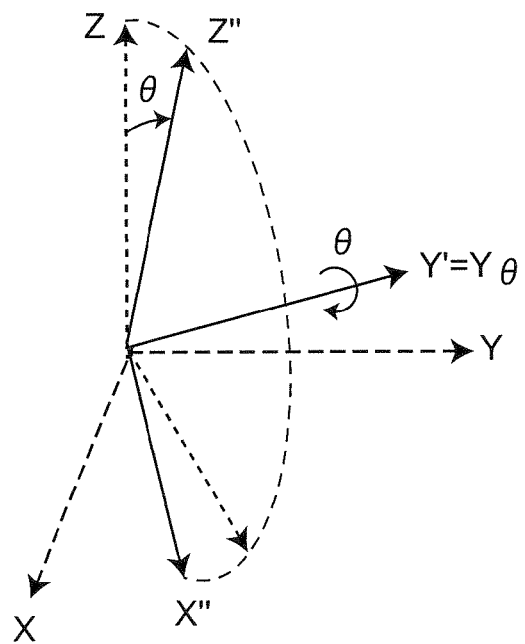
FIG. 5B is a view relating to a coordinate system according to the first embodiment of the present invention.
Figure 5C:
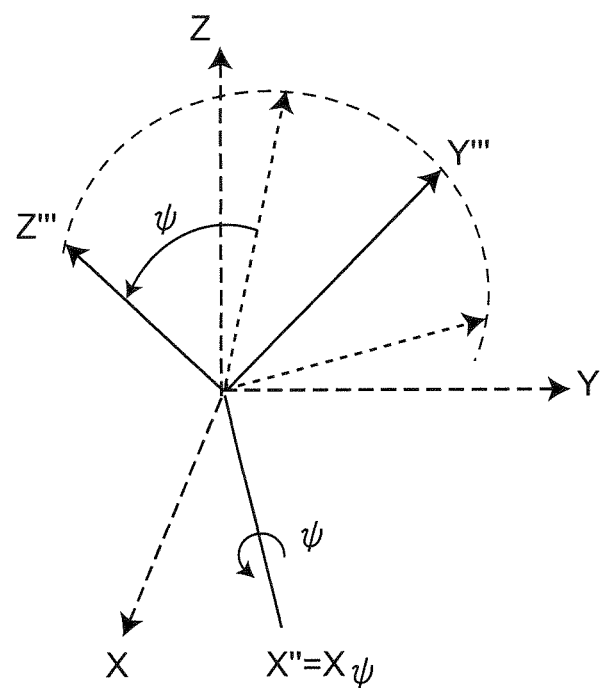
FIG. 5C is a view relating to a coordinate system according to the first embodiment of the present invention.

FIG. 5A to FIG. 5C illustrate the coordinate systems of the robot arm 5 according to the first embodiment of the present invention.

In the first embodiment, a coordinate system, which is obtained by rotating the coordinate system about the Z axis of an absolute coordinate system 35 by the angle $\phi$ is considered (see FIG. 5A). The coordinate axis at this time is [X', Y', Z].

Then, this coordinate system is rotated about the rotating axis Y' by the angle $\theta$ (see FIG. 5B). The coordinate axis at this time is [X", Y', Z"].

Finally, this coordinate system is rotated about a rotating axis X" by the angle $\psi$ (see FIG. 5C). The orientation of the coordinate system at this time is the roll angle $\phi$, the pitch angle $\theta$, and the yaw angle $\psi$, and the orientation vector at this time is ($\phi$, $\theta$, $\psi$). When a coordinate system, where the coordinate system of the orientation ($\phi$, $\theta$, $\psi$) shifts the origin position in parallel to the origin position $O_e$ (x, y, z) of the hand coordinate system 42, matches with the hand coordinate system 42, it is assumed that the orientation vector of the hand coordinate system 42 is ($\phi$, $\theta$, $\psi$).

When the hand position and orientation of the robot arm 5 are controlled, the hand position and orientation vector r is made to follow a hand position and orientation desired vector $r_d$ generated by a desired trajectory creating section 55, described later.

The robot arm 5 is controlled to be operated as follows by a robot control device 99 having the motion creating apparatus 2, described later, the control device 3 of the robot arm 5, and the peripheral device 47.

Information about the joint angles of the respective joints of the robot arm 5 outputted from the encoder 44 is captured into the control device 3 via a counter board of an input/output IF 24. The control device 3 calculates control command values of the respective joints for the rotating operation based on the captured information about the joint angles. The control command values calculated by the control device 3 are given to the motor driver 25 for controlling to drive the respective joints of the robot arm 5 via a D/A board of the input/output IF 24. The motors 43 of the respective joints of the robot arm 5 are driven according to the control command values sent from the motor driver 25.

The control device 3, the motion creating apparatus 2, and the peripheral device 47 include general personal computers, respectively, as one example.

<<Peripheral Device 47>>

The peripheral device 47 has the data input IF (interface) 26, the input/output IF (interface) 24, and the motor driver 25.

The input/output IF 24 has, for example, a D/A board, an A/D board, and a counter board each connected to an expansion slot such as a PCI bus of a personal computer. The input/output IF 24 obtains the information about the joint angles outputted from the encoders 44 of the respective joints of the robot arm 5, and inputs them into a control section 22 of the control device 3. On the other hand, control information such as a control signal is inputted from the control section 22 into the input/output IF 24, and the input/output IF 24 outputs control information such as the control command values to the motor driver 25. The motor driver 25 outputs control information such as the control command values to the motors 43 of the respective joints of the robot arm 5.

The data input IF (interface) 26 is an interface with which a person 4 commands turning on/off of the power, starting and stopping of the teaching, and starting and stopping of the tasks using an external input device 26d, such as a keyboard, a mouse, or a microphone, or buttons 26a, 26b, and 26c. Further, the data input IF 26 may receive commands from the person 4 using the input device such as the button 26a on the operation panel 26 shown in FIG. 1. The button 26a may input starting and ending with one button as a toggle switch, or a start button and an end button may be provided separately.

<<Control Device 3>>

The control device 3 has an object force detecting section 77, an object position detecting section 78, a sound volume detecting section 79, and the control section 22.

—Object Force Detecting Section 77—

Figure 6:
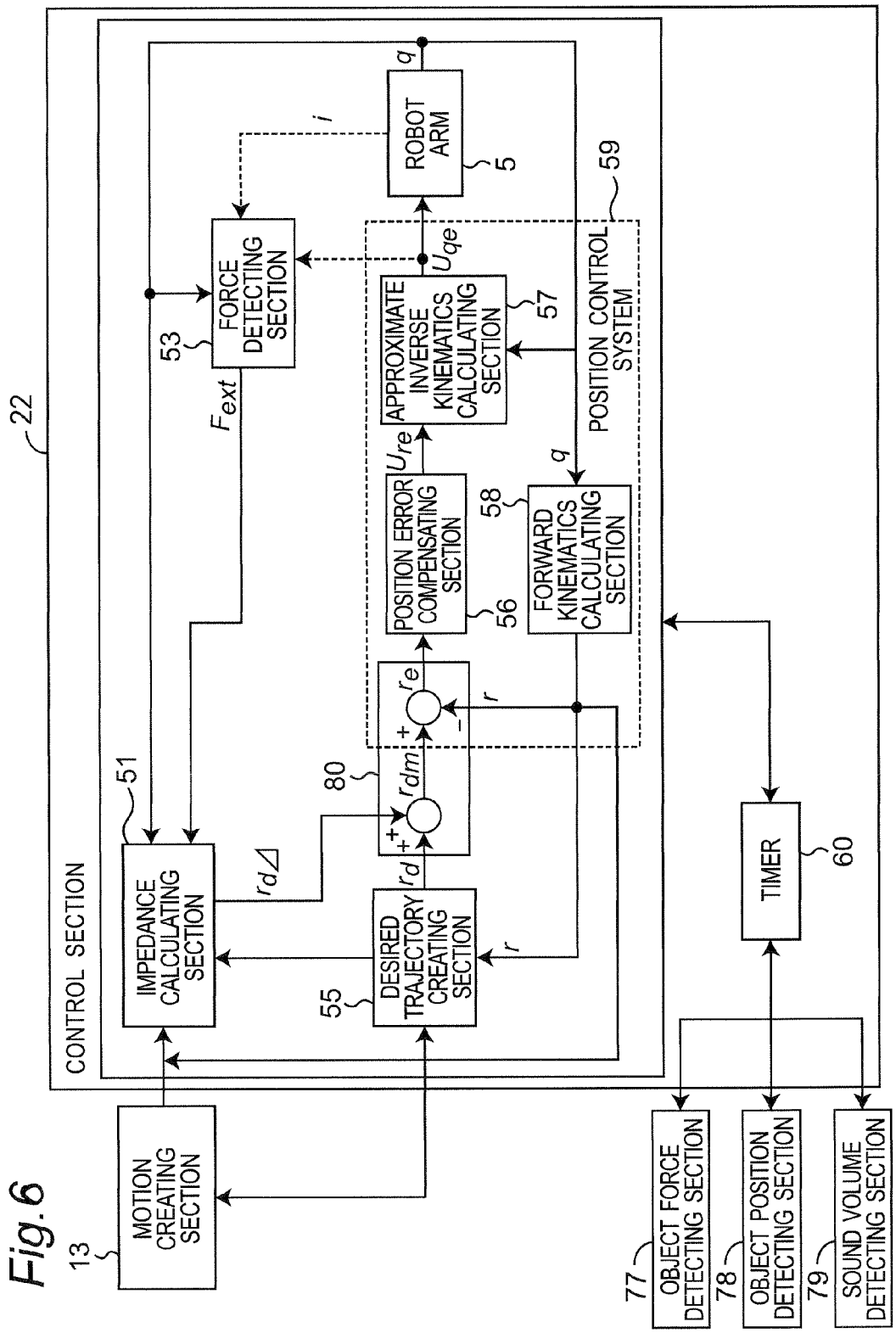
FIG. 6 is a block diagram illustrating a configuration of a control section of a control device according to the first embodiment of the present invention.
Figure 7A:
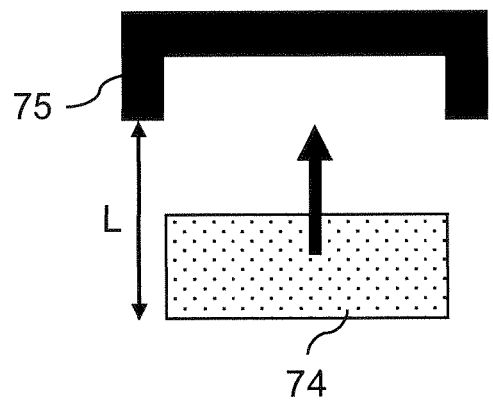
FIG. 7A is a view describing the motion for teaching the insertion of the flexible substrate according to the first embodiment of the present invention.
Figure 7B:
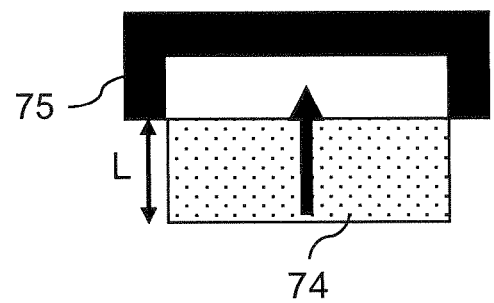
FIG. 7B is a view describing the motion for teaching the insertion of the flexible substrate according to the first embodiment of the present invention.
Figure 7C:
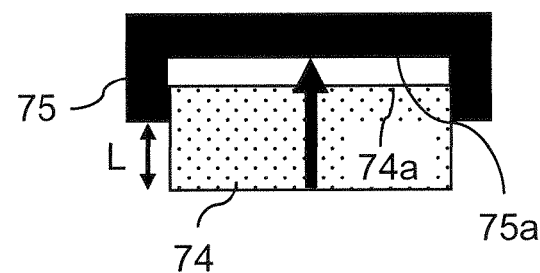
FIG. 7C is a view describing the motion for teaching the insertion of the flexible substrate according to the first embodiment of the present invention.
Figure 7D:
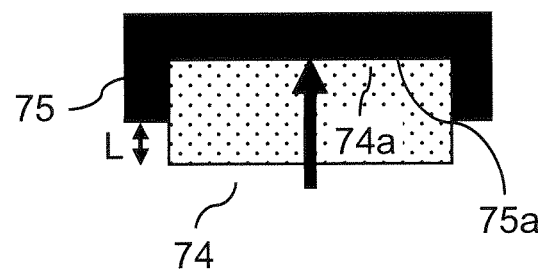
FIG. 7D is a view describing the motion for teaching the insertion of the flexible substrate according to the first embodiment of the present invention.

When a person 16 operates the robot arm 5 so as to change a motion of the robot arm 5, the object force detecting section 77 detects a force to be applied to an object every certain constant time (for example, every 4 msec) based on a measured value measured by a force measuring device such as a force sensor 77A, using a timer of the control section 22 (see FIG. 6). A force obtained by inverting a code of the force detected by the object force detecting section 77 is physically transmitted to the person's hand 16a via the robot arm 5, and the person 16 senses this force so as to change the motion of the robot arm 5.

Figure 3A:
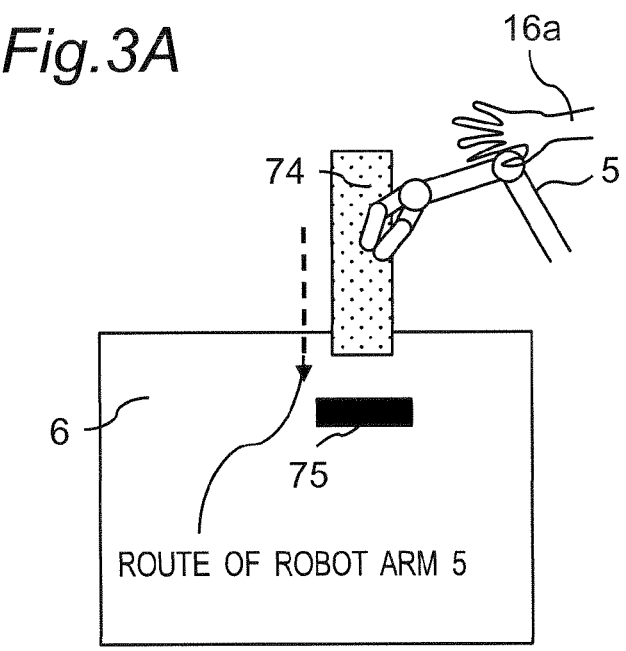
FIG. 3A is a view describing a motion for teaching insertion of a flexible substrate according to the first embodiment of the present invention.

The force to be applied to the object is directly measured by, for example, a six-axial force sensor 77A arranged near the hand 30 of the robot arm 5. More concretely, as shown in FIG. 3A, when the robot arm 5 inserts the flexible substrate 74 held by the hand 30 into the insertion slot 75 of the connector as one example of an object, as shown in FIG. 3B, the six-axial force sensor 77A measures the force to be applied to the flexible substrate 74 at a time when the flexible substrate 74 and the insertion slot 75 contact with each other, and inputs the measured value from the six-axial force sensor 77A into the object force detecting section 77, so as to detect the force applied to the object every certain constant time (for example, every 4 msec) using the timer 60. The object force detecting section 77 outputs six-axial force values detected by the object force detecting section 77 to the motion creating section 13 via the control section 22 based on the measured value in the six-axial force sensor 77A.

—Image Capturing Device 27—

The image capturing device 27 is one example of a device for capturing images of an object and its periphery when the person 16 operates the robot arm 5 so as to change the motion of the robot arm 5. The image capturing device 27 is an imaging device such as a camera and is arranged around the robot arm 5. As shown in FIG. 3A, when the robot arm 5 inserts the flexible substrate 74 into the insertion slot 75, the camera images a subject such as the flexible substrate 74.

The object position detecting section 78 executes a model matching process between the image captured by the image capturing device 27 and an image of the object recorded in advance, and calculates a position of the object every certain constant time (for example, every 4 msec.) using the timer 60 (see FIG. 6) of the control section 22. The position information about the object represents a distance from a front end of the flexible substrate 74 to the insertion slot 75 and is denoted by "L" shown in FIG. 7A to FIG. 7D. The position information about the object calculated by the object position detecting section 78 is outputted to the motion creating section 13 from the object position detecting section 78 via the control section 22. The person 16 visually checks the position information about the object detected by the object position detecting section 78, and changes the motion of the robot arm 5 according to the position information.

—Sound Collecting Device 28—

The sound collecting device 28 is one example of a device for obtaining information about a sound of a circumference environment at a time when the person 16 operates the robot arm 5 so as to changes the motion of the robot arm 5. The sound collecting device 28 is a sound collecting device such as a microphone, and is arranged around the robot arm 5 (for example, around a task target object, concretely, near the insertion slot 75). The sound volume detecting section 79 collects a sound during the task through the microphone, and executes the matching process between a sound at a time when flexible substrate 74 collide against the insertion slot 75 and a collision sound recorded in advance, so that the sound volume detecting section 79 detects information about a sound volume of the matched collision sounds every certain constant time (for example, every 4 msec.) by using the timer 60 (see FIG. 6) of the control section 22. The information about the sound volume detected by the sound volume detecting section 79 is outputted to the motion creating section 13 from the sound volume detecting section 79 via the control section 22. The person 16 changes the motion of the robot arm 5 according to the sound volume at the time of collision against the insertion slot 75 detected by the sound volume detecting section 79.

—Control Section 22—

Information about the hand position or the force of the robot arm 5, and a control mode are inputted/outputted between the control section 22 and the motion creating section 13. The control mode is a mode of any one control method of (i) a position control mode, (ii) an impedance control mode, and (iii) a force control mode.

—Control Mode Switching Operation—

The respective control modes are described.

(i) Position Control Mode

The position control mode is a mode in which the robot arm 5 is moved by the control section 22 based on information about the hand position, the orientation and the time of the desired trajectory creating section 55, described later. The position control mode is a mode in which the motion of the robot arm 5 is controlled by the control section 22 so that even when the person 4 applies a force to the robot arm 5, the robot arm 5 does not move.

(ii) Impedance Control Mode

Figure 8:
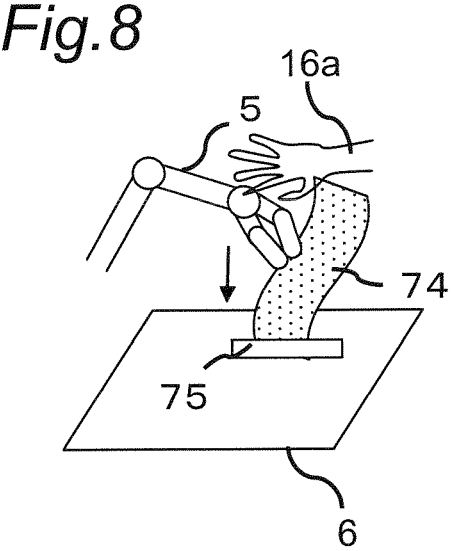
FIG. 8 is a view describing a motion of the robot for teaching by people according to the first embodiment of the present invention.

The impedance control mode is a mode in which the motion of the robot arm 5 is controlled by the control section 22 so that the robot arm 5 moves according to the force applied from the person 16 to the robot arm 5 (concretely, the force detected by a force detecting section 53). For example, as shown in FIG. 8, the impedance control mode is a mode that is used when the hand 16a of the person 16 directly holds the robot arm 5 and teaches the position and the orientation of the hand of the robot arm 5.

(iii) Force Control Mode

The force control mode is a mode in which the control section 22 controls the motion of the robot arm 5 based on the information about the force and the time of the desired trajectory creating section 55, described later, so that the robot arm 5 moves while pressing against the object.

These control modes that are suitable for the directions and the orientations of the robot arm 5 are set and executed by the motion creating section 13 at a time of the motion of the robot arm 5.

While the robot arm 5 is moving in the impedance control mode, settings of a mechanical impedance setting value or setting of the hand position and an orientation desired correction output $r_d\Delta$ outputted from an impedance calculating section 51 are changed.

Setting parameters of the mechanical impedance setting value includes inertia M, viscosity D, and stiffness K. The parameters of the mechanical impedance setting value are set by using correction values based on the following evaluation formulas.

$$M = KM \times (\text{correction value}) \qquad \text{Formula (1)}$$

$$D = KD \times (\text{correction value}) \qquad \text{Formula (2)}$$

$$K = KK \times (\text{correction value}) \qquad \text{Formula (3)}$$

KM, KD, and KK in the above formulas (1) to (3) represent gains, and have certain constant values, respectively.

The inertia M, the viscosity D, and the stiffness K of the mechanical impedance setting values calculated based on the formulas (1) to (3) may be determined in advance, or the inertia M, the viscosity D, and the stiffness K may be determined and may be outputted from the motion creating section 13 to the control section 22.

Details of the control section 22 are then described with reference to FIG. 6. FIG. 6 illustrates details of the control section 22 of the robot control device 99 according to the first embodiment.

The control section 22 has the desired trajectory creating section 55, the force detecting section 53, the impedance calculating section 51, a position control section 59, and a position error calculating section 80. The position control section 59 has a position error compensating section 56, an approximate inverse kinematics calculating section 57, and a forward kinematics calculating section 58. The force detecting section 53 is illustrated in FIG. 6 as a part of the control section 22, but may be configured separately from the control section 22.

The control section 22 exchanges signals such as a control signal with the robot arm 5 via the input/output IF 24, while FIG. 6 is a view where, the exchange of data signals between the control section 22 and the robot arm 5 is simplified.

Current value (the joint angle vectors) vectors $q=[q_1, q_2, q_3, q_4, q_5, q_6]^T$ of the joint angles measured by the encoders 44 of the joint axes provided to the robot arm 5 are outputted, and are captured into the control section 22 by the input/output IF 24. The reference symbols $q_1, q_2, q_3, q_4, q_5$, and $q_6$ represent the joint angles of the first joint 35, the second joint 36, the third joint 37, the fourth joint 38, the fifth joint 39, and the sixth joint 40, respectively.

The desired trajectory creating section 55 creates a hand position and orientation desired vector $r_d$, and a force desired vector $f_d$ that are desired values of the robot arm 5 based on motion information (concretely, information about the hand position, the orientation, the time, and the force of the robot arm 5) inputted from the motion creating section 13 and the control modes in respective directions, and outputs them to the position error calculating section 80.

Concretely, as the desired motion of the robot arm 5, positions, orientations ($r_{d0}, r_{d1}, r_{d2}, \ldots$) and forces ($f_{d0}, f_{d1}, f_{d2}, \ldots$) at points of times ($t=0, t=t_1, t=t_2, \ldots$) are given by a motion command section 27 according to a desired task.

The desired trajectory creating section 55 interpolates a trajectory between the points using polynomial interpolation, and generates the hand position, the orientation desired vector $r_d$ and the force desired vector $f_d$.

The force detecting section 53 detects an external force $F_{ext}$ to be applied to the robot arm 5 through a contact between an object such as the person 16 and the robot arm 5. When the task is done with an object of mass m being held by the hand, mg is subtracted from the detected $F_{ext}$ in advance. A gravitational acceleration is denoted by g. The value of the mass m of the held object can be input into the force detecting section 53 from the external input device 26*d* via the data input IF 26 by the person 16 before the object is held. Further, article information such as identification number, a mass, a shape, a dimension, and color of a target object for a task is stored in an article database, and an article identifier reads identification information such as a tag provided to a task article so as to be capable of obtaining a mass of a corresponding article from the article database based on the read information.

The force detecting section 53 obtains the currents values $i=[i_1, i_2, i_3, i_4, i_5, i_6]^T$ flowing in the motors 43 for driving the respective joints of the robot arm 5, respectively, that are measured by an electric current sensor of the motor driver 25, via the input/output IF 24. Further, the current values q of the joint angles measured by the encoders 44 are captured into the force detecting section 53 via the input/output IF 24, and a joint angle error compensation output $u_{qe}$ is captured thereinto from the approximate inverse kinematics calculating section 57, described later. The force detecting section 53 functions as an observer, and calculates a torque $\tau_{ext}$ generated at the respective joints due to an external force applied to the robot arm 5 based on the current values i, the current values q of the joint angles, and the joint angle error compensation output $u_{qe}$.

The force detecting section 53 coverts the torque into an equivalent hand external force $F_{ext}$ on the hand of the robot arm 5 according to the formula: $F_{ext} = J_v(q)^{-T}\tau_{ext} - [0, 0, mg]^T$, and outputs the equivalent hand external force $F_{ext}$ to the impedance calculating section 51. Here, $J_v(q)$ is a Jacobian matrix that satisfies:

$$v = Jv(q)q \quad \text{Formula (4)}$$

$v=[v_x, v_y, v_z, \omega_x, \omega_y, \omega_z]^T$, and ($v_x, v_y, v_z$, v) is a translational velocity of the hand of the robot arm 5 in the hand coordinate system 42, and ($\omega_x, \omega_y, \omega_z$) is an angular velocity of the hand of the robot arm 5 in the hand coordinate system 42. Further, m represents the mass of the held object held by the hand 30, and g represents a gravitational acceleration of the held object. Further, the object is actually held by the hand 30 of the robot arm 5, and a value of the mass m of the held object can be calculated based on an estimated result of the equivalent hand external force $F_{ext}$ of the force detecting section 53 at that time. When the object is not held by the hand 30, the calculation is performed with m=0.

The impedance calculating section 51 receives a setting signal of the control mode and a mechanical impedance setting value from the motion creating section 13, and controls a mechanical impedance value of the robot arm 5 to the mechanical impedance setting value. When the impedance calculating section 51 receives the setting signal of (i) the position control mode from the motion creating section 13, the impedance calculating section 51 outputs "0" as the mechanical impedance value.

When the impedance calculating section 51 receives the setting signal of (ii) the impedance control mode from the motion creating section 13, the impedance calculating section 51 calculates a hand position and orientation desired correction output $r_{d\Delta}$ for making the robot arm 5 realize control of the mechanical impedance setting values based on the inertia M, the viscosity D, and the stiffness K that are the mechanical impedance setting values set by the motion creating section 13, the current values q of the joint angles measured by the encoders 44, and the external force $F_{ext}$ detected by the force detecting section 53, according to a formula (5).

The impedance calculating section 51 outputs the hand position and orientation desired correction output $r_{d\Delta}$ obtained by calculation according to the formula (5) to the position error calculating section 80.

When the setting signal of (iii) the force control mode is received from the motion creating section 13, described later, the impedance calculating section 51 calculates the hand position and orientation desired correction output $r_{d\Delta}$ for making the robot arm 5 realize the control of the mechanical impedance setting values based on the inertia M, the viscosity D, and the stiffness K that are the mechanical impedance setting values set by the motion creating section 13, the current values q of the joint angles measured by the encoders 44, the external force $F_{ext}$ detected by the force detecting section 53, and the force $f_d$ outputted from the desired trajectory creating section 55, according to the following formula (9).

The impedance calculating section 51 outputs the hand position and orientation desired correction output $r_{d\Delta}$ obtained by calculation according to the formula (9) to the position error calculating section 80.

The position error calculating section 80 adds the hand position and orientation desired correction output $r_{d\Delta}$ outputted from the impedance calculating section 51 and the hand position and orientation desired vector $r_d$ outputted from the desired trajectory creating section 55 so as to generate a hand position and orientation correction desired vector $r_{dm}$.

$$r_{d\Delta} = \left(s^2\hat{M} + s\hat{D} + \hat{K}\right)^{-1} F_{ext} \quad \text{Formula (5)}$$

here, $$\hat{M} = \begin{bmatrix} M & 0 & 0 & 0 & 0 & 0 \\ 0 & M & 0 & 0 & 0 & 0 \\ 0 & 0 & M & 0 & 0 & 0 \\ 0 & 0 & 0 & M & 0 & 0 \\ 0 & 0 & 0 & 0 & M & 0 \\ 0 & 0 & 0 & 0 & 0 & M \end{bmatrix} \quad \text{Formula (6)}$$

-continued $$\hat{D} = \begin{bmatrix} D & 0 & 0 & 0 & 0 & 0 \\ 0 & D & 0 & 0 & 0 & 0 \\ 0 & 0 & D & 0 & 0 & 0 \\ 0 & 0 & 0 & D & 0 & 0 \\ 0 & 0 & 0 & 0 & D & 0 \\ 0 & 0 & 0 & 0 & 0 & D \end{bmatrix}$$ Formula (7)

$$\hat{K} = \begin{bmatrix} K & 0 & 0 & 0 & 0 & 0 \\ 0 & K & 0 & 0 & 0 & 0 \\ 0 & 0 & K & 0 & 0 & 0 \\ 0 & 0 & 0 & K & 0 & 0 \\ 0 & 0 & 0 & 0 & K & 0 \\ 0 & 0 & 0 & 0 & 0 & K \end{bmatrix}$$ Formula (8)

and s represents a Laplacian operator.

$$r_{d\Delta} = (s^2\hat{M} + s\hat{D} + \hat{K})^{-1}(F_{ext} - f_d) \quad \text{Formula (9)}$$

however, M, D, and K are calculated according to the formulas (6), (7), and (8).

The position error calculating section 80 obtains an error $r_e$ between the hand position and orientation correction desired vector $r_{dm}$ and the hand position and orientation vector r calculated by the forward kinematics calculating section 58, described later, and outputs the error $r_e$ to the position error compensating section 56.

The joint angle vectors q that are the current values q of the joint angles measured by the encoders 44 at the joint axes of the robot arm 5 are inputted into the forward kinematics calculating section 58 via the input/output IF 24. The forward kinematics calculating section 58 makes a geometric calculation for conversion from the joint angle vectors q of the robot arm 5 into the hand position and orientation vectors r. The hand position and orientation vector r calculated by the forward kinematics calculating section 58 is outputted to the position error calculating section 80, the impedance calculating section 51, and the desired trajectory creating section 55.

The position error compensating section 56 outputs a position error compensation output $u_{re}$ to the approximate inverse kinematics calculating section 57 based on the error $r_e$ obtained by the position error calculating section 80.

The approximate inverse kinematics calculating section 57 performs an approximate calculation of inverse kinematics based on the position error compensation output $u_{re}$ inputted from the position error compensating section 56 and the joint angles vector q measured by the robot arm 5, according to an approximation formula: $u_{out} = J_r(q)^{-1}u_{in}$. Here, $J_r(q)$ is a Jacobian matrix that satisfies:

$$r = J_r(q)q \quad \text{Formula (10)}$$

in which when $u_{in}$ represents an input into the approximate inverse kinematics calculating section 57, $u_{out}$ represents an output from the approximate inverse kinematics calculating section 57, and the input $u_{in}$ is a joint angle error q, the formula is a formula for transformation from the hand position and orientation error $r_e$ into the joint angle error $q_e$ like $q_e = J_r(q)^{-1}r_e$.

Therefore, when the position error compensation output $u_{re}$ is outputted from the position error compensating section 56 into the approximate inverse kinematics calculating section 57, the joint angle error compensation output $u_{qe}$ for compensating the joint angle error $q_e$ is outputted from the approximate inverse kinematics calculating section 57 via the input/output IF 24 into the motor driver 25 of the robot arm 5 as the output from the approximate inverse kinematics calculating section 57.

The joint angle error compensation output $u_{qe}$ is given as voltage command values to the motor driver 25 of the robot arm 5 via the D/A board of the input/output IF 24, and the joint shafts are driven to rotate regularly and reversely by the motors 43 so that the robot arm 5 moves.

The timer 60 is arranged in the control section 22, and put respective means (respective sections) into effect after every certain constant time (for example, every 4 msec) passes. Concretely, the respective means (the respective sections) of the control section 22, and the object force detecting section 77, the object position detecting section 78, and the sound volume detecting section 79 that input information into the control section 22 are operated every constant time.

As to the control section 22 having the above configuration, a principle of an impedance control motion of the robot arm 5 will be described.

The basic impedance control operation is feedback control (position control) of the hand position and orientation error $r_e$ to be made by the position error compensating section 56, and a portion surrounded by a dotted line in FIG. 6 is a position control section (position control system) 59. When, for example, a PID compensator is used as the position error compensating section 56, a control is made by the position control section 59 so that the hand position and orientation error $r_e$ is converged to 0, and the desired impedance control motion of the robot arm 5 can be realized.

In cases of (ii) the impedance control mode and (iii) the force control mode, the position error calculating section 80 adds the hand position and orientation desired correction output $r_{d\Delta}$ from the impedance calculating section 51, so as to correct the hand position and orientation desired value with respect to the position control section 59. For this reason, the desired value of the hand position and orientation slightly shifts from an original value, and thus the position control section 59 can control the mechanical impedance value of the robot arm 5 to the mechanical impedance setting value that is suitably set, so as to correct the position control operation of the position control section 59.

Figure 9:
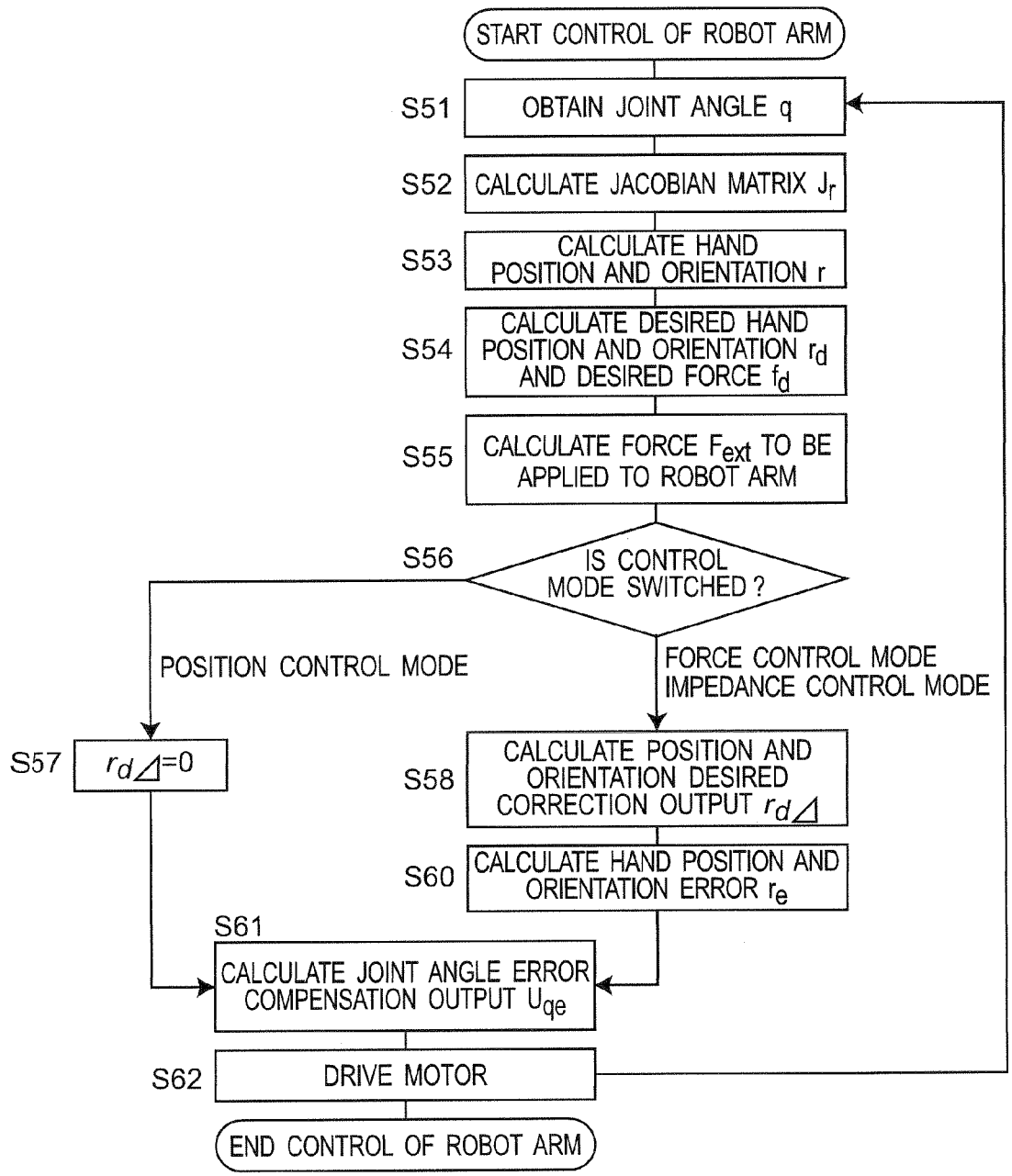
FIG. 9 is a flowchart of the control section according to the first embodiment of the present invention.

Operation steps of the control section 22 according to the first embodiment is described. FIG. 9 is an operation flowchart of the control section 22 according to the first embodiment.

The joint angle vectors q measured by the encoders 44 of the joints 35 to 40 of the robot arm 5 are captured into the control section 22 via the input/output IF 24 (step S51).

The approximate kinematics calculating section 57, then, calculates a Jacobian matrix $J_r$ or the like necessary for calculation of kinematics of the robot arm 5 based on the joint angle vectors q captured by the control section 22 (step S52). Here, due to the control operation start time, the position error compensation output u, inputted from the position error compensating section 56 is calculated as "0" value.

The forward kinematics calculating section 58, then, calculates the present hand position and orientation vector r of the robot arm 5 based on the joint angle vectors q measured by the encoders 44 of the robot arm 5, and outputs it to the position error calculating section 80, the desired trajectory creating section 55, and the impedance calculating section 51 (step S53).

The desired trajectory creating section 55 calculates the hand position and orientation desired vector $r_d$ of the robot arm 5 based on motion information inputted from the motion creating section 13, outputs the hand position of the robot arm 5 as a desired hand position and orientation desired vector $r_d$ to the position error calculating section 80 in the impedance control mode, and outputs the force desired vector $f_d$ in the force control mode (step S54).

The force detecting section 53 calculates the equivalent hand external force $F_{ext}$ of the hand of the robot arm 5 based on driving current values i of the motors 43, the joint angle vectors q, and the joint angle error compensation output $u_{qe}$, and outputs it to the impedance calculating section 51 (step S55).

The control mode input from the motion creating section 13 into the impedance calculating section 51 is switched by the impedance calculating section 51 (step S56).

In respective components of the control mode in step 56, the sequence proceeds to step 57 in the case of (i) the position control mode, and proceeds to step 58 in the case of (ii) the impedance control mode or (iii) the force control mode.

When the motion creating section 13 sets (i) the position control mode in step S57, the impedance calculating section 51 determines the hand position and orientation desired correction output $r_{d\Delta}$ as 0 vector. Thereafter, the sequence goes to step S61.

When the motion creating section 13 sets (ii) the impedance control mode or (iii) the force control mode in step S58, the impedance calculating section 51 calculates the hand position and orientation desired correction output $r_{d\Delta}$ based on the inertia M, the viscosity D, and the stiffness K of the mechanical impedance setting values set in the motion creating section 13, the joint angle vectors q, and the equivalent hand external force $F_{ext}$ to be applied to the robot arm 5 calculated by the force detecting section 53. Thereafter, the sequence proceeds to step S60.

The position error calculating section 80 calculates the hand position and orientation error $r_e$, that is a difference between the hand position and orientation correction desired vector $r_{dm}$ that is a sum of the hand position and orientation desired vector $r_d$ and the hand position and orientation desired correction output $r_{d\Delta}$, and the present hand position and orientation vector r, in step S60. Further, the position error compensating section 56 outputs the position error compensation output $u_{re}$ to the approximate inverse kinematics calculating section 57 based on the error $r_e$ calculated by the position error calculating section 80. As a concrete example of the position error compensating section 56, a PID compensator is considered. When three gains including proportion, differential, and integration that are a diagonal matrix of constants are adjusted, the position error compensating section 56 is controlled so that the position error $r_e$ is converged to 0. Thereafter, the sequence proceeds to step S61.

In step S61, the approximate inverse kinematics calculating section 57 multiplies an inverse matrix of the Jacobian matrix $J_r$ calculated in step S2 by the position error compensation output $u_{re}$ obtained in step S60, so that the position error compensation output $u_{re}$ is calculated as the joint angle error compensation output $u_{qe}$ that is a value relating to the error of the joint angles based on the value relating to the error of the hand position and orientation.

The joint angle error compensation output $u_{qe}$ calculated in step S61 is given to the motor driver 25 from the approximate inverse kinematics calculating section 57 via the input/output IF 24 in step S62. The motor driver 25 changes the amount of currents flowing in the motors 43 at the joints of the robot arm 5 based on the joint angle error compensation output $u_{qe}$. The change in the current amounts drives the motors of the joints of the robot arm 5, so as to move the robot arm 5.

Step S51 to step S62 are repeatedly executed as a control calculating loop in the control section 22, so that the control of the motion of the robot arm 5 by means of the control section 22, namely, the motion for controlling the mechanical impedance values of the robot arm 5 to predetermined setting value can be realized.

<<Motion Creating Apparatus 2>>

The motion creating apparatus 2 includes the teaching information database 17A, the environmental information database 18, the motion creating section 13, an order determining section 11, a control law extracting section 20, a database input/output section 10, a dispersion level calculating section 12, a reaction time calculating section 15, and a motion switching section 23. The database input/output section 10 and the teaching information database 17A constitute one example of the teaching information obtaining section 98 for obtaining a plurality of pieces of time-series teaching information at a time when the person 16 operates the robot arm 5 to teach the motions. The environmental information database 18 and the database input/output section 10 constitute one example of the information obtaining section 97 for obtaining at least reaction time information and dispersion information (further, perceptual information depending on cases). The reaction time information is information about time from when the person 16 receives at least one perceptual information of information about a force to be applied to an object to be tasked by the robot arm 5 from the robot arm 5, position information about an object to be tasked by the robot arm 5, and information about a sound of a circumference environment, until when the person 16 operates the robot arm 5. The dispersion information is information about a time-series dispersion level of at least one or more of the time-series teaching information or the time-series perceptual information.

The constituents of the motion creating apparatus 2 will be described in detail below.

—Teaching Information Database 17A—

The teaching information database 17A stores information (hereinafter, teaching information) for teaching the motion of the robot arm 5 including the hand position and orientation of the robot arm 5 at a predetermined time. The teaching information is generated by the motion creating section 13, described later, when the person 16 operates the robot arm 5, and is inputted from the motion creating section 13 into the teaching information database 17A by the database input/output section 10, so as to be stored in the teaching information database 17A. FIG. 10 illustrates the teaching information as data in the teaching information database 17A.

(1) A field "task ID" in FIG. 10 shows a task ID number for identifying a task.

(2) A field "motion ID" shows a motion ID number for identifying each motion of the robot arm 5 for doing each task.

(3) A field "position and orientation" shows information about position and orientation of the hand of the robot arm 5 in the motions. A metric (m) unit system is adopted in the first embodiment.

(4) A field "time" shows information about time for making each motion of the robot arm 5. The second time scale (sec) unit is adopted in the first embodiment.

(5) A field "user ID" shows a user ID for identifying a person who teaches a task.

(6) A field "time and date" shows time and date on which the teaching information is stored in the motion creating section 13, described later.

(7) A field "skill level" shows a skill level calculated by the order determining section 11, described later.

—Environmental Information Database 18—

The environmental information database 18 stores information about the circumference environment of the robot arm 5 that is used by the person 16 who operates the robot arm 5 to change the motion of the robot arm 5, namely, information sensed by the person 16 (hereinafter, environmental information (perceptual information)). The environmental information is created by the motion creating section 13, described later, so as to be paired with the teaching information that is created by the motion creating section 13, and is inputted from the motion creating section 13 into the environmental information database 18 via the database input/output section 10 so as to be stored in the environmental information database 18. Concretely, when the person 16 operates the robot arm 5 so as to create the teaching information, at least any one environmental information (perceptual information) of information about the force to be applied to a target object (the target object for a task done by the robot arm 5) from the robot arm 5, position information about the object detected by the object position detecting section 78, and sound volume information (sound information) detected by the sound volume detecting section 79 are stored in the environmental information database 18.

FIG. 11A illustrates the environmental information that is data in the environmental information database 18.

(1) A field "environment ID" in FIG. 11A shows an environment ID number for identifying an environment.

(2) A field "task ID" shows a task when environmental information corresponding to an environment ID is obtained, and shows "task ID" in the teaching information database 17A.

(3) A field "motion ID" shows a motion when environmental information corresponding to an environment ID is obtained, and shows "motion ID" of the teaching information database 17A.

(4) A field "force" shows information (force information) about a force detected by the object force detecting section 77, and components of the force in x, y, z, $\phi$, $\theta$, $\psi$ directions are expressed by ($f_x$, $f_y$, $f_z$, $f_\phi$, $f_\theta$, $f_\psi$).

(5) A field "object position" shows a position of an object detected by the object position detecting section 78.

(6) A field "sound volume" shows a sound volume detected by the sound volume detecting section 79.

(7) A field "environment type flag" shows information about a flag indicating which information of environmental information about the force, the object position, and the sound volume parameter is effective. Concretely, it is expressed by a numerical value of 32 bits shown in FIG. 11B. In FIG. 11B, when the parameter values at the respective bits are effective, "1" is set, and when ineffective, "0" is set. In the first embodiment, 0th bit to the fifth bit show information about a force, the sixth bit shows information about an object position, and the seventh bit shows information about a sound volume. For example, when a value of the force on x coordinate is effective at the 0th bit, "1" is set, and when ineffective, "0" is set. Further, when the value of the force on the y coordinate is effective at the first bit, "1" is set, and when ineffective, "0" is set. Further, when the value of the force on the z coordinate is effective at the second bit, "1" is set, and when ineffective, "0" is set. Thereafter, the third, fourth, and fifth bits sequentially represent effectiveness of $\phi$, $\theta$,$\psi$ of the force. That is to say, when effective, "1" i set, and when ineffective "0" is set. Further, the sixth bit represents whether the information about an object position is effective or ineffective (namely, when effective, "1" is set, and ineffective, "0" is set). The seventh bit represents whether the information about a sound volume is effective or ineffective (namely, when effective, "1" is set, and ineffective, "0" is set).

Further, since a larger (32 bits) amount of the information about the flags is prepared for future extension, eighth bit to 31st bit are not used in this example, and thus "0" is put therein, but a variable may be such that only the seven bits are stored.

—Database Input/Output Section 10—

The database input/output section 10 inputs/outputs data with a database group (the teaching information database 17A, the environmental information database 18), the order determining section 11, the motion creating section 13, the dispersion level calculating section 12, the reaction time calculating section 15, and the control law extracting section 20.

—Motion Switching Section 23—

The motion switching section 23 switches the mode of the robot arm 5 among the three modes including (i) a teaching mode, (ii) a reproducing mode, (iii) a standby mode based on input information from the data input IF 26 of the operation panel 26 or the like, and outputs information about the switched mode to the motion creating section 13.

(i) The teaching mode is a mode where, as shown in FIG. 8, for example, the person 16 operates the robot arm 5 and creates information about the motion of the robot arm 5.

(ii) The reproducing mode is a mode where the robot arm 5 automatically carries out reproduction based on motion information created by the motion creating section 13.

(iii) The standby mode is a mode where the robot arm 5 is powered ON, and the teaching mode and the reproducing mode are not set.

The switching of the mode is inputted into the motion switching section 23 by the data input IF 26 such as the operation panel 26.

Concretely, just after the power is on by input from the data input IF 26 into the motion switching section (for example, "ON" of the power button 26a on the operation panel 26 in FIG. 2 is pressed), the motion switching section 23 sets the standby mode.

When the person 16 starts teaching, the motion switching section 23 sets the teaching mode through the input (for example, the teaching start button 26b on the operation panel 26 in FIG. 2 is pressed) from the data input IF 26 into the motion switching section 23. When the person 16 completes the teaching, the motion switching section 23 sets the standby mode through the input from the data input IF 26 into the motion switching section 23 (for example, the teaching stop button 26b of the operation panel 26 in FIG. 2 is pressed).

When the robot arm 5 automatically reproduces the taught motion, the person 16 sets the reproducing mode through the input (for example, the task start button 26c of the operation panel 26 in FIG. 2 is pressed) from the data input IF 26 into the motion switching section 23 using the motion switching section 23. When the reproduction is interrupted or the task is ended, the person 16 sets the standby mode through the input (for example, the task stop button 26c of the operation panel 26 in FIG. 2 is pressed) from the data input IF 26 into the motion switching section 23, using the motion switching section 23.

—Dispersion Level Calculating Section 12—

The dispersion level calculating section 12 calculates a dispersion level in chronological order that is information about a dispersion level of the teaching information and the environmental information inputted by the database input/output section 10, and outputs the calculated dispersion level to the motion creating section 13. The dispersion level means a fluctuation (deviation) level of the teaching information about the force or the position or the orientation of the robot arm 5, or the environmental information (perceptual information) about the position or the sound volume of a target object for the task to be done by the robot arm 5, in chronological order in each direction. Concretely, for example, the dispersion level calculating section 12 obtains the deviation of the teaching information (the position or the orientation of the robot arm 5) in each direction. A place where an absolute value of the deviation obtained by the dispersion level calculating section 12 is a first threshold (a threshold for detecting a teaching information deviation) or more is counted by the dispersion level calculating section 12 (here, the counted value is denoted by $b_1$). Further, as to the deviation in which an absolute value of the deviation obtained by the dispersion level calculating section 12 is the first threshold or more, a total of the absolute values of the deviation is calculated by the dispersion level calculating section 12 (here, the calculated value is denoted by $h_1$).

The dispersion level calculating section 12 obtains deviations of the environmental information (perceptual information, and concretely, the force, the object position, or the sound volume), and the dispersion level calculating section 12 counts places where the absolute values of the deviations obtained by the dispersion level calculating section 12 are a second threshold (a threshold for detecting the deviation of the environmental information (perceptual information)) or more (here, the counted value is designated by $b_2$). Further, as to the deviations where the absolute values of the deviations obtained by the dispersion level calculating section 12 are the second threshold or more, a total of the absolute values of the deviations is calculated by the dispersion level calculating section 12 (here, the calculated value is denoted by $h_2$). A dispersion level B is calculated by the dispersion level calculating section 12 according to $(c_1 \times b_1 + c_2 \times b_2 + c_3 \times h_1 + c_4 \times h_2)$. Here, $c_1$, $c_2$, $c_3$, and $c_4$ are constants, and may be predetermined and stored in an internal storage section of the dispersion level calculating section 12, or may be inputted later into the dispersion level calculating section 12 using the data input IF 26. Concrete numerical values of the thresholds and the constants are described later.

The dispersion level calculating section 12 calculates the dispersion level between a plurality of pieces of time-series information, such as information at a time when the person 16 is untrained in the teaching task and information at a time when the person 16 is skilled in the teaching task.

Further, the first threshold and the second threshold may be preset in the dispersion level calculating section 12, or can be inputted into the dispersion level calculating section 12 by the data input IF 26. The first threshold and the second threshold can be set to different values according to directions or types of information. The first threshold and the second threshold are the absolute values.

—Reaction Time Calculating Section 15—

When the person 16 operates the robot arm 5 so as to create the information about the motion of the robot arm 5, the reaction time calculation section 15 calculates the reaction time from a time when the person 16 receives the environmental information around the robot arm 5 to a time when the person 16 takes an action. The reaction time calculated by the reaction time calculation section 15 is outputted from the reaction time calculation section 15 to the motion creating section 13.

The reaction time calculating section 15 calculates the reaction time based on the teaching information and environmental information paired with the teaching information stored in the teaching information database 17A. Concretely, the deviations of the environmental information are obtained by the dispersion level calculating section 12, and a time point when codes of the deviations obtained by the dispersion level calculating section 12 are the same as each other and the absolute values are the first threshold or more is detected as a time point $t_1$ when the person 16 receives sense stimuli (the unit is msec, and hereinafter, the time point $t_1$ is defined as an information change point) by the dispersion level calculating section 12. A concrete calculating example is described later.

Further, at the time point $t_1$ and thereafter, at a time point $t_2$ (the unit is msec., and the time point $t_2$ is defined as an action change point) at which the person 16 takes an action, the dispersion level calculating section 12 obtains the deviations of the environmental information or the teaching information after the information change point, and detects the time point at which the codes of the deviations obtained first are the same as each other and the absolute values are the second threshold or more. The reaction time calculating section 15 calculates the reaction time T according to (the action change point—the information change point), namely, $(t_2-t_1)$ (the unit is msec).

Further, another method for calculating the time point $t_1$ at which the person 16 receives sense stimuli includes a method in which the reaction time calculating section 15 makes a calculation based on the teaching information and the environmental information. Concretely, the dispersion level calculating section 12 obtains the deviation of the environmental information and the deviation of the teaching information, and the dispersion level calculating section 12 detects a certain time point at which the absolute value of the deviation obtained by the dispersion level calculating section 12 is the first threshold or more as the time point $t_1$ at which the person 16 receives sense stimuli. A concrete calculating example is described later.

When the time point $t_2$ cannot be detected by the dispersion level calculating section 12, namely, when the dispersion level calculating section 12 obtains the deviations of the environmental information or the teaching information after the information change point and the time point $t_2$ at which the codes of the deviations obtained first are the same as each other and the absolute values are the second threshold or more cannot be detected by the dispersion level calculating section 12, the reaction time calculating section 15 sets the reaction time to −1.

The reaction time calculating section 15 calculates the reaction time for a plurality of pieces of time-series information, such as the information at the time of being unskilled in the teaching task and the information at the time of being skilled in the teaching task.

The first threshold and the second threshold may be preset by the reaction time calculating section 15, or can be inputted into the reaction time calculating section 15 by the data input IF 26. The first threshold and the second threshold can be set to different values according to directions and types of information by the reaction time calculating section 15.

—Order Determining Section 11—

The order determining section 11 determines an order of the plurality of pieces of time-series teaching information, such as the information at the time of being unskilled that is created by the motion creating section 13, described later and is stored in the teaching information database 17A via the database input/output section 10, and the information at the time of being skilled in the teaching task, in order of higher skill. The order determined by the order determining section 11 is outputted from the order determining section 11 into the motion creating section 13.

When the order is determined by the order determining section 11, the dispersion level calculating section 12 first calculates the dispersion level of each of a plurality of pieces of the teaching information and the environmental information. For example, the dispersion levels that are calculated based on the two pieces of the teaching information and environmental information are designated by $B_1$ and $B_2$. Then, the reaction time calculating section 15 respectively calculates the reaction times for the plurality of pieces of the teaching information and the environmental information, and adds the reaction times for each environmental information so as to calculate a total reaction time T. However, when the reaction time is −1, the reaction time calculating section 15 does not perform the addition. In this example, the total reaction times that are calculated based on two pieces of the teaching information and the environmental information are designated by $T_1$ and $T_2$. The reaction time calculating section 15 counts the number of pieces of used information about the force, the object position, and the sound volume of the environmental information in the environmental information database 18 as used environmental information number E representing the number of used information. In this example, the numbers of used environmental information that are calculated based on the two pieces of the teaching information and the environmental information are denoted by $E_1$ and $E_2$. Then, the reaction time calculating section 15 calculates each skill level of the teaching information based on the dispersion level B, the total reaction time T, and the number of used environmental information E. The skill level P is calculated by the reaction time calculating section 15 according to 1/(aE+bB+cT). The skill level P calculated by the reaction time calculating section 15 is related to the teaching information by the reaction time calculating section 15 so as to be stored in the teaching information database 17A via the database input/output section 10. In the formula for calculating the skill level P, as the value obtained by adding the number of used environmental information (E), the dispersion level (B), and the reaction time (T) is larger, the skill level P is lower. That is to say, as more pieces of information about the circumference environment are used, and the deviations of the teaching information and the environmental information that are teaching results are larger, and the reaction time from a time when the person 16 receives sense stimuli to a time when the person 16 takes an action is longer, a determination is made that the person 16 is not skilled in that task so that the skill level P is reduced. When the person 16 is skilled in a certain task, the person can teach using only requisite minimum environmental information, and thus the deviation of the teaching results is smaller, and the reaction time for the person 16 to the sense stimuli is shorter. For this reason, the calculation can be made according to this formula so that the skill level P is higher.

Here, a, b, and c are constants, and may be predetermined in the reaction time calculating section 15, or may be inputted into the reaction time calculating section 15 later by using the data input IF 26. The order determining section 11 determines the order of plural pieces of the teaching information in descending order of the skill level P calculated by the reaction time calculating section 15. Further, an order rearranging section 64 of the motion creating section 13, described later, determines the constants a, b, and c according to a task or a part of the task, and the number of pieces of the environmental information (E), the dispersion level (B), and the reaction time (T) can be weighted (namely, the constants are used as weights), so that the order can be rearranged. For example, in a case of a task for dismantling components in a recycle factory, a fluctuation in the components, such as a stain or damaged state is large. For this reason, the deviations of the teaching information or the environmental information become large regardless of a skilled person or an unskilled person. However, a skilled person who is accustomed to the dismantling task sets a weight b of the dispersion level (B) to a small value or sets the weight b to "0" because the reaction time to the sense stimuli is shortened, and a weight c of the reaction time (T) is increased, and the reaction time calculating section 15 calculates the reaction time so that the length of the reaction time greatly influences a value of the skill level P. In general, it is said that the reaction time of the person 16 is shorter in order of a kinesthetic sense, an acoustic sense, and a visual sense. When the flexible substrate 74 is moved to the insertion slot 75 of the connector in order to insert the flexible substrate 74 into the insertion slot 75, a visual sense is mainly used, and when the insertion through the insertion slot 75 of the connector is completed, a kinesthetic sense is used. The weight c of the reaction time (T) is set to be small at a section where mainly a visual sense is used and is set to be large at a section where a kinesthetic sense is used, so that a difference in reaction time with respect to sense stimuli to be used can be absorbed.

Here, the reaction time calculating section 15 calculates the skill level P based on the dispersion level B, the total reaction time T, and the number of used environmental information E, but in the case where the order determining section 11 can determine the order of plural pieces of the obtained teaching information even if the reaction time calculating section 15 does not calculate the skill level P, such as a case where an adult and a child do a task or a case where a profession and an amateur of a robot do the task, this method is not used but the order determining section 11 may determine the order.

—Control Law Extracting Section 20—

The control law extracting section 20 extracts information about a control law (sensory feedback law) for automatically moving the robot arm 5 based on the teaching information and the environmental information inputted by the database input/output section 10. Concretely, as described as to the reaction time calculating section 15, the reaction time calculating section 15 calculates the information change point and the action change point after the information change point based on the teaching information and the environmental information, and the control law extracting section 20 approximates the information having detected by the action change point by an approximate curve at a section between the time after the action change point and next information change point. When the reaction time calculating section 15 determines that next information change point is not detected, the control law extracting section 20 approximates a time point at the end of the information where the action change point is detected, by the approximate curve.

The approximate curve is calculated by the control law extracting section 20 according to, for example, a least squares method. When the control law extracting section 20 determines that the time (reaction time) from the information change point to the action change point is the first threshold (the threshold for detecting the reaction time) or less, the control law extracting section 20 determines that the person 16 takes an action under prediction without sensory feedback, and thus the sensory feedback is not extracted. The approximate curve is used here, the control law extracting section 20 may directly use the information that is not approximated and is obtained by detecting the action change point.

—Motion Creating Section 13—

Figure 12:
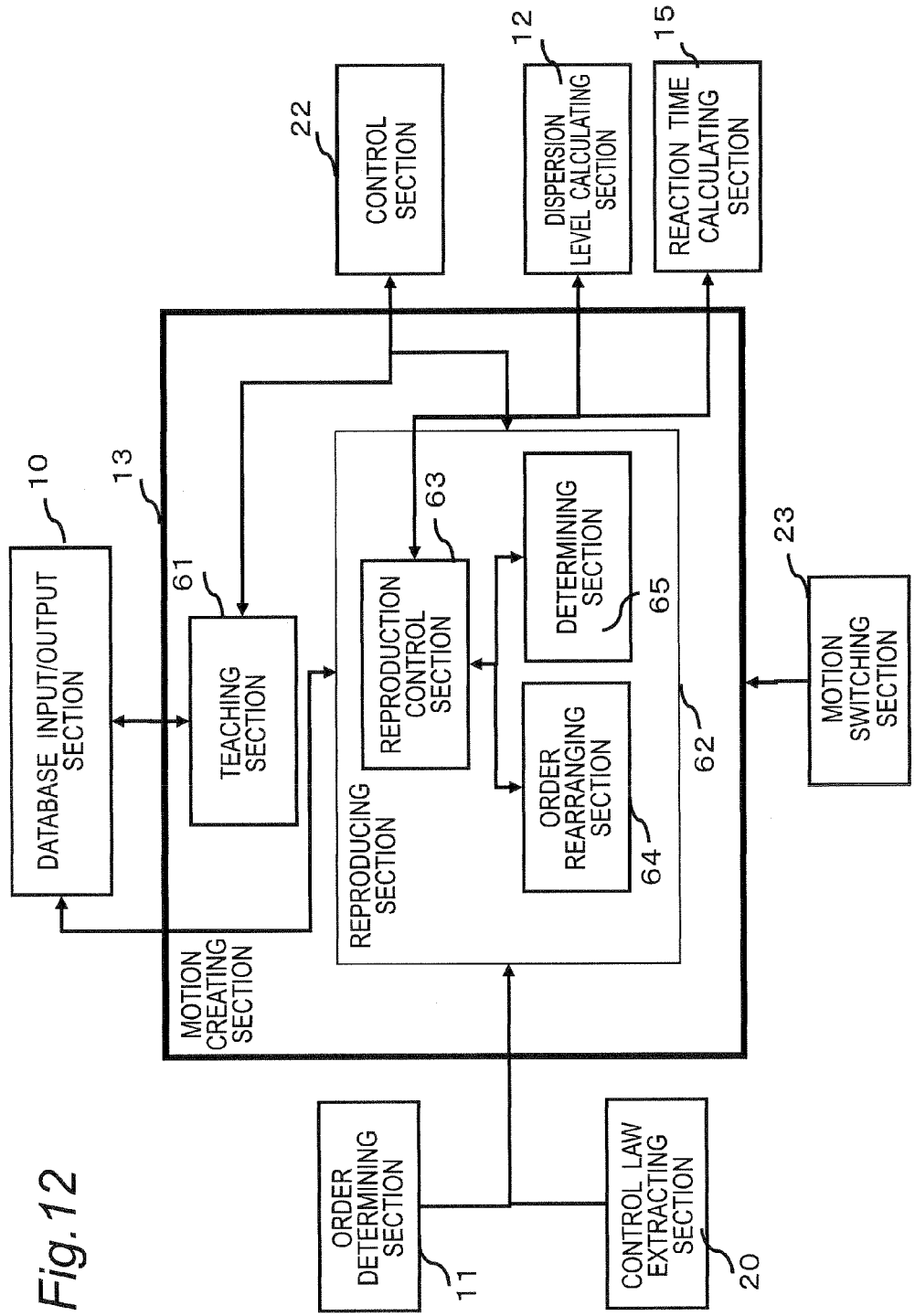
FIG. 12 is a view illustrating a configuration of an motion creating section according to the first embodiment of the present invention.

FIG. 12 is a detailed block diagram of the motion creating section 13. The motion creating section 13 has a teaching section 61 and a reproducing section 62, creates and store teaching information, and reproduces motion information based on the stored teaching information so as to move the robot arm 5. The reproducing section 62 has a reproduction control section 63, the order rearranging section 64, and a determining section 65. When the motion switching section 23 sets the teaching mode, the teaching section 61 of the motion creating section 13 creates teaching information and environmental information based on the teaching operation of the person 16, so as to store the created teaching information and environmental information in the teaching information database 17A and the environmental information database 18, respectively, via the database input/output section 10.

Concretely, when the motion switching section 23 sets the teaching mode, the teaching section 61 issues a command to the control section 22 so that the motion is made by impedance control. Then, the person 16 moves the robot arm 5, and the teaching section 61 obtains information about the hand position and orientation of the robot arm 5 every certain constant time (for example, every 4 msec) using the timer 60 of the control section 22 from the control section 22, and the database input/output section 10 relates the obtained information about the hand position and orientation with the time information so as to store them together with teaching date and hour in the teaching information database 17A.

The teaching section 61 obtains the environmental information as information about a peripheral environment at a time when the person 16 teaches (perceptual information, and concretely, information about any one or more of a force, an object position, and a sound volume) that is paired with the teaching information from the control section 22 via the object force detecting section 77, the object position detecting section 78, and the sound volume detecting section 79, and the database input/output section 10 relates the obtained environmental information with the time information so as to store them in the environmental information database 18.

The teaching section 61 starts to store these pieces of information in the teaching information database 17A and the environmental information database 18 at a timing when the motion switching section 23 sets "the teaching mode", and stops the storage from the teaching section 61 into the teaching information database 17A and the environmental information database 18 at a time point when "the teaching mode" is changed into "the standby mode". The teaching section 61 of the motion creating section 13 creates temporally plural pieces of information, such as information at a time of being unskilled in the teaching task and information at a time of being skilled in the teaching task so as to store them in the teaching information database 17A and the environmental information database 18.

When the motion switching section 23 sets the reproducing mode, the reproducing section 62 of the motion creating section 13 creates information about the motions of the robot arm 5 based on the teaching information and the environmental information inputted via the database input/output section 10, the control law extracted by the control law extracting section 20, and the order determined by the order determining section 11, so as to output them to the control section 22.

Details will be described below.

The reproduction control section 63 of the reproducing section 62 issues a command to the control law extracting section 20 so that the control law extracting section 20 extracts sensory feedback laws from the plurality of pieces of information temporally obtained, such as information at the time of being unskilled in the teaching task and information at the time of being skilled in the teaching task.

Subsequently, the reproduction control section 63 of the reproducing section 62 issues a command to the dispersion level calculating section 12 so that the dispersion level is calculated.

Subsequently, the reproduction control section 63 of the reproducing section 62 issues a command to the reaction time calculating section 15 so that a reaction time is calculated.

Subsequently, the reproduction control section 63 of the reproducing section 62 issues a command to the order determining section 11 so that the order determining section 11 determines the order of the teaching information in descending order of skill based on the dispersion level calculated by the dispersion level calculating section 12 and the reaction time calculated by the reaction time calculating section 15.

Subsequently, the reproduction control section 63 of the reproducing section 62 corrects the motion based on the sensory feedback laws extracted by the control law extracting section 20, and outputs the hand position and orientation desired vector $r_d$ as desired position and orientation information, the force desired vector $f_d$ as desired force information, and information about a mode for motion in the position control mode according to the respective directions or motion by means of the force control, to the control section 22.

With the method for correcting the motion according to the sensory feedback laws extracted by the control law extracting section 20, the reproduction control section 63 sets teaching information with the highest priority (namely, teaching information of the most skilled person) determined by the order determining section 11 to desired position and orientation information, and outputs it to the control section 22 so that the motion is made in the position control mode based on the set position and orientation information.

Figure 13:
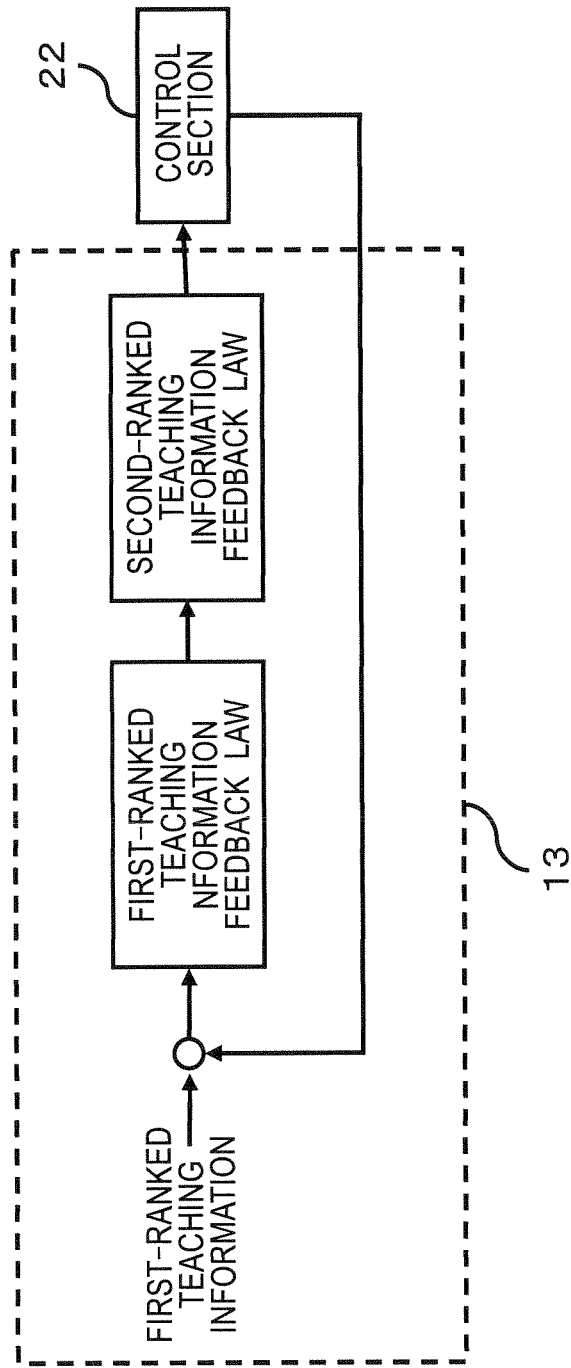
FIG. 13 is a view illustrating configurations of the motion creating section and the control section according to the first embodiment of the present invention.

Subsequently, as shown in FIG. 13, when the dispersion level calculating section 12 detects the information change point while the robot arm 5 is moving according to the teaching information with the highest priority (in FIG. 13, the first-ranked teaching information), the order rearranging section 64 of the reproducing section 62 applies the feedback law extracted from the teaching information and the environmental information with high priority (in FIG. 13, the first-ranked teaching information feedback law). When the determining section 65 determines that a proper motion is not made (the robot arm 5 does not normally move according to the motion information), the order rearranging section 64 rearranges and applies a feedback law extracted from the teaching information and the environmental information with low priority (in FIG. 13, the second-ranked teaching information feedback law) so as to correct the information about the position and orientation or the force. When the determining section 65 determines that the proper motion is made (the robot arm 5 normally moves according to the motion information), the order rearranging section 64 does not apply the feedback law (in FIG. 13, the second-ranked teaching information feedback law) extracted from the teaching information and environmental information with low priority.

As to a desired trajectory that is corrected according to the feedback law switched by the order rearranging section 64, the reproduction control section 63 outputs the hand position and orientation desired vector $r_d$, the force desired vector $f_d$ that is the desired force information, and information about the mode for making the motions to the respective directions according to the position control mode or according to the force control, to the control section 22. Concretely, the reproduction control section 63 sets "0" in the case of the position control, and sets "1" in the case of the force control, and the reproduction control section 63 sets the positions and the orientation directions.

At the time of the teaching in the teaching mode, the person 16 sequentially creates the information about the hand position and orientation and time of the robot arm 5, but the present invention is not limited to this, and the information about the position, orientation and time may be individually inputted by the person 16 using the external input device 26d, such as a keyboard, a mouse, or a microphone.

Figure 14:
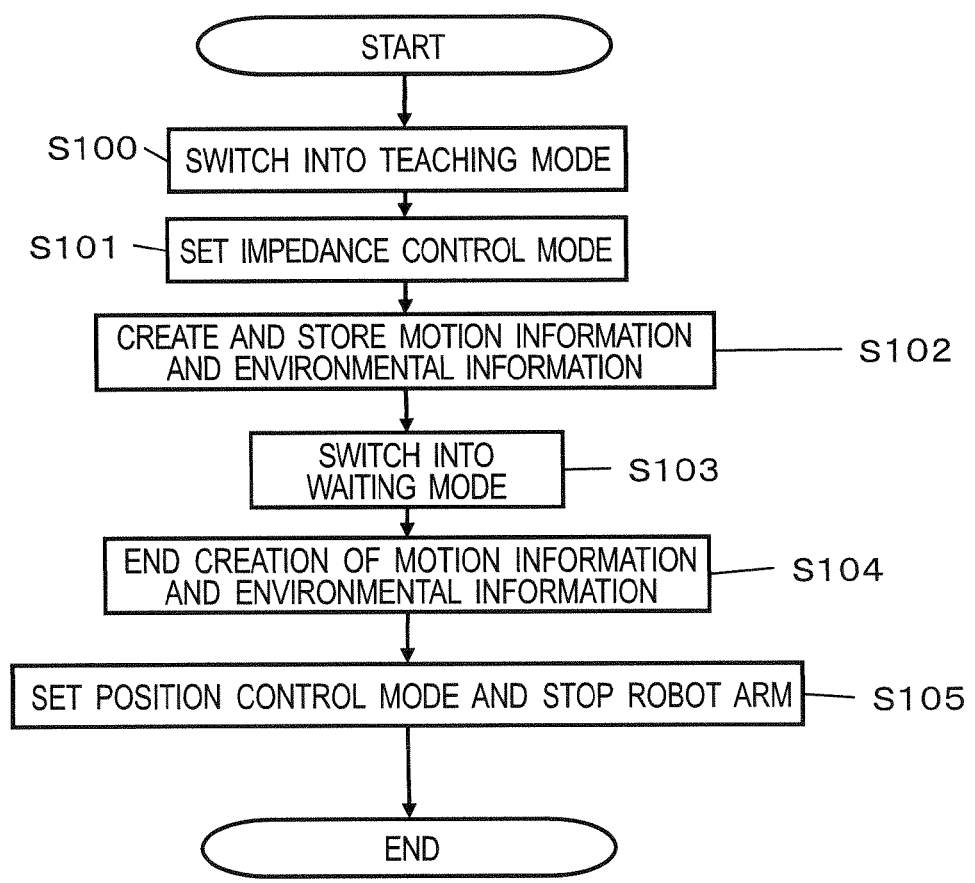
FIG. 14 is a flowchart of the motion creating section according to the first embodiment of the present invention.
Figure 15:
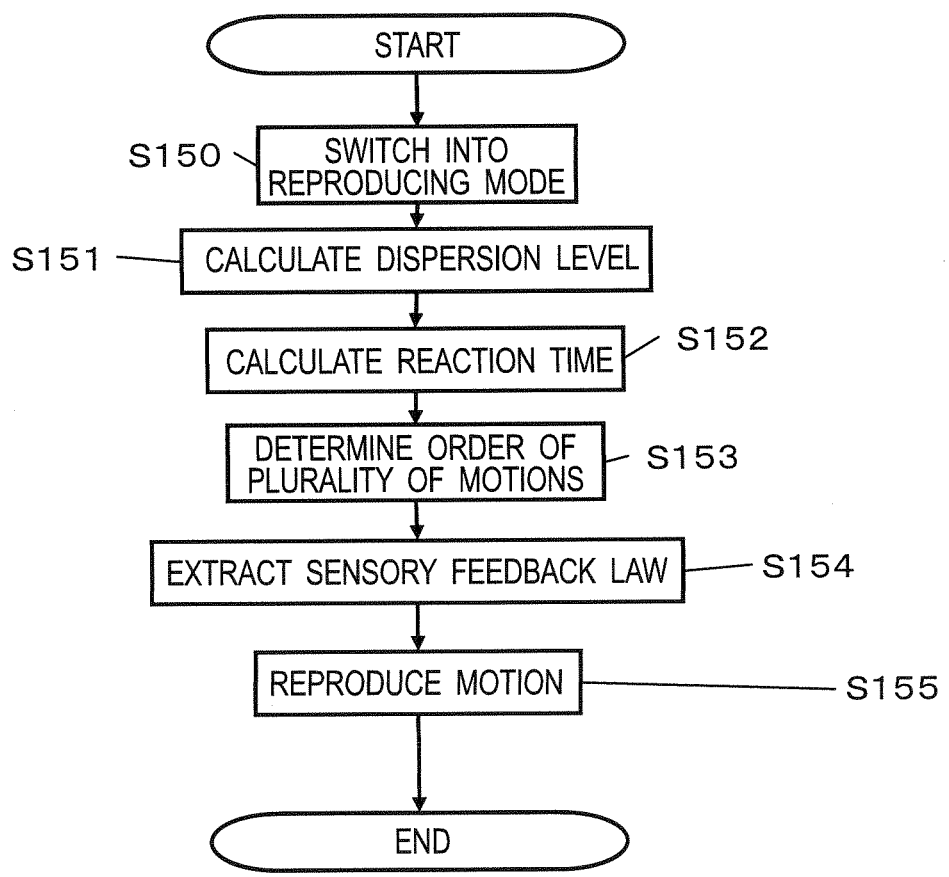
FIG. 15 is a flowchart of the motion creating section according to the first embodiment of the present invention.

Next, a procedure in which the person 16 operates the robot arm 5 to teach the motion of the robot arm 5, and the robot arm 5 automatically reproduces the motions is described below with reference to flowcharts of FIG. 14 and FIG. 15.

The task for inserting the flexible substrate that is used in a recorder, a television, a mobile telephone, or the like is described as an example.

The task for inserting the flexible substrate 74 using a level of a force to be applied to the flexible substrate 74 as the environmental information is described as an example.

When the teaching is started in step S100, the person 16 inputs the teaching start command to the motion switching section 23 through the input from the data input IF 26 to the motion switching section 23 (for example, the teaching start button 26b of the operation panel 26 in FIG. 2 is pressed). The operation mode input into the motion switching section 23 (in this example, the teaching mode) is set by the motion switching section 23, and is outputted from the motion switching section 23 to the motion creating section 13.

Subsequently, the teaching section 61 of the motion creating section 13 receives the input (in this example, the teaching mode) from the motion switching section 23 in step S101, and issues a command for control through impedance to the control section 22. The control section 22 switches the mode into the impedance control mode so that the force applied by the person 16 can move the robot arm 5.

FIG. 3A to FIG. 3D (FIG. 3E to FIG. 3H are views where FIG. 3A to FIG. 3D are viewed from top and bottom) illustrate the procedure in which the person 16 operate the robot arm 5 with the hand 16a so as to perform teaching. The person 16 operates and teach the robot arm 5 in order of FIG. 3A→FIG. 3B→FIG. 3C→FIG. 3D.

Figure 3D:
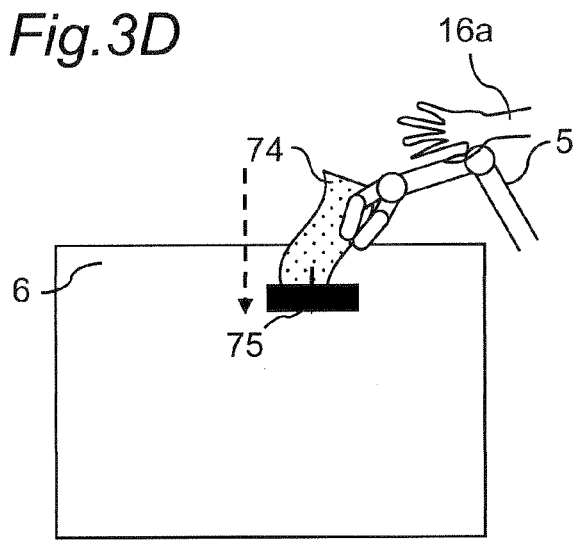
FIG. 3D is a view describing the motion for teaching insertion of the flexible substrate according to the first embodiment of the present invention.

Next, as shown in 3A to FIG. 3D, the force information is paired with the position and orientation and is managed in step S102. That is to say, the teaching section 61 of the motion creating section 13 creates the information about the position, orientation, and the time of the hand of robot arm 5 at the time when the person 16 performs the operation, and the force detected by the object force detecting section 77 when the flexible substrate 74 contacts with the insertion slot 75 every constant time (for example, every 4 msec) using the timer 60, and stores them in the motion information database 17 and the environmental information database 18 via the database input/output 10.

When the teaching is ended, the person 16 inputs a command for ending the teaching through input from the data input IF 26 into the motion switching section 23 (for example, the teaching stop button 26b of the operation panel 26 in FIG. 2 is pressed) in step S103. The inputted moving mode (in this example, the standby mode) is set by the motion switching section 23 and is outputted to the motion creating section 13.

Next in step S104, the motion creating section 13 receives the input (in this example, a waiting teaching mode) from the motion switching section 23, and issues a command for control in the position control mode (stops on the same position) to the control section 22. Further, the creation of the motion information in the motion creating section 13 is ended.

Subsequently, in step S105, the control section 22 switches the mode into the position control mode so that the robot arm 5 stops.

FIG. 16(A) and FIG. 16(B) show graphs where only the inserting direction of the flexible substrate 74 in the time-series data of the position and the force created by the motion creating section 13 is plotted. Hereinafter, the motion in FIG. 16(A) is a motion pattern C, and the motion in FIG. 16(B) is a motion pattern D.

The motion pattern C of FIG. 16(A) represents information about the task for inserting the flexible substrate 74 taught by operating the robot arm 5 at the time point of being unskilled in the task. The task in FIG. 16(B) and the task in FIG. 16(A) are similar to each other, but the motion pattern D of FIG. 16(B) represents information at the time point of being skilled in the teaching task. FIG. 16(A) and FIG. 16(B) may be temporarily obtained from one person 16 or may be obtained from persons having different skills.

In FIG. 16(A) and FIG. 16(B), the states of the flexible substrate 74 and the insertion slot 75 at the time of the teaching through the procedure in FIG. 3A to FIG. 3D are related to the respective graphs.

Figure 3E:
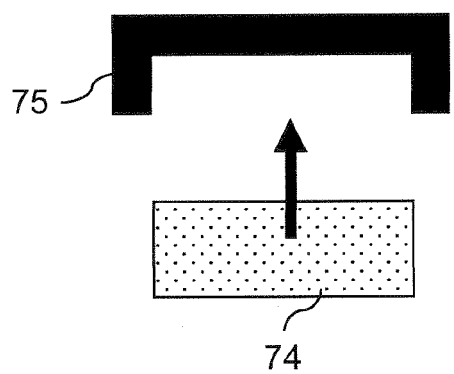
FIG. 3E is a plan view near the flexible substrate of FIG. 3A.

FIG. 3E illustrates a state that the flexible substrate 74 moves towards the insertion slot 75. This state corresponds to (1) of FIGS. 16(A) and (5) of FIG. 16(B). Since the state (1) of FIG. 16(A) is not sufficiently accustomed to the task for inserting the flexible substrate 74, the position information fluctuates in comparison with (5) of FIG. 16(B) that is skilled information.

Figure 3F:
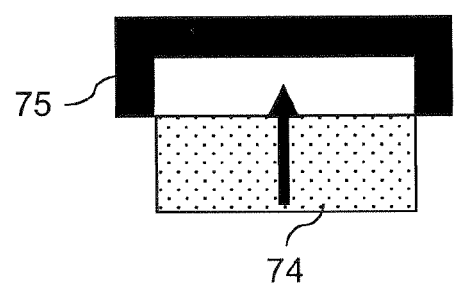
FIG. 3F is a plan view near the flexible substrate of FIG. 3B.

FIG. 3F illustrates a moment at which the flexible substrate 74 contacts with the insertion slot 75 in order to insert the flexible substrate 74 into the insertion slot 75. This state corresponds to (2) of FIG. 16(A) and (6) of FIG. 16(B). As to comparison of the force information, in (1) of FIG. 16(A), when the flexible substrate 74 contacts with the insertion slot 75, the flexible substrate 74 is strongly pressed against the insertion slot 75 in comparison with (6) of FIG. 16(B) as the skilled information due to the state of being unaccustomed to the task for inserting the flexible substrate 74. An unskilled person recognizes the contact through the strong pressing, but a skilled person can recognize the contact from past experiences without strong pressing.

Figure 3G:
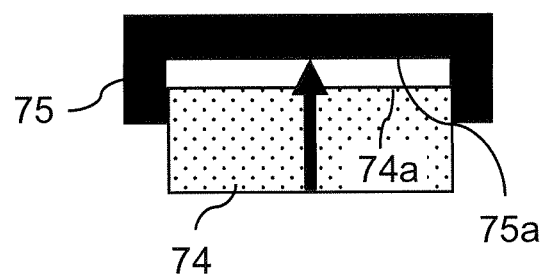
FIG. 3G is a plan view near the flexible substrate of FIG. 3C.

FIG. 3G illustrates a state that the flexible substrate 74 is inserted into the insertion slot 75. This corresponds to (3) of FIG. 16(A) and (7) of FIG. 16(B). During the insertion of the flexible substrate 74 into the insertion slot 75, since the flexible substrate 74 is in contact with and is inserted into the insertion slot 75, a contact force becomes strong (in (3) of FIGS. 16(A) and (7) of FIG. 16(B), since a code of the force is minus, plotting is performed to a down direction), and the position information moves to the inserting direction. In (3) of FIG. 16(A), both the position and the force fluctuate in comparison with (7) of FIG. 16(B). This means that while flexibility of the flexible substrate 74 is learned near the insertion slot through a trial and error process, the flexible substrate 74 is inserted. However, (7) of FIG. 16(B) represents that a force to be applied and a moving distance due to the force can be predicted from past experiences, and the insertion can be performed by a requisite minimum operation.

Figure 3H:
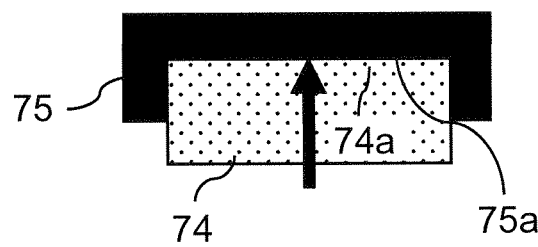
FIG. 3H is a plan view near the flexible substrate of FIG. 3D.

FIG. 3H illustrates a state in which the tip of the flexible substrate 74 contacts with an inner bottom part of the insertion slot 75 of the connector. This state corresponds to (4) of FIGS. 16(A) and (8) of FIG. 16(B). In (4) of FIG. 16(A), the pressing against the inner bottom part of the insertion slot 75 of the connector is stronger than (8) of FIG. 16(B). This means that an unskilled person recognizes the contact through the strong pressing, but a skilled person can insert the flexible substrate 74 into the inner side from past experiences without strong pressing.

A procedure for creating a motion for automatically moving the robot arm 5 based on the teaching information and environmental information in FIG. 16(A) and FIG. 16(B) is described with reference to FIG. 15.

When automatic reproduction by the robot is started, in step S150, the person 16 inputs a task starting command into the motion switching section 23 through input from the data input IF 26 into the motion switching section 23 (for example, the task start button 26c of the operation panel 26 in FIG. 2 is pressed). The motion creating section 13 receives the input from the motion switching section 23 (in this example, the reproducing mode), so that the reproducing section 62 of the motion creating section 13 starts the reproduction of the motion.

In step S151, the reproduction control section 63 of the reproducing section 62 allows the dispersion level calculating section 12 to calculate the dispersion levels of the two pieces of the teaching information and the environmental information in FIG. 16(A) of and FIG. 16(B) obtained at the teaching time.

In this example, a command is issued to the dispersion level calculating section 12 so that the dispersion level calculating section 12 calculates the dispersion level based on the information about the position and the force only in the insertion direction shown in FIG. 16(A) and FIG. 16(B). The first threshold (the threshold for detecting the teaching information deviation) of the position in the insertion direction in the dispersion level calculating section 12 is determined as 0.5 (mm), and the second threshold (the threshold for detecting the environmental information (perceptual information) deviation) of the force in the insertion direction is determined as 0.5 (N). The dispersion level calculating section 12 obtains the deviation of the position in the insertion direction, and the dispersion level calculating section 12 counts places where the absolute value of the deviation obtained by the dispersion level calculating section 12 is the first threshold or more (here, the counted value is determined as $b_{11}$). With respect to FIG. 16(A), the places where the absolute value is the first threshold or more are shown in (1) to (6) of FIG. 17A. Since the dispersion level calculating section 12 detects six places here, $b_{11}=6$.

As to the deviations where the absolute values obtained by the dispersion level calculating section 12 are the first threshold or more, a total of the absolute values of the deviations is calculated by the dispersion level calculating section 12 (here, the calculated value is denoted by $h_{11}$). Since the deviations in (1) to (6) of FIG. 17A are 0.51, 0.51, 0.50, 0.50, 0.53, and 0.54, when a total of these values is calculated by the dispersion level calculating section 12, $h_{11}=3.09$.

The dispersion level calculating section 12, then, obtains the deviation of the force in the insertion direction, and the dispersion level calculating section 12 counts places where the absolute value of the deviation obtained by the dispersion level calculating section 12 is the second threshold or more (here, the counted value is determined as $b_{12}$). With respect to FIG. 16(A), the places where the absolute value is the first threshold or more are shown in (7) to (10) of FIG. 17A. Since the dispersion level calculating section 12 detects four places here, $b_{12}=4$.

As to the deviations where absolute values obtained by the dispersion level calculating section 12 are the second threshold or more, a total of the absolute values of the deviations is calculated by the dispersion level calculating section 12 (here, the calculated value is denoted by $h_{12}$).

Figure 17A:
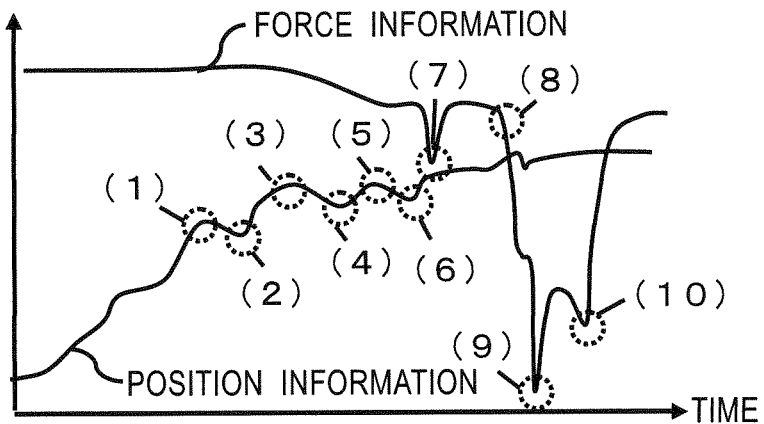
FIG. 17A is a graph illustrating the relationship between the position and the force of a person at the time of the teaching according to the first embodiment of the present invention.

Since the deviations in (7) to (10) of FIG. 17A are 0.7, 0.53, 1.3, and 0.60, when a total of these values is calculated by the dispersion level calculating section 12, $h_{12}=3.13$. The dispersion level $B_1$ is 16.22 according to ($c_1 \times b_{11} + c_2 \times b_{12} + c_3 \times h_{11} + c_4 \times h_{12}$). In this example, all $c_1, c_2, c_3$, and $c_4$ are 1.0 that are the constants.

Similarly in FIG. 16(B), the dispersion level calculating section 12 obtains the deviation of the position in the insertion direction, and the dispersion level calculating section 12 counts places where the absolute value of the deviation obtained by the dispersion level calculating section 12 is the first threshold or more (here, the counted value is determined as $b_{21}$). With respect to FIG. 16(B), the places where the absolute value is the first threshold or more are shown in (11) to (12) of FIG. 17B. Since the dispersion level calculating section 12 detects two places here, $b_{21}=2$.

As to the deviations where absolute values of the deviations obtained by the dispersion level calculating section 12 are the first threshold or more, a total of the absolute values of the deviations is calculated by the dispersion level calculating section 12 (here, the calculated value is denoted by $h_{21}$).

Figure 17B:
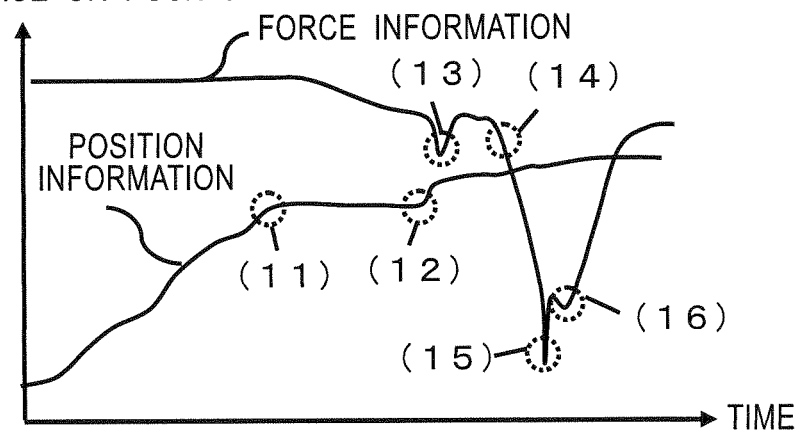
FIG. 17B is a graph illustrating the relationship between the position and the force of a person at the time of the teaching according to the first embodiment of the present invention.

Since the deviations in (11) to (12) of FIG. 17B are 0.51 and 0.53, when a total of these values is calculated by the dispersion level calculating section 12, $h_{21}=1.04$.

The dispersion level calculating section 12, then, obtains the deviation of the force in the insertion direction, and the dispersion level calculating section 12 counts places where the absolute value of the deviation obtained by the dispersion level calculating section 12 is the second threshold or more (here, the counted value is determined as $b_{22}$). With respect to FIG. 16(B), the places where the absolute value is the second threshold or more are shown in (13) to (16) of FIG. 17B. Since the dispersion level calculating section 12 detects four places here, $b_{22}=4$.

As to the deviations where absolute values of the deviations obtained by the dispersion level calculating section 12 are the second threshold or more, a total of the absolute values of the deviations is calculated by the dispersion level calculating section 12 (here, the calculated value is denoted by $h_{22}$).

Since the deviations in (13) to (16) of FIG. 17B are 0.51, 0.52, 0.55, and 0.60, when a total of these values is calculated by the dispersion level calculating section 12, $h_{22}=2.18$. The dispersion level $B_2$ becomes 9.22 ($B_2=9.22$) according to the formula: ($b_2+b_{22}+h_{21}+h_{22}$).

In step S152, the reproduction control section 63 of the reproducing section 62 issues a command to the reaction time calculating section 15 so that the reaction time calculating section 15 calculates a reaction time using two pieces of the teaching information and the environmental information in FIG. 16(A) and FIG. 16(B) obtained at the teaching time. In this example, the reaction time calculating section 15 calculates the reaction time based on information about the position and the force only in the insertion direction shown in FIG. 16(A) and FIG. 16(B). The first threshold of the reaction time calculating section 15 is 0.5 (N), and the second threshold is 0.2(N).

Figure 18A:
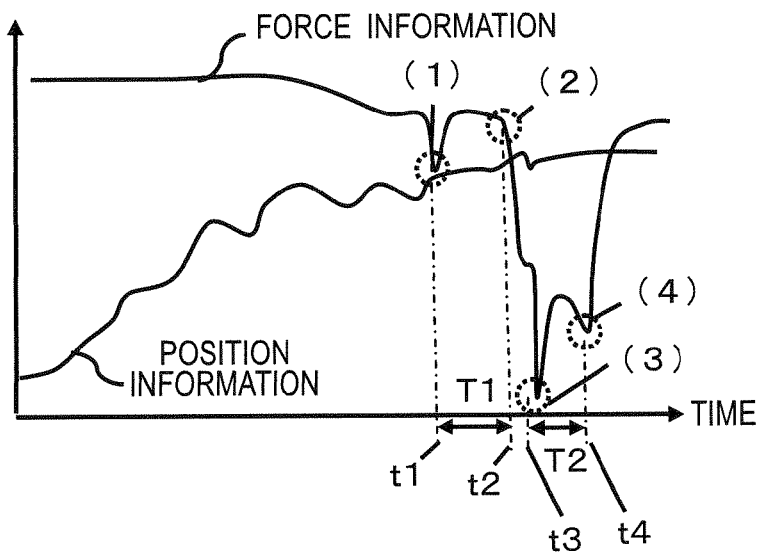
FIG. 18A is a graph illustrating the relationship between the position and the force of a person at the time of the teaching according to the first embodiment of the present invention.

Concretely, the deviations of the force in the insertion direction are obtained by the dispersion level calculating section 12, and the dispersion level calculating section 12 detects a time point at which codes of the deviations obtained by the dispersion level calculating section 12 are the same as each other and the absolute values are the first threshold or more as a time point $t_1$ at which the person 16 receives sense stimuli (the unit is msec. Hereinafter, the time point $t_1$ is defined as an information change point) that is 3013 msec. (1) of FIG. 18A represents the detected time point $t_1$. Then, at the time point $t_2$ (the unit is msec. Hereinafter, it is defined as the action change point) at which the person 16 takes an action after the time point t1, the dispersion level calculating section 12 obtains a deviation of the force in the insertion direction after the information change point, and detects a time point at which the codes of the deviations are the same as each other and the absolute values are the second threshold or more. Concretely, the dispersion level calculating section 12 detects the time point $t_2=3363$ msec, and (2) of FIG. 18A represents the time point $t_2$ detected by the dispersion level calculating section 12. The reaction time calculating section 15 calculates the reaction time $T_1$ according to ($t_2-t_1$) (the unit is msec), and in this example, $T_1=350$ msec. Similarly, the dispersion level calculating section 12 detects (3) of FIG. 18A as a time point $t_3$ at which the person 16 receives sense stimuli, and the dispersion level calculating section 12 detects (4) of FIG. 18A as a time point $t_4$ at which the person 16 takes an action. The reaction time calculating section 15 calculates the reaction time $T_2$ according to $(t_4-t_3)$, and in this example, $T_2$=320 msec. Further, similarly in FIG. 18B, the dispersion level calculating section 12 detects (5) of FIG. 18B as a time point $t_5$ at which the person 16 receives sense stimuli, and the dispersion level calculating section 12 detects (6) of FIG. 18B as a time point $t_6$ at which the person 16 takes an action. The reaction time $T_3$ is calculated according to $(t_6-t_5)$, and in this example, $T_3$=230 msec. Further, the dispersion level calculating section 12 detects (7) of FIG. 18B as a time point $t_7$ at which the person 16 receives sense stimuli, and the dispersion level calculating section 12 detects (8) of FIG. 18B as a time point $t_8$ at which the person 16 takes an action. The reaction time calculating section 15 calculates the reaction time $T_4$ according to $(t_8-t_7)$, and in this example, $T_4$=105 msec.

Figure 16:
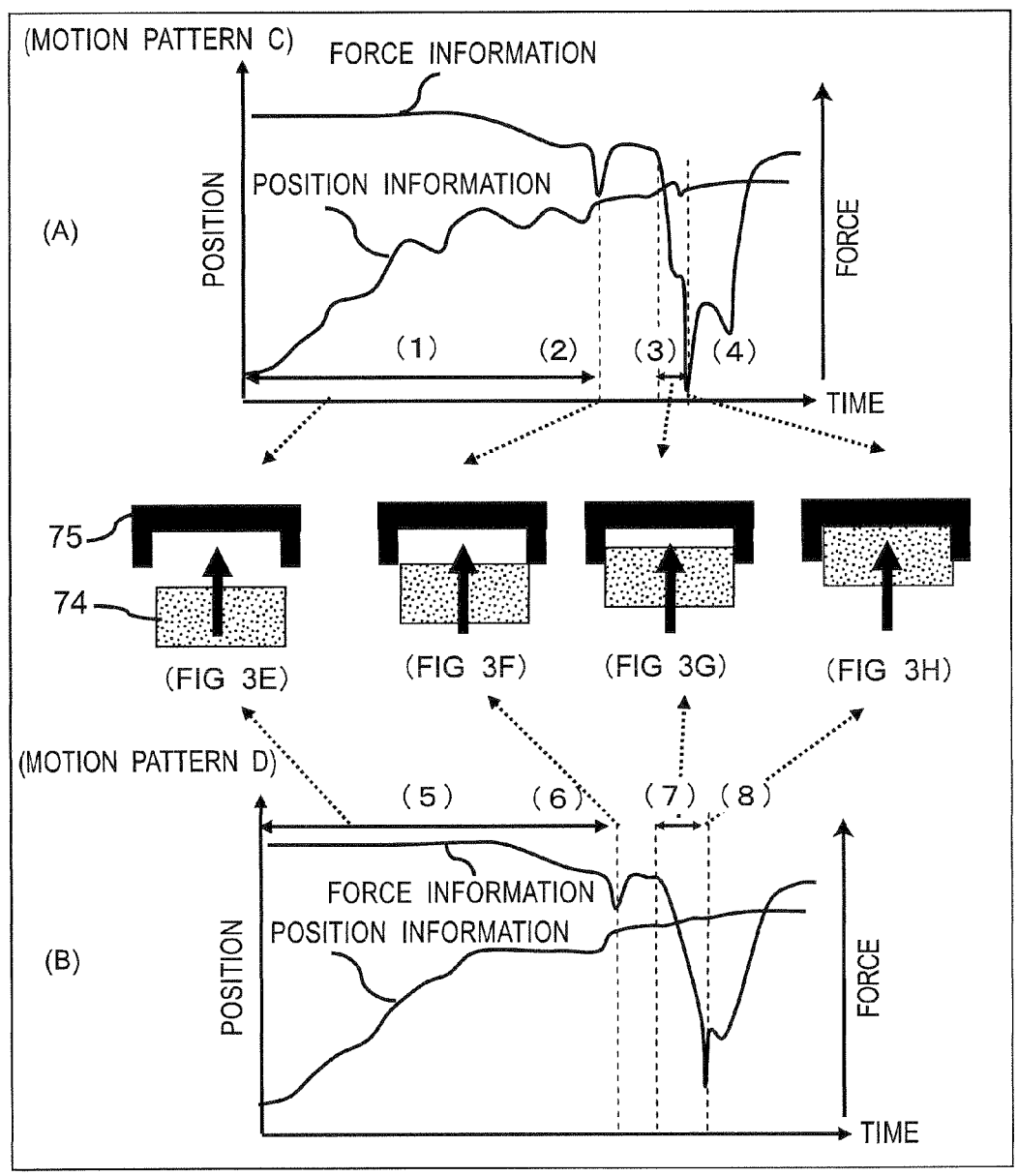
FIG. 16 is a graph illustrating a relationship between a position and a force of a person at the time of the teaching according to the first embodiment of the present invention.

In step S153, the reproduction control section 63 of the reproducing section 62 issues a command to the order determining section 11 so that the order determining section 11 determines which operation in (A) of FIG. 16 and (B) of FIG. 16 provides a higher skilled level.

The order determining section 11 counts the number of pieces of used information in the information about the force, the object position, and the sound volume of the environmental information in the environmental information database 18 as the number of used environmental information E. In this example, since the teaching is performed by using only the force both in FIG. 16(A) and FIG. 16(B), the number of used environmental information $E_1$=1 in FIG. 16(A), and the number of used environmental information $E_2$=1 in FIG. 16(B). Further, as shown in FIG. 18A, the total reaction time TT is calculated based on the reaction times $T_1$ and $T_2$ calculated by the reaction time calculating section 15. In this example, since $T_1$=350 msec, and $T_2$=320 msec, all the reaction times are added, so that the total reaction time $TT_1$=670 msec. Similarly in FIG. 18B, since the reaction time $T_3$=230 msec, and $T_4$=105 msec, the total reaction time $TT_2$=335 msec.

The dispersion levels calculated by the dispersion level calculating section 12 is calculated as $B_1$=16.22 and $B_2$=9.22, respectively. Skill levels in FIG. 16(A) and FIG. 16(B) are calculated according to P=1/(aE+bB+cT), $P_1$=$(aE_1+bB_1+cTT_1)$ (however, a, b, and c are constants, and in this example, a=100, b=10, and c=1), and $P_1$=0.00107. Similarly, the skill level $P_2$=0.00173 in FIG. 16(B). The calculated skill level P is stored in the teaching information database 17A via the database input/output section 10. Since a motion of a larger value is determined as a motion of a higher skill, the order determining section 11 determines motions in FIG. 16(B) and FIG. 16(A) in this order as motions of higher skill level.

In step S154, the reproduction control section 63 of the reproducing section 62 issues a command to the control law extracting section 20 so that the control law extracting section 20 extracts a sensory feedback law. The sensory feedback law extracted by the control law extracting section 20 is outputted from the control law extracting section 20 to the motion creating section 13. In this example, the control law extracting section 20 extracts feedback laws from the teaching information and environmental information in FIG. 16(A) and FIG. 16(B). The feedback laws are extracted by the control law extracting section 20 based on the information change point and the action change point detected by the dispersion level calculating section 12 in step S152.

Concretely, the deviations of the force in the insertion direction are obtained by the dispersion level calculating section 12, and the dispersion level calculating section 12 detects a time point at which codes of the deviations obtained by the dispersion level calculating section 12 are the same as each other and the absolute values are the first threshold or more as a time point $t_1$ ((1) in FIG. 18A: information change point) at which the person 16 receives sense stimuli. Then, as to the time point $t_2$ after the time point $t_1$ at which the person 16 takes an action (the action change point), the dispersion level calculating section 12 obtains deviations of the force in the insertion direction after the information change point, and detects a time point at which the codes of the deviations are the same as each other and the absolute values are the second threshold or more. Concretely, $t_2$ of (2) in FIG. 18A is detected by the dispersion level calculating section 12. Thereafter, the dispersion level calculating section 12 detects the information change point and the action change point after the time point $t_2$ with the same method. The dispersion level calculating section 12 detects the information change point and the action change point detected by the dispersion level calculating section 12 as the information change point $t_3$ and the action change point $t_4$ as shown in FIG. 18A.

With the first feedback law SB11, the control law extracting section 20 approximates information about the force from the time point of detecting the action change point $t_2$ to the time point of the next information change point $t_3$ according to an approximate curve. The approximate curve is calculated by using, for example, the least squares method. The control law extracting section 20 extracts the second feedback law SB12 between the time point of detecting the action change point $t_4$ to a next information change point, but in this example, since the information change point after the action change point $t_4$ is not detected, the control law extracting section 20 performs approximation using the approximate curve from the action change point $t_4$ to a time point at which the force information ends. The calculated feedback laws SB11 and SB12 are shown in FIG. 18C.

Figure 18B:
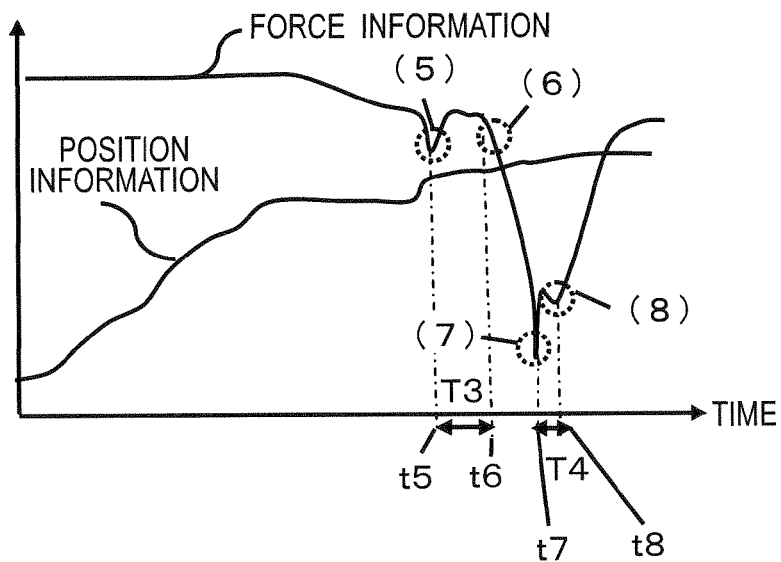
FIG. 18B is a graph illustrating the relationship between the position and the force of a person at the time of the teaching according to the first embodiment of the present invention.
Figure 18C:
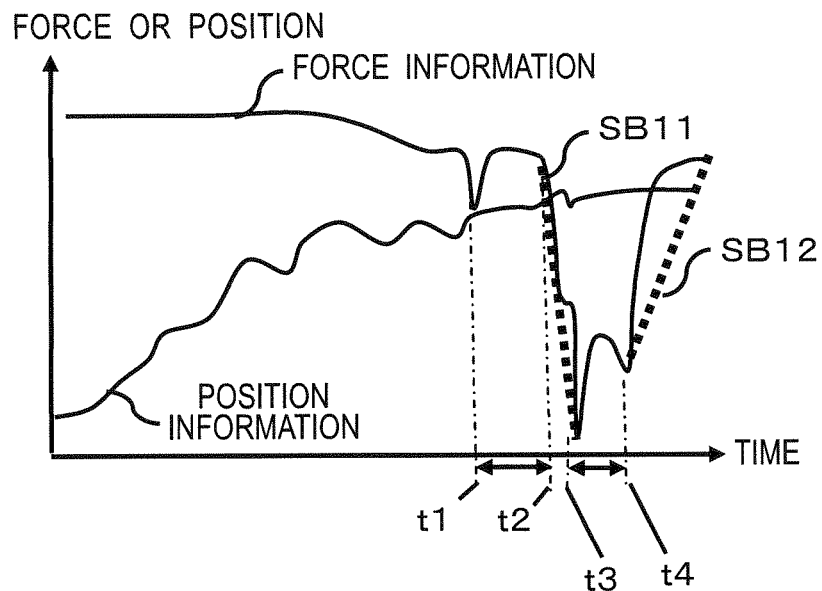
FIG. 18C is a graph illustrating the relationship between the position and the force of a person at the time of the teaching according to the first embodiment of the present invention.
Figure 18D:
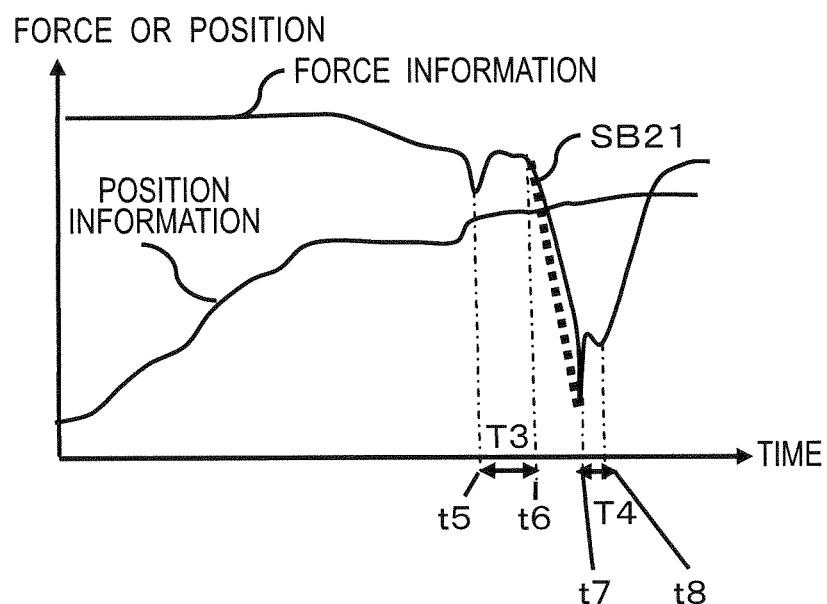
FIG. 18D is a graph illustrating the relationship between the position and the force of a person at the time of the teaching according to the first embodiment of the present invention.

Similarly in FIG. 18B, the control law extracting section 20 extracts a feedback law. With the first feedback law SB21, the control law extracting section 20 approximates information about the force from the time point of detecting an action change point $t_6$ after the information change point $t_5$ to the time point of a next information change point $t_7$ according to an approximate curve. The approximate curve is calculated by using, for example, the least squares method. After detecting an action change point $t_8$ after the information change point $t_7$, the control law extracting section 20 extracts the second feedback law SB22, but since the reaction time $T_4$=105 msec between the information change point $t_7$ to the action change point $t_8$ is a third threshold (the threshold for extracting sensory feedback) (in this example, 200 msec) or less, the control law extracting section 20 determines that the person 16 does not perform the sensory feedback but teaches based on speculation, and a second sensory feedback is not extracted by the control law extracting section 20. The feedback law SB21 calculated by the control law extracting section 20 is shown in FIG. 18D.

In step S155, the reproducing section 62 of the motion creating section 13 reproduces the motion of the robot arm 5 based on the sensory feedback laws extracted by the control law extracting section 20 and the order determined by the order determining section 11.

Figure 19:
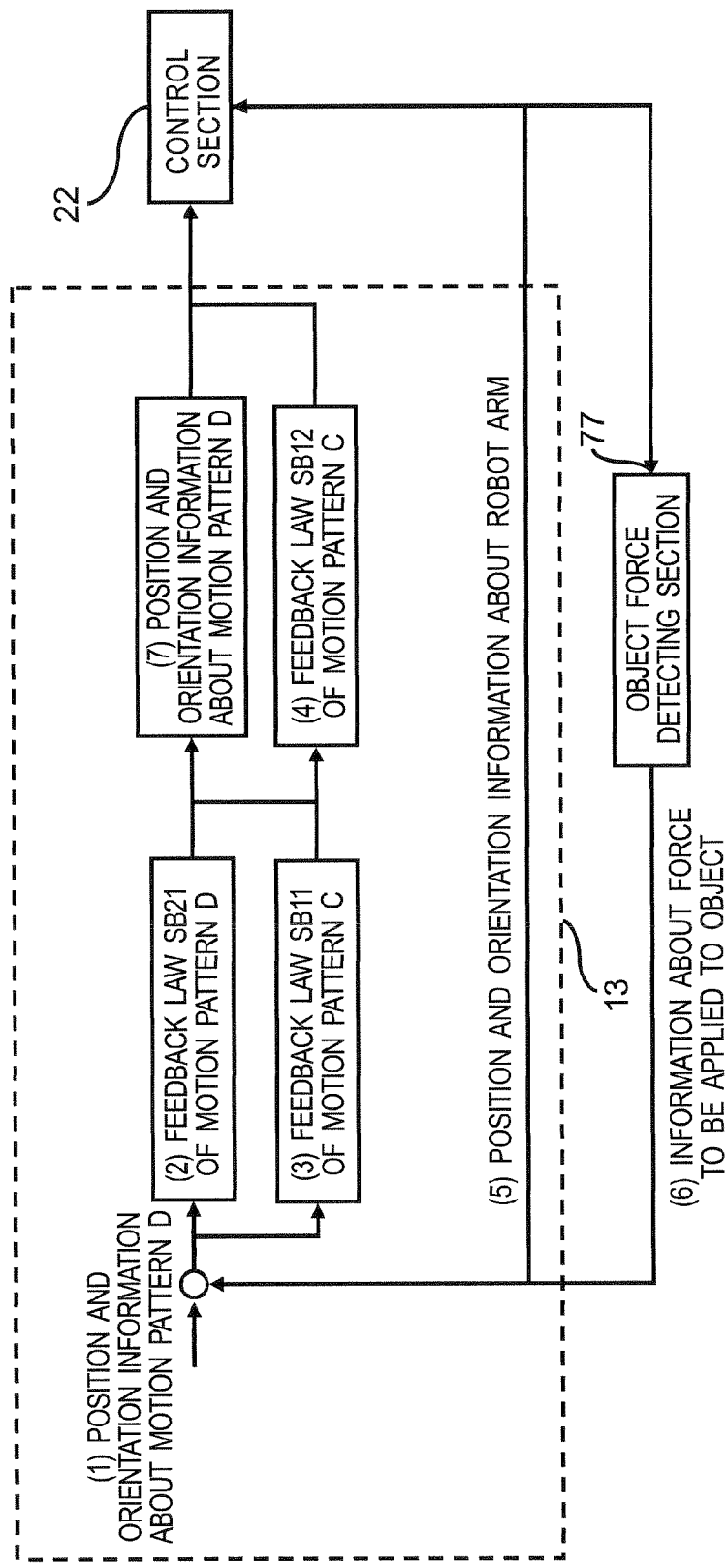
FIG. 19 is a view illustrating configurations of the motion creating section, the control section, and an object force detecting section according to the first embodiment of the present invention.

FIG. 19 illustrates a procedure for making the motion created by the motion creating section 13.

First, the order rearranging section 64 of the reproducing section 62 sets teaching information having highest priority (namely, teaching information of high skill level) to desired position and orientation information ((1) in FIG. 19). In this example, since the priority of the teaching information of the motion pattern D of FIG. 16(B) is high in the order determining section 11, the order rearranging section 64 sets the position and orientation information of the motion pattern D as well as the position of the motion pattern D in the insertion direction as desired information. In this example, since the desired information is the position information, the information along with the position and orientation information about the motion pattern D in FIG. 16(B) is outputted from the order rearranging section 64 to the control section 22 so that the motion is made in the position control mode in all the positions and orientation directions. The control section 22 makes a control so that the motion is made in the position control mode based on the position and orientation information including FIG. 16(B).

Figure 20A:
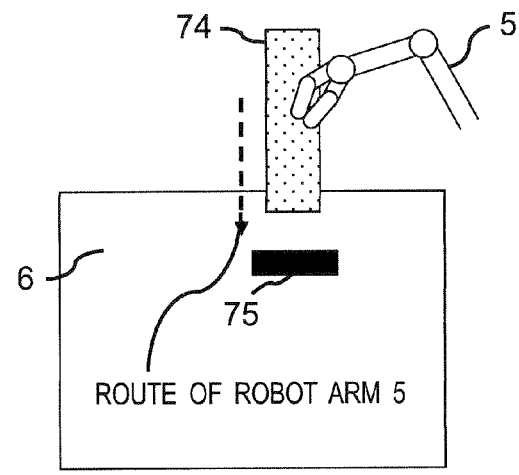
FIG. 20A is a view describing a motion for inserting the flexible substrate according to the first embodiment of the present invention.

In this example, as shown in FIG. 20A, the flexible substrate 74 starts to insert towards the insertion slot 75 in the position control mode. Since the robot arm 5 moves using the position in FIG. 16(B) with lower dispersion level, a fluctuation in the position is less at a section (5) in FIG. 16(B) corresponding to FIG. 3E than the section (1) in FIG. 16(A) corresponding to FIG. 3E. For this reason, the flexible substrate 74 can stably move to the insertion slot 75. During the motion, the position and orientation information about the robot arm 5 is inputted into the reproducing section 62 of the motion creating section 13 via the control section 22 (FIG. 19(5)). In addition, the force to be applied to the object (in this example, the flexible substrate 74) is measured by an object force detecting section 78, and is inputted from the object force detecting section 78 into the reproducing section 62 of the motion creating section 13 (FIG. 19(6)).

Figure 20B:
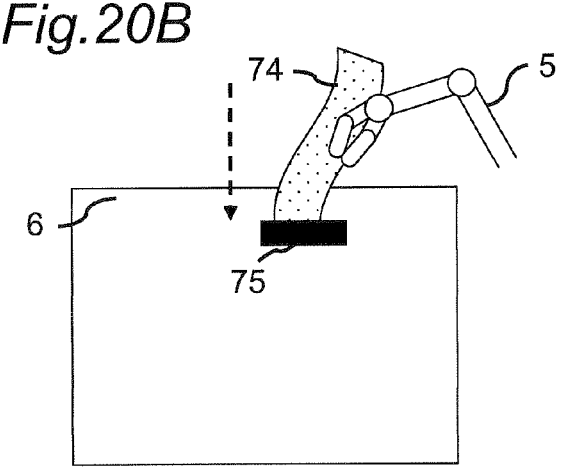
FIG. 20B is a view describing the motion for inserting the flexible substrate according to the first embodiment of the present invention.

Then, as shown in FIG. 20B, the flexible substrate 74 contacts with the insertion slot 75. When sensory feedback laws extracted at that time are present, the order rearranging section 64 applies them. As to the sensory feedback law applied by the order rearranging section 64, the sensory feedback law obtained from the teaching information with the highest propriety determined by the order determining section 11 is applied by the motion creating section 13. At this time, the determining section 65 determines that the motion is not properly made, the motion creating section 13 applies a sensory feedback law obtained from the teaching information of next priority. This means that when the determining section 65 determines that the motion is not properly made by using the feedback law with higher skill level, the feedback law with second highest skill level is used. On the other hand, when the determining section 65 determines that the motion is made properly, the order rearranging section 64 does not apply feedback laws extracted from the teaching information and the environmental information with lower priority. In this example, the sensory feedback law SB21 extracted at and after the action change point $t_6$ in FIG. 18B as the more skilled motion is applied (FIG. 19(2)), and when the determining section 65 determines that the motion is not properly made, the feedback law SB11 (FIG. 19(3)) extracted at and after the action change point $t_4$ in FIG. 18A as an unskilled motion is applied in the motion creating section 13.

Concretely, the dispersion level calculating section 12 detects a time point at which the fore detected by the object force detecting section 78 is a deviation of the force detected at the time point $t_5$ in FIG. 18B or more (FIG. 18B(5)), and a force, which is approximated by the control law extracting section 20 from the action change point $t_6$ after that time point as sensory feedback law SB21, is outputted as a desired value from the control law extracting section 20 to the control section 22. In this case, since the force is the desired value, the control mode is outputted from the motion creating section 13 to the control section 22 so that the control is made by the force control mode.

Figure 20C:
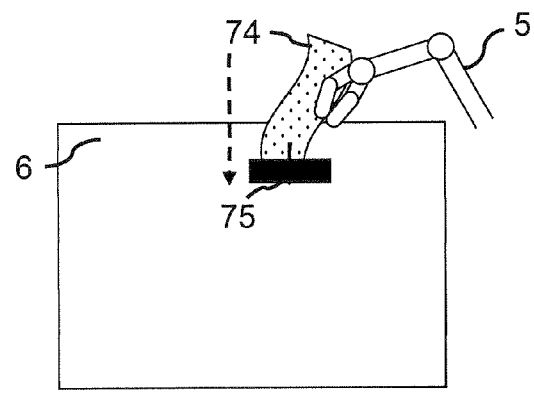
FIG. 20C is a view describing the motion for inserting the flexible substrate according to the first embodiment of the present invention.

Accordingly, the sensory feedback law extracted from teaching information with the highest skill level is applied in the order rearranging section 64, so that the force for making the flexible substrate 74 contact with the insertion slot 75 is made to be minimum, and stable motion information with less fluctuation in the position and the force at the insertion time can be created (FIG. 20C). Further, the force to be applied to the flexible substrate 74 detected by the object force detecting section 78 is fed back to the control section 22, and thus the motion adapting to the flexibility of the flexible substrate 74 can be created.

Figure 35A:
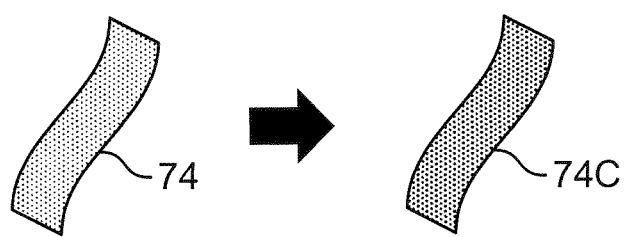
FIG. 35A is a view describing the flexible substrate according to the first embodiment of the present invention.

On the other hand, reproduction in the case where the flexible substrate 74 is remodeled into a flexible substrate 74C that is harder than the flexible substrate 74 at the time of teaching as shown in FIG. 35A is described.

In this example, a width and a length of the flexible substrate 74C are the same as those at the teaching time. The reproducing section 62 makes a motion to the insertion slot 75 shown in FIG. 20A as shown in (1) of FIG. 19 with teaching information having high skill level being desired information.

Then, the reproducing section 62 applies the sensory feedback law SB21 and makes a motion in the force control mode. However, since the flexible substrate 74C becomes hard with an approximate curve of the force from the time point $t_6$ to the time point $t_7$ in FIG. 18B being a desired, the force from the time point $t_6$ to the time point $t_7$ is weak, and the insertion motion is suspended. When the insertion motion is suspended, the reproducing section 62 applies the sensory feedback law extracted from teaching information with next priority. The determining section 65 of the motion creating section 13 determine whether the completion of the insertion succeeds. Concretely, at the time point when the insertion is completed, the control section 22 makes the motion for returning to a front of the person and simultaneously obtains the hand position of the robot arm 5. When the insertion is not completed, the motion for returning to the front does not provide any change in the insertion state, and thus the obtained hand position does not fluctuate. However, when the insertion is not completed, the returning to the front moves the flexible substrate 74 to the front, and thus the obtained hand position fluctuates. When the obtained hand position fluctuates, the determining section 65 determines that the insertion is not proper. When the determining section 65 determines whether the insertion succeeds during the motion, and the robot arm 5 is moved by a command value of the position or the force but the robot arm 5 does not move according to the command value, the determining section 65 determine the motion as failure. Concretely, when the motion is hindered by an obstacle and cannot be made to a position in the case where the motion is made by the position command value, or the motion is made by the force command value but the force cannot be applied according to the force command value due to non-contact with a workpiece, the determining section 65 determines that the insertion fails.

In this example, the sensory feedback law SB11 is applied ((3) of FIG. 19). With the sensory feedback law SB11, a stronger force is applied to the flexible substrate 74 so that the motion is made. This is because the person applies a stronger force to make the motion at the teaching time, and does the task while recognizing the contact.

When the sensory feedback law SB11 is applied, the insertion task is done by applying the force stronger than that in the sensory feedback law SB21, so that the insertion task can be done properly as shown in FIG. 20C.

Figure 20D:
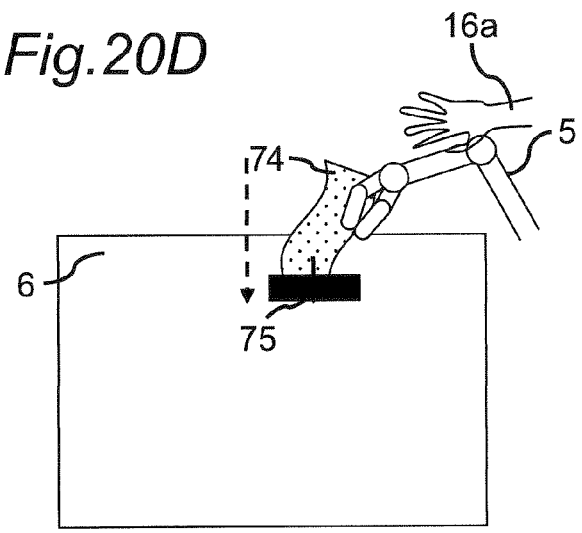
FIG. 20D is a view describing the motion for inserting the flexible substrate according to the first embodiment of the present invention.
Figure 20E:
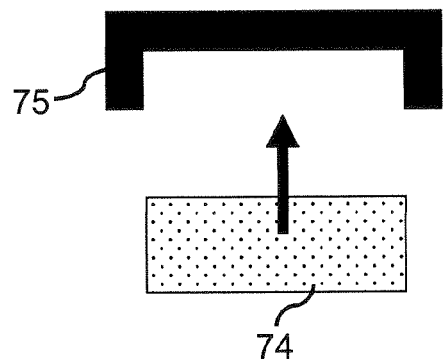
FIG. 20E is a plan view near the flexible substrate of FIG. 20A.
Figure 20F:
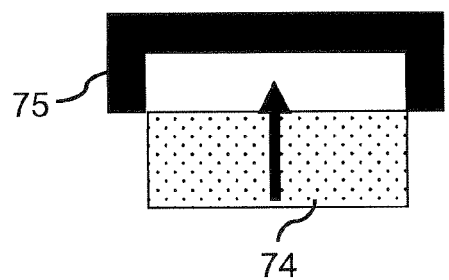
FIG. 20F is a plan view near the flexible substrate of FIG. 20B.
Figure 20G:
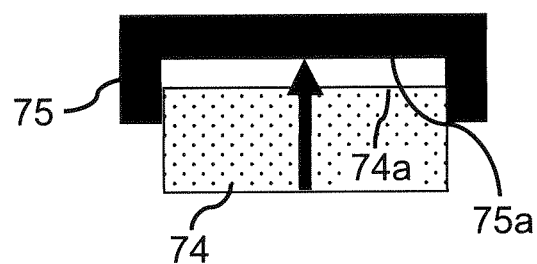
FIG. 20G is a plan view near the flexible substrate of FIG. 20C.
Figure 20H:
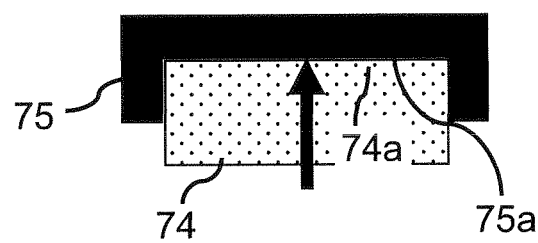
FIG. 20H is a plan view near the flexible substrate of FIG. 20D.

Then, the motion for completing the insertion of the flexible substrate 74 is described as shown in FIG. 20D. When the sensory feedback law extracted at the time point at which the flexible substrate 74 contacts with the inner bottom part of the connector is present, as shown in FIG. 20D, the order rearranging section 64 applies the sensory feedback law. As to the sensory feedback law to be applied, the sensory feedback law that is obtained from the teaching information with the highest priority determined by the order determining section 11 is applied in the order rearranging section 64, and when the determining section 65 determines that the motion is not properly made, the sensory feedback law obtained from the teaching information with the second highest priority is applied in the order rearranging section 64.

In this example, the sensory feedback laws extracted at and after the information change point $t_7$ in FIG. 18B as a more skilled motion are applied in the order rearranging section 64, but in this example, since $T_4=105$ msec is the third threshold (in this example, 200 msec) or less, the control law extracting section 20 determines that the person 16 does not carry out sensory feedback and performs the teaching based on speculation, and thus sensory feedback is not extracted.

Therefore, the dispersion level calculating section 12 detects a time point ((7) in FIG. 18B) at which the force detected by the object force detecting section 78 is the deviation of the force detected at the time point $t_7$ in FIG. 18B or more, and since sensory feedback is not present, output from the reproduction control section 63 to the control section 22 is carried out so that the motion is made in the position control mode based on the information about the position including the position in the insert direction in FIG. 18B and orientation after the time point $t_7$ ((7) in FIG. 19).

In this example, the flexible substrate 74 is slightly returned to the front at the time point at which the flexible substrate 74 contacts with the inner bottom part of the insertion slot 75. The person 16 who is skilled does not carry out sensory feedback and makes the motion based on speculation, but its trajectory less fluctuates, and thus the motion is stable.

Figure 35B:
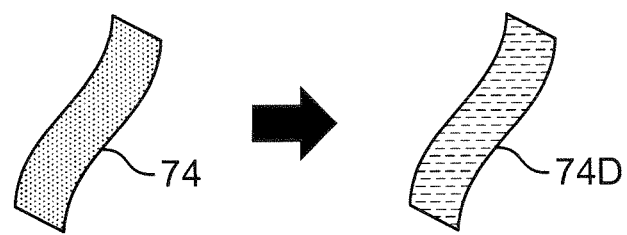
FIG. 35B is a view describing the flexible substrate according to the first embodiment of the present invention.

On the other hand, a case where the flexible substrate 74 is remodeled into a flexible substrate 74D that becomes softer than the flexible substrate 74 at the teaching time as shown in FIG. 35B is described.

In this example, as shown in FIG. 20D, since sensory feedback is not present, the motion is made in the position control mode based on the information about the position including the position in the insertion direction in FIG. 18B and the orientation after the time point $t_7$. However, since the flexible substrate 74D is soft, the flexible substrate 74D is bent at a stage of reaching the inner bottom part of the connector. Even if it is put back to the original position in (6) of FIG. 19, the bending is only corrected, and the contact force at the inner bottom part is not weakened.

As a result, an excessive load is applied to the flexible substrate 74D at the insertion completed time, and thus the flexible substrate 74D is damaged. Therefore, when the insertion motion is suspended, a sensory feedback law extracted from teaching information of next priority is applied in the order rearranging section 64. In this example, the sensory feedback law SB12 is applied in the order rearranging section 64 ((4) in FIG. 19).

The sensory feedback law SB12 controls the force so that when the strong force to the flexible substrate 74 is detected, the force is weakened. The bending of the flexible substrate 74D is corrected by the sensory feedback law SB12, and the force is controlled until the contact force at the inner bottom part is further weakened. For this reason, the motion can be made without applying a load to the flexible substrate 74D.

In this example, the description is given by using two pieces of the teaching information about a skilled person and an unskilled person. Similarly to a case of teaching information about three or more teachers with different skill levels, the order determining section determines the order of plurality of pieces of the teaching information, and the motion creating section 13 applies feedback in decreasing order of skill level based on the teaching information with the highest priority.

According to the first embodiment, the motion creating section 13 combines the teaching information at the time of being unskilled in the task with the information at the time of being skilled in the teaching task so as to create a motion, thereby enabling the motion flexible to the environmental fluctuation to be created. Further, since the person 16 can directly operate and teach the robot arm 5, even if the person 16 does not have knowledge of the robot, the person 16 can perform the operation intuitively. Therefore, the person 16 can easily teach the motion of the robot arm 5.

Second Embodiment

Figure 21:
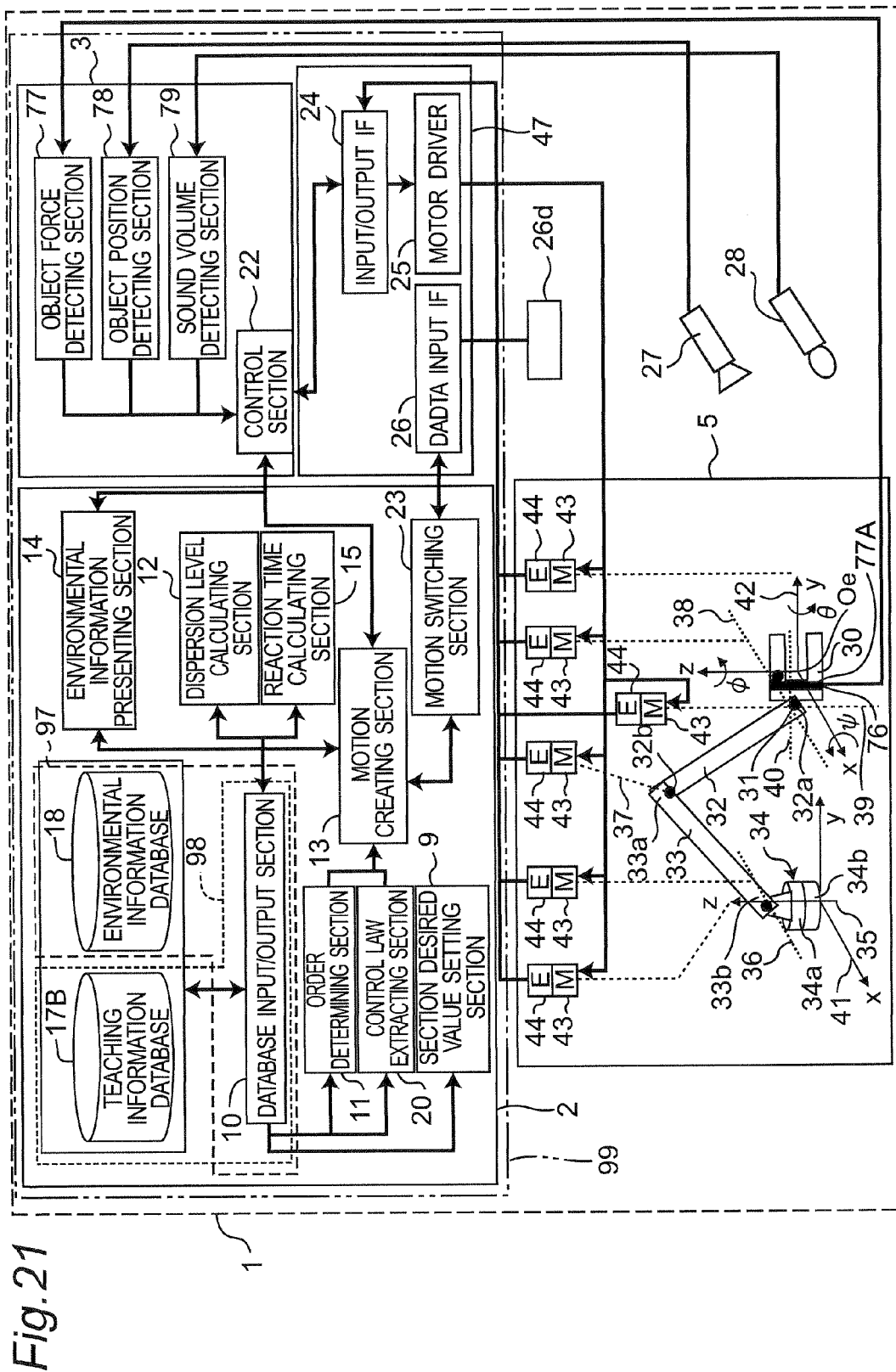
FIG. 21 is a block diagram illustrating a detailed configuration of a robot system according to a second embodiment of the present invention.
Figure 23:
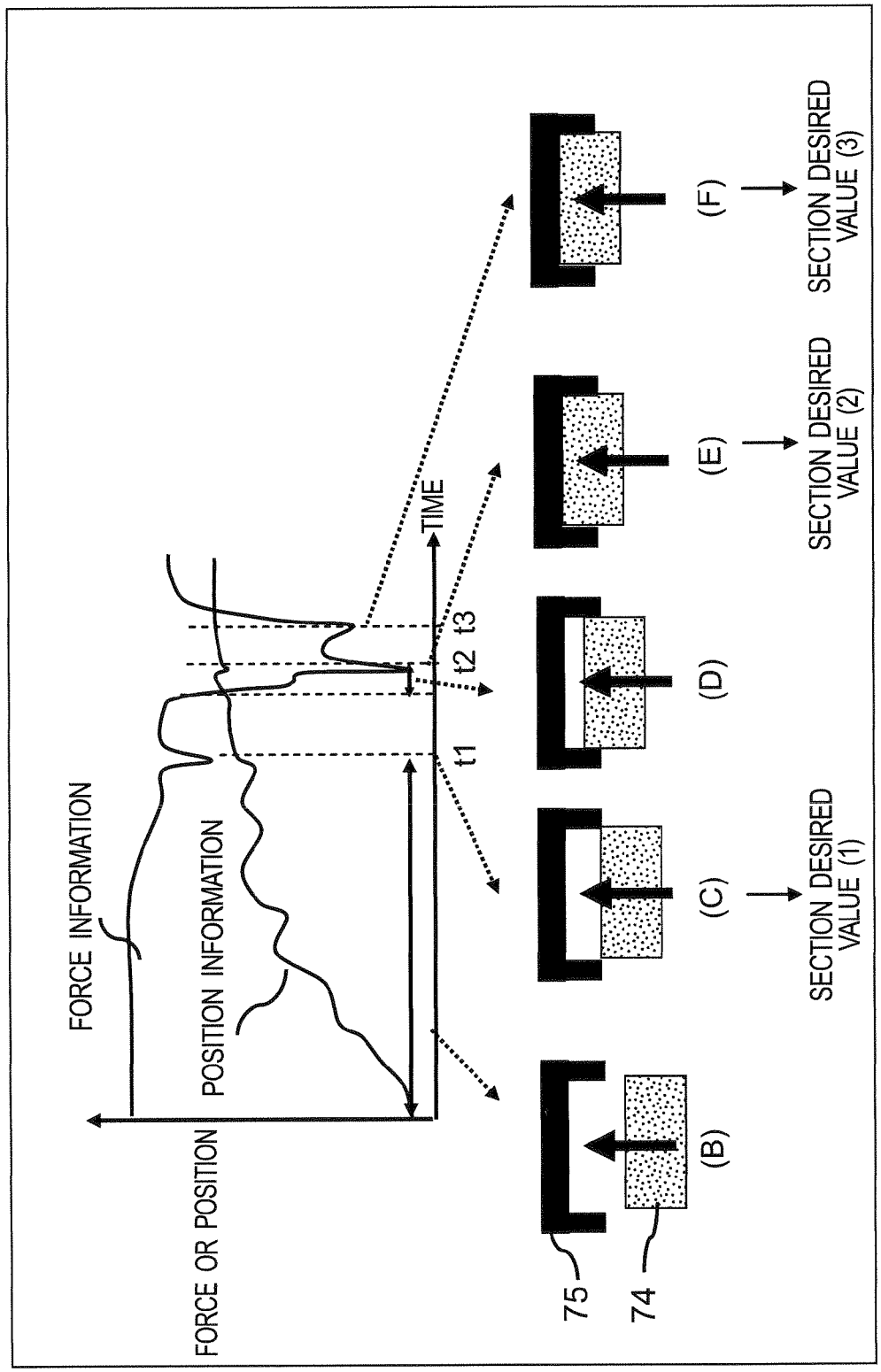
FIG. 23 is a graph illustrating a relationship between the position and the force of a person at the time of the teaching according to the second embodiment of the present invention.

A second embodiment of the present invention is described by giving, similarly to the first embodiment, an example of the task for inserting the flexible substrate 74 into the insertion slot 75 of the connector using the robot system 1 as shown in the FIG. 21.

Since basic configurations of the control device 3, the robot arm 5, and the peripheral device 47 of the robot arm 5 according to the second embodiment of the present invention are similar to the case of the first embodiment, the description of the common parts is omitted, and only different parts are described in detail below.

FIG. 21 is a detailed configurational view illustrating the robot arm 5, the control device 3 of the robot arm 5, the motion creating apparatus 2 for creating the motion of the robot arm 5, and the peripheral device 47.

Since the environmental information database 18 of the motion creating apparatus 2, the database input/output section 10, and the control law extracting section 20 are similar to those in the first embodiment, description thereof is omitted.

The different parts of the motion creating apparatus 2 are described in detail below.

—Teaching Information Database 17B—

A teaching information database 17B stores information (hereinafter, teaching information) for teaching the motion of the robot arm 5 including a hand position and an orientation of the robot arm 5 at a predetermined time, and information about a section desired value set by a section desired value setting section 9, described later.

The teaching information is created by the motion creating section 13, described later, in a manner that the person 16 operates the robot arm 5, and is inputted by the database input/output section 10 so as to be stored in the teaching information database 17B.

FIG. 22 illustrates the teaching information as the data of the teaching information database 17B. Since fields of "task ID", "motion ID", "position orientation", "time", "user ID", and "date and hour" are similar to those of the teaching information database 17A in the first embodiment, description thereof is omitted. Information about "presence/non-presence of the section desired value" represents whether the section desired value setting section 9, described later, sets the value. In a case of a time set as the section desired value, "1" is set, and when not set as the section desired value, "0" is set. "Skill level" stores a skill level for each section desired value calculated by the order determining section 11, described later.

—Section Desired Value Setting Section 9—

The database input/output section 10 inputs teaching information and environmental information into the section desired value setting section 9, and the section desired value setting section 9 sets section desired values that are end time points of plural sections obtained by dividing a task including a series of time-series teaching information that constitutes the task.

The section desired values set by the section desired value setting section 9 as well as the teaching information are stored in the teaching information database 17B via the database input/output section 10 by the section desired value setting section 9.

Concretely, in the task for inserting the flexible substrate 74 shown in FIG. 23(B) to (F), the first section desired value (1) is outputted at the time point $t_1$ at which the flexible substrate 74 contacts with the insertion slot 75. The second section desired value (2) is outputted at the time point $t_2$ at which the tip of the flexible substrate 74 contacts with the inner bottom part of the insertion slot 75 of the connector and then the force is released. The third section desired value (3) is outputted at the time point $t_3$ at which the flexible substrate 74 contacts with the inner bottom part of the insertion slot 75 of the connector, and represents a time point at which the insertion is completed.

As to the respective section desired values, as described with reference to the reaction time calculating section 15 in the first embodiment, the information change point t is calculated by the section desired value setting section 9 based on the deviation of the environmental information, and the information change point t is set as the section desired value by the section desired value setting section 9.

In this example, the section desired value setting section 9 calculates the information change point based on environmental information, but the person 16 may specify a time point desired to be set as the section desired value through the data input IF 26 (for example, buttons on the operation panel 26 in FIG. 2) in the section desired value setting section 9.

—Environmental Information Presenting Section 14—

Figure 24A:
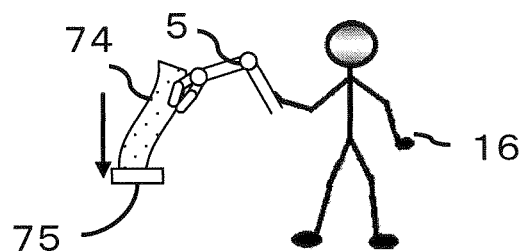
FIG. 24A is a view describing a motion of the robot for teaching by people according to the second embodiment of the present invention.
Figure 24B:
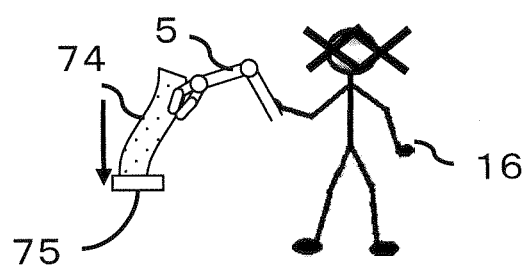
FIG. 24B is a view describing the motion of the robot for teaching by a person according to the second embodiment of the present invention.

When the environmental information that is used for the person 16 to operate the robot arm 5 and change the motion of the robot arm 5 is presented to the person, the environmental information (perceptual information) presenting section 14 presents only the environmental information, that is necessary for the task in the information about the force, the object position, and the sound volume in the environmental information necessary for the person 16 to do the task, as the force, the object position, or the sound volume. FIG. 24A illustrates a state that the teaching is carried out by using all information about the force, the object position, and the sound volume. FIG. 24B illustrates a state that the teaching is carried out by using only the force. Since the concrete environmental information database 18 is similar to that of FIG. 11A in the first embodiment, description thereof is omitted.

In the example where the person 16 directly operates the robot arm 5, information to be presented can be changed by attaching a blinder or ear pieces to the person 16. Further, as to the force, a mechanical impedance setting value at the time of the impedance control described as to the control section 22 in the first embodiment is changed so that an operational feeling of the robot arm 5 at the operation time is heavy. As a result, the force at the time of the contact with the flexible substrate is made to be hard to be transmitted to the person 16.

In a case of a master slave device where the robot arm to be operated is separated from the robot arm to be moved, information to be presented can be limited by making an image, a sound volume, or a force on the slave not to be transmitted to the master.

With the above method, the environmental information presenting section 14 limits environmental information that is necessary for completing the teaching at the time when the person 16 teaches the insertion of the flexible substrate 74. The environmental information is obtained only from the respective detecting sections (the object force detecting section 77, the object position detecting section 78, and the sound volume detecting section 79) necessary for detecting only the limited type of environmental information. As to the information presented by the environmental information presenting section 14, the same type of information may be presented for the entire teaching, or the information presented by the environmental information presenting section 14 may be changed according to the sections of the section desired values set by the section desired value setting section 9.

—Dispersion Level Calculating Section 12—

The dispersion level calculating section 12 calculates the dispersion level that is information about the dispersion levels of the teaching information and the environmental information inputted by the database input/output section 10 at respective sections up to the section desired value that is set by the section desired value setting section 9 and is inputted from the database input/output section 10. When the section desired value setting section 9 sets section desired values of the time points $t_1$, $t_2$, and $t_3$ shown in FIG. 23, the dispersion level calculating section 12 calculates the dispersion levels at a section (a section 1) from the teaching start point to the time point $t_1$, a section (section 2) from the time point $t_1$ to the time point $t_2$, and a section (section 3) from the time point $t_2$ to the time point $t_3$, and the dispersion levels as well as the information about the section desired values (the time points $t_1$, $t_2$, and $t_3$) are outputted from the dispersion level calculating section 12 to the motion creating section 13. The dispersion levels on the respective sections are calculated by the similar method to the dispersion level calculating section 12 in the first embodiment.

—Reaction Time Calculating Section 15—

When the person 16 operates the robot arm 5 to create the information about the motion of the robot arm 5 at each of the sections up to the section desired value set by the section desired value setting section 9 and inputted from the database input/output section 10, the reaction time calculating section 15 calculates reaction time for which the environmental information around the robot arm 5 is received and an action is taken. When the section desired value setting section 9 sets the section desired values of the time points $t_1$, $t_2$, and $t_3$ shown in FIG. 23, the reaction time calculating section 15 calculates the reaction times at the section (section 1) from the teaching start point to the time point $t_1$, the section (section 2) from the time point $t_1$ to the time point $t_2$, and the section (section 3) from the time point $t_2$ to the time point $t_3$. The reaction times calculated by the reaction time calculating section 15 as well as the information about the section desired values (the time points $t_1$, $t_2$, and $t_3$) are outputted from the reaction time calculating section 15 to the motion creating section 13. The reaction times at the respective sections are calculated by the method similar to the reaction time calculating section 15 in the first embodiment.

—Order Determining Section 11—

The order determining section 11 determines orders of the temporally plurality of pieces of teaching information, such as the information at the unskilled time and the information at the time of being skilled in the teaching task that created by the motion creating section 13, described later, and are stored in the teaching information database 17B via the database input/output section 10, at the respective sections of up to the section desired value set by the section desired value setting section 9 in decreasing order of skill level. The order determined by the order determining section 11 as well as the information about the section desired values (the time points $t_1$, $t_2$, and $t_3$ etc.) is outputted from the order determining section 11 to the motion creating section 13. The dispersion level calculating section 12 counts the number of used environmental information among the dispersion levels calculated at the respective sections by the dispersion level calculating section 12, the reaction times calculated at respective sections by the reaction time calculating section 15, and the information about the force, the object position, and the sound volume in the environmental information of the environmental information database 18 at the respective sections. The reaction time calculating section 15 calculates the skill level P according to the method similar to the order determining section 11 in the first embodiment based on the reaction time, the dispersion level, and the number of the used environmental information, and the order determining section 11 determines the order. The skill levels P calculated by the reaction time calculating section 15 is related to the section desired values of the teaching information by the reaction time calculating section 15, respectively, and are stored in the teaching information database 17B via the database input/output section 10. The order determined by the order determining section 11 at each section as well as the information about the section desired values (the time points $t_1$, $t_2$, and $t_3$ etc.) is outputted from the order determining section 11 to the motion creating section 13.

—Motion Switching Section 23—

When the motion switching section 23 sets the teaching mode, the teaching section 61 issues a command to the environmental information presenting section 14 so that only the information set by the environmental information presenting section 14 is presented to the person 16. Further, a command is issued to the object force detecting section 77, the object position detecting section 78, the sound volume detecting section 79 via the control section 22 so that only the information set by the environmental information presenting section 14 is detected. Then, the teaching section 61 issues a command to the control section 22 so that the motion is made by impedance control similarly to the first embodiment. Then, similarly to the first embodiment, the teaching section 61 obtains the information about the hand position and the orientation of the robot arm 5 from the control section 22 at each constant time, and stores the information as well as time in the teaching information database 17B through the database input/output section 10. Further, only the information set by the environmental information presenting section 14 in the environmental information at the time when the person 16 teaches (any one or more pieces of the force, the object position, and the sound volume information) is obtained, and the information is paired with teaching information so as to be stored in the environmental information database 18 by the database input/output section 10. Since the teaching start and the teaching end time points are similar to those in the first embodiment, description thereof is omitted.

When the motion switching section 23 sets the reproducing mode, the reproducing section 63 creates motion information at respective sections up to the section desired value set by the section desired value setting section 9, and outputs the information to the control section 22. Since the method for creating the motion at the respective sections of the section desired value is similar to the first embodiment, description thereof is omitted. Since joints of the motions created at the respective sections provide discontinuous motions, the polynomial interpolation is used, and trajectories of only the joint portions are interpolated by the desired trajectory creating section 55.

Figure 25:
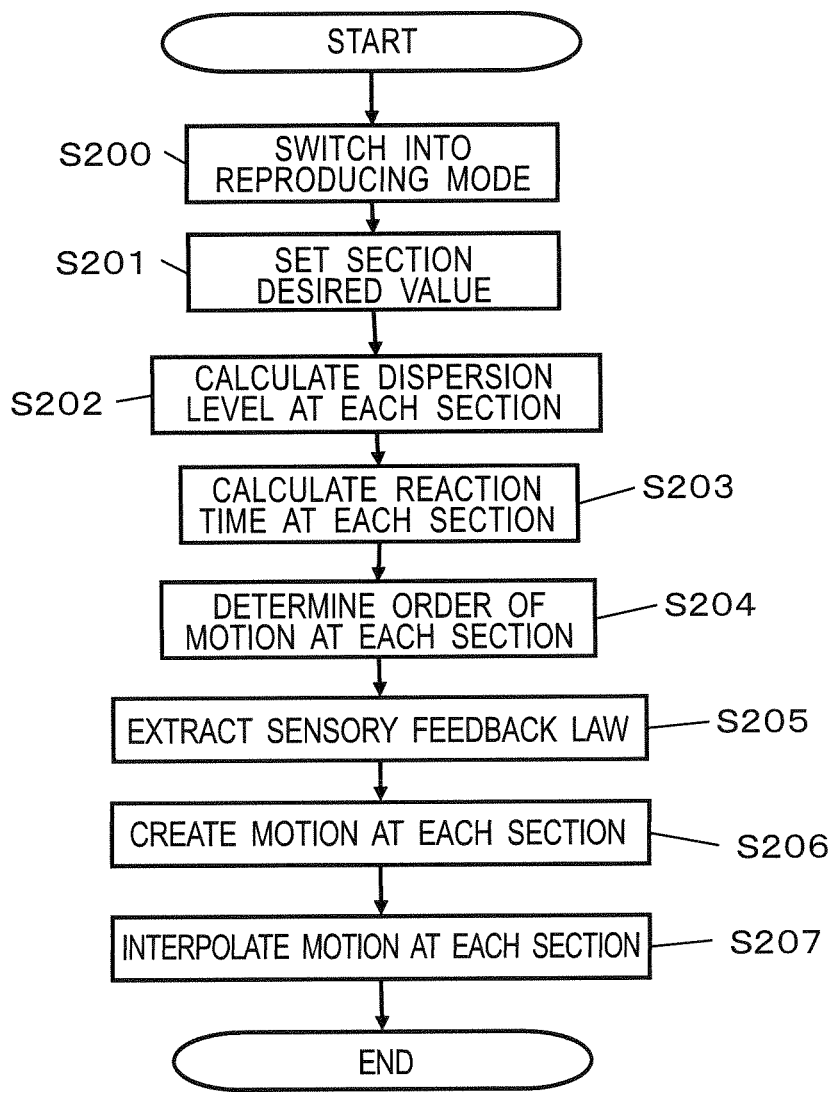
FIG. 25 is a flowchart of the motion creating section according to the second embodiment of the present invention.

Then, a procedure in which the person 16 operates the robot arm 5 so as to teach the motion of the robot arm 5 and then, the robot arm 5 automatically reproduces the motion is described with reference to a flowchart of FIG. 25.

Similarly to the first embodiment, the description refers to the task for inserting flexible substrate 74 used in recorders, televisions, or mobile telephones as an example.

Figure 26:
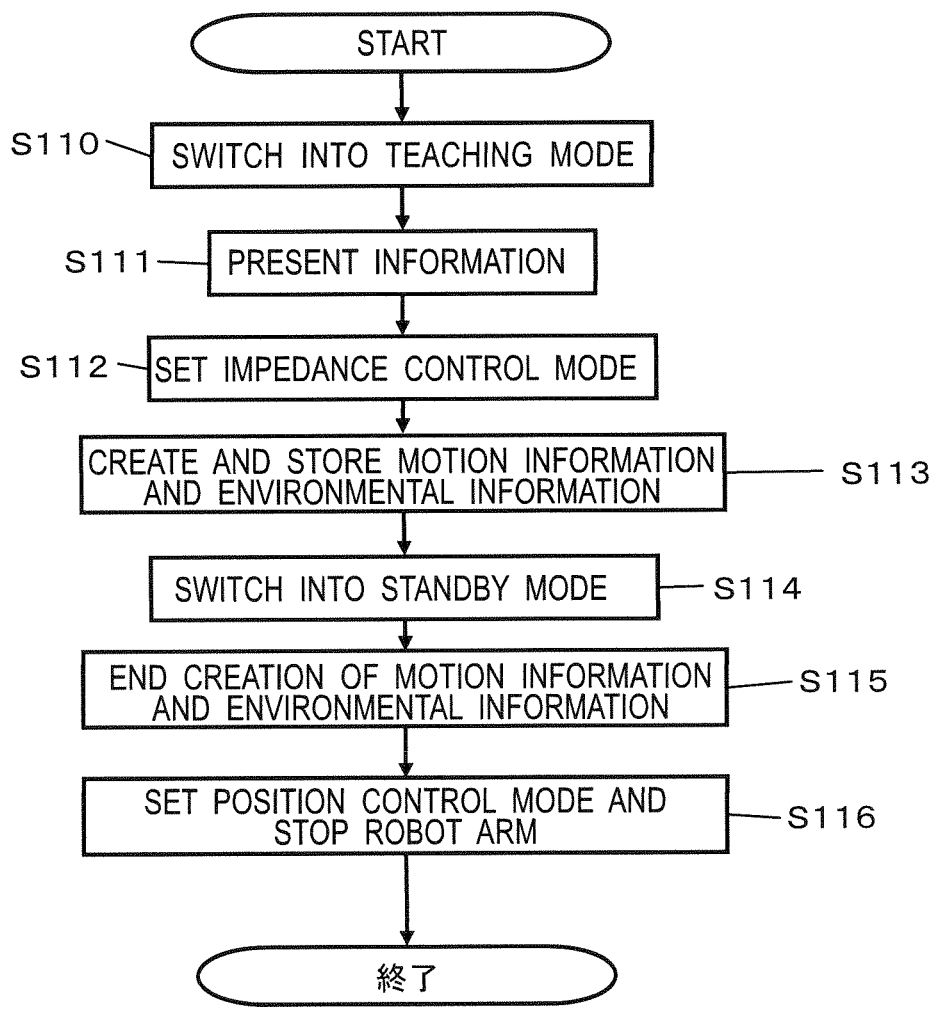
FIG. 26 is a flowchart of the motion creating section according to the second embodiment of the present invention.

The procedure for starting the teaching is performed according to a procedure in a flowchart of FIG. 26.

In step S110, the teaching mode is switched by the similar method to step S100 in the first embodiment.

Then, the teaching section 61 of the motion creating section 13 issues a command to the environmental information presenting section 14 so that the environmental information presented by the environmental information presenting section 14 is set, in step S111. FIG. 24A illustrates an example where the task for inserting the flexible substrate 74 can be taught by using all the information about force, the object position, and the sound volume, and FIG. 24B illustrates an example where the teaching is carried out by using only the force. As to FIG. 24A and FIG. 24B, the teaching is carried out depending on a lot of pieces of information according to a difference in experiences in the insertion of the flexible substrate in FIG. 24A, but when being accustomed to the task, the teaching can be carried out by using only requisite minimum information as shown in FIG. 24B. Since the teaching is carried out by using all the information about the force, the object position, and the sound volume in FIG. 24A, the teaching section 61 issues commands for detecting all the force, the object position, and the sound volume to the respective detecting sections (the object force detecting section 77, the object position detecting section 78, and the sound volume detecting section 79).

Then, the teaching section 61 issues a command for switching into the impedance control mode to the control section 22 in step S112 so that the control section 22 can move the robot arm 5 through the force applied by a person.

FIG. 3A to FIG. 3D (FIG. 3E to FIG. 3H are views viewed from the top) illustrate a procedure in which the person 16 operates and teaches the robot arm 5. The person 16 operates and teach the robot arm 5 in order of FIG. 3A, FIG. 3B, FIG. 3C, and FIG. 3D.

A condition shown in FIG. 24A is such that the teaching is carried out by using all the information about the force, the object position, and the sound volume. In this case, in step S113, the teaching section 61 of the motion creating section 13 obtains the position and orientation of the hand of the robot arm 5 at a time when the person 16 performs the operation from the control section 22 every constant time (for example, every 4 msec) using the timer 60, and issues a command to the control section 22 and the object force detecting section 78 so that the object force detecting section 78 detects the force at the time when the flexible substrate contacts with the insertion slot 75. The object position detecting section 78 detects position information about an object. The sound volume detecting section 79 detects sound volume information. The teaching section 61 relates the position and orientation of the hand detected every constant time (for example, every 4 msec) using the timer 60, the time information, the force information, the position information of the object, and the sound volume to each other, so as to generate them, and stores them in the motion information database 17 and the environmental information database 18 via the database input/output 10.

When the teaching is completed, switching into the standby mode is carried out in step S114 according to a method similar to step S103 in the first embodiment, and the creation of the motion information is ended in step S115.

The control section 22 switches the mode into the position control mode in step S116 so that the robot arm 5 stops.

Figure 27A:
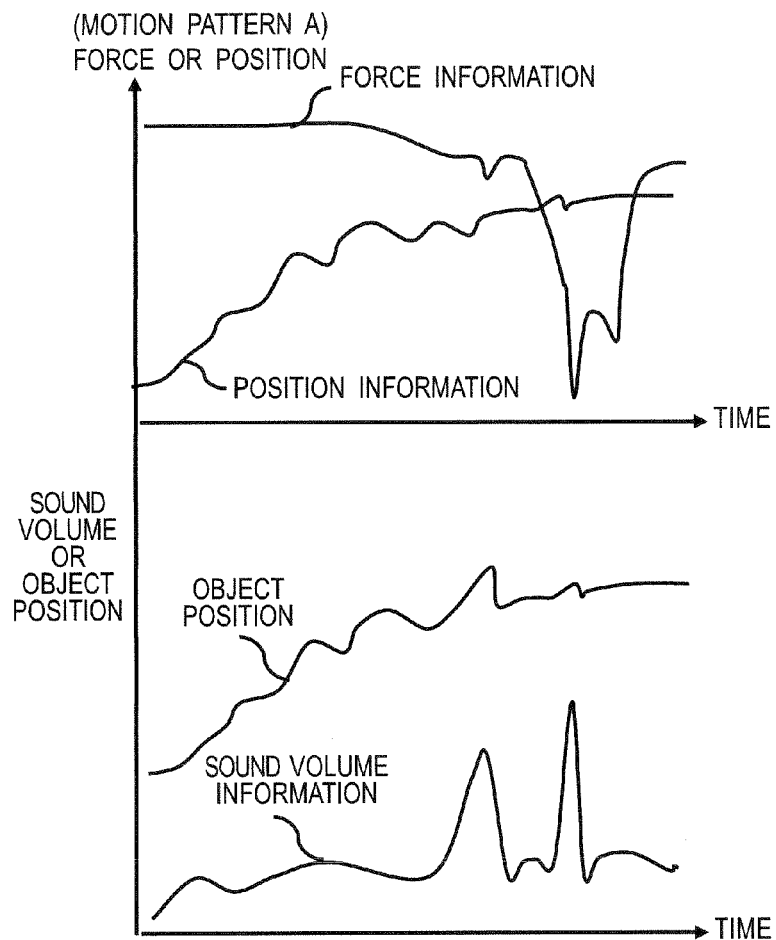
FIG. 27A is a graph illustrating a relationship between the position, the force, the object position, and a sound volume at the time of teaching by a person according to the second embodiment of the present invention.
Figure 27B:
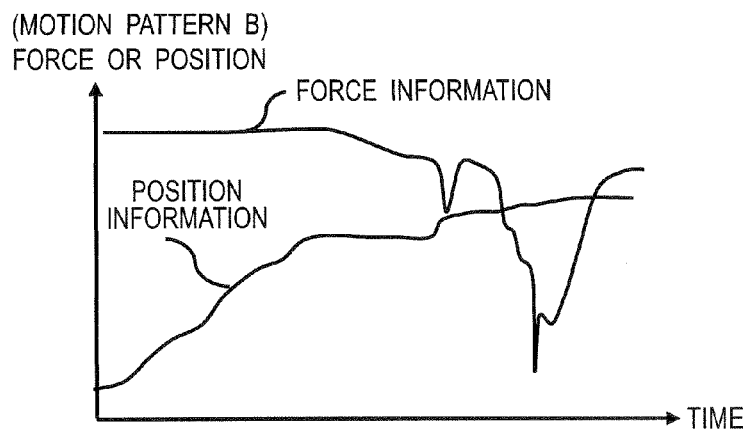
FIG. 27B is a graph illustrating the relationship between the position, the force, the object position, and the sound volume at the time of teaching by a person according to the second embodiment of the present invention.

FIG. 27A and FIG. 27B illustrate the information created by the motion creating section 13. Hereinafter, the motion in FIG. 27A is defined as a motion pattern A, and the motion in FIG. 27B is defined as a motion pattern B. FIG. 27A is a view where time-series data of the position and the force of the robot arm 5 and information about the position and the sound volume of the object only in the insertion direction are plotted. FIG. 27B is a view where the time-series data about the position and the force of the robot arm 5 only in the insertion direction is plotted.

Then, a procedure for creating the motion made automatically by the robot arm 5 based on the teaching information and the environmental information in FIG. 27A and FIG. 27B is described below with reference to FIG. 25.

When the automatic reproduction is started by the robot 1 in step S200, similarly to the first embodiment, the person 16 inputs a task starting command to the motion creating section 13 through input from the data input IF 26 into the motion switching section 23 (for example, the task start button 26c of the operation panel 26 in FIG. 2 is pressed). The motion creating section 13 receives the input from the motion switching section 23 (in this example, the reproducing mode) so that the reproducing section 62 of the motion creating section 13 starts the reproduction of the motion.

Then, in step S201, the reproduction control section 63 of the reproducing section 62 issues a command to the section desired value setting section 9 so that the section desired value setting section 9 sets section desired values based on the environmental information in FIG. 27A and FIG. 27B obtained at the teaching time. The information about the section desired value set by the section desired value setting section 9 as well as the teaching information is stored in the teaching information database 17B via the database input/output section 10. As to the respective section desired values, as described in the reaction time calculation 15 of the first embodiment, the section desired value setting section 9 detects the information change point t based on the environmental information, and sets the information change point t detected by the section desired value setting section 9 as the section desired value.

A concrete example of the section desired value setting section 9 is described below.

Figure 28A:
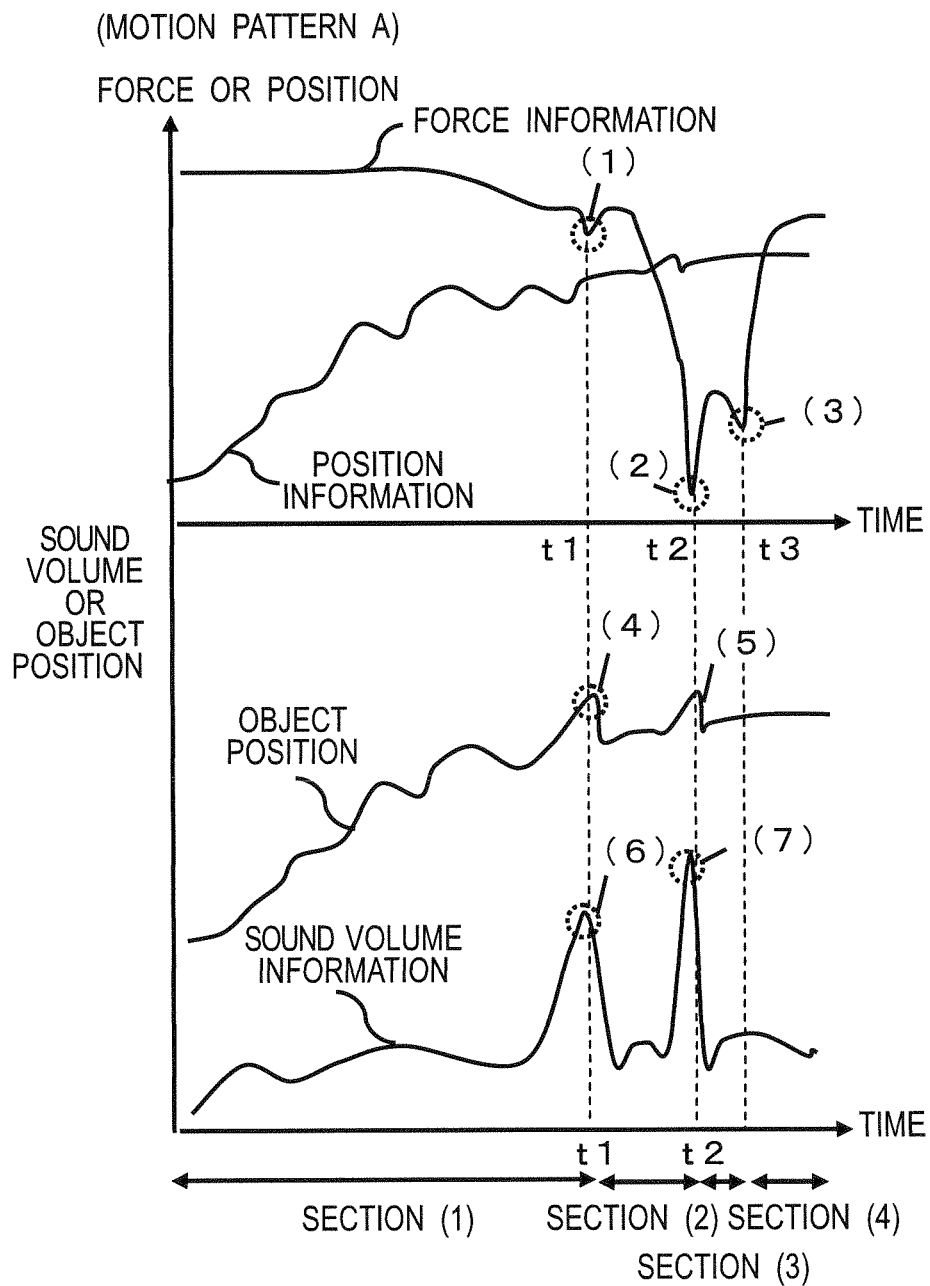
FIG. 28A is a graph illustrating a relationship between the position, the force, the object position, and a sound volume at the time teaching by a person according to the second embodiment of the present invention.

FIG. 28A and FIG. 28B are graphs similar to those in FIG. 27A and FIG. 27B.

(1) to (3) of FIG. 28A show the information change points detected by the method described with reference to the reaction time calculating section 15 in the first embodiment based on the force information in FIG. 28A.

Similarly, (7) to (9) of FIG. 28B show the information change points detected by the method described with reference to the reaction time calculating section 15 in the first embodiment based on the force information in FIG. 28B.

(4) and (5) of FIG. 28A show the information change points detected based on the position information about the object in FIG. 28A. As to the case of the object position similarly to the case of the force, the dispersion level calculating section 12 obtains deviations of the object position, and the section desired value setting section 9 detects a time point at which codes of the deviations obtained by the dispersion level calculating section 12 are the same as each other and the absolute values are the first threshold (a threshold for detecting the information change point) or more (in this example, 0.5 mm), as the information change point.

(6) and (7) of FIG. 28A show the information change points detected based on the sound volume information of FIG. 28A. In the case of the sound volume similarly to the case of the force, the dispersion level calculating section 12 obtains deviations of the sound volume information, and the section desired value setting section 9 detects a time point at which codes of the deviations obtained by the dispersion level calculating section 12 are the same as each other and the absolute values are the first threshold (in this example, 5 dB) or more, as the information change point. As shown in FIG. 28A, all the information change points detected based on a plurality of pieces of environmental information are set as the section desired values by the section desired value setting section 9.

In the motion pattern A in FIG. 28A, the same time points in (1), (4), and (6) are detected as the information change points, and the same time points in (2), (5), and (7) are detected as the information change points. For this reason, the detected time points $t_1$ and $t_2$ are set as the section desired values by the section desired value setting section 9. As to (3), the time point $t_3$ detected based only on the force information is set as the section desired value by the section desired value setting section 9.

Figure 29:
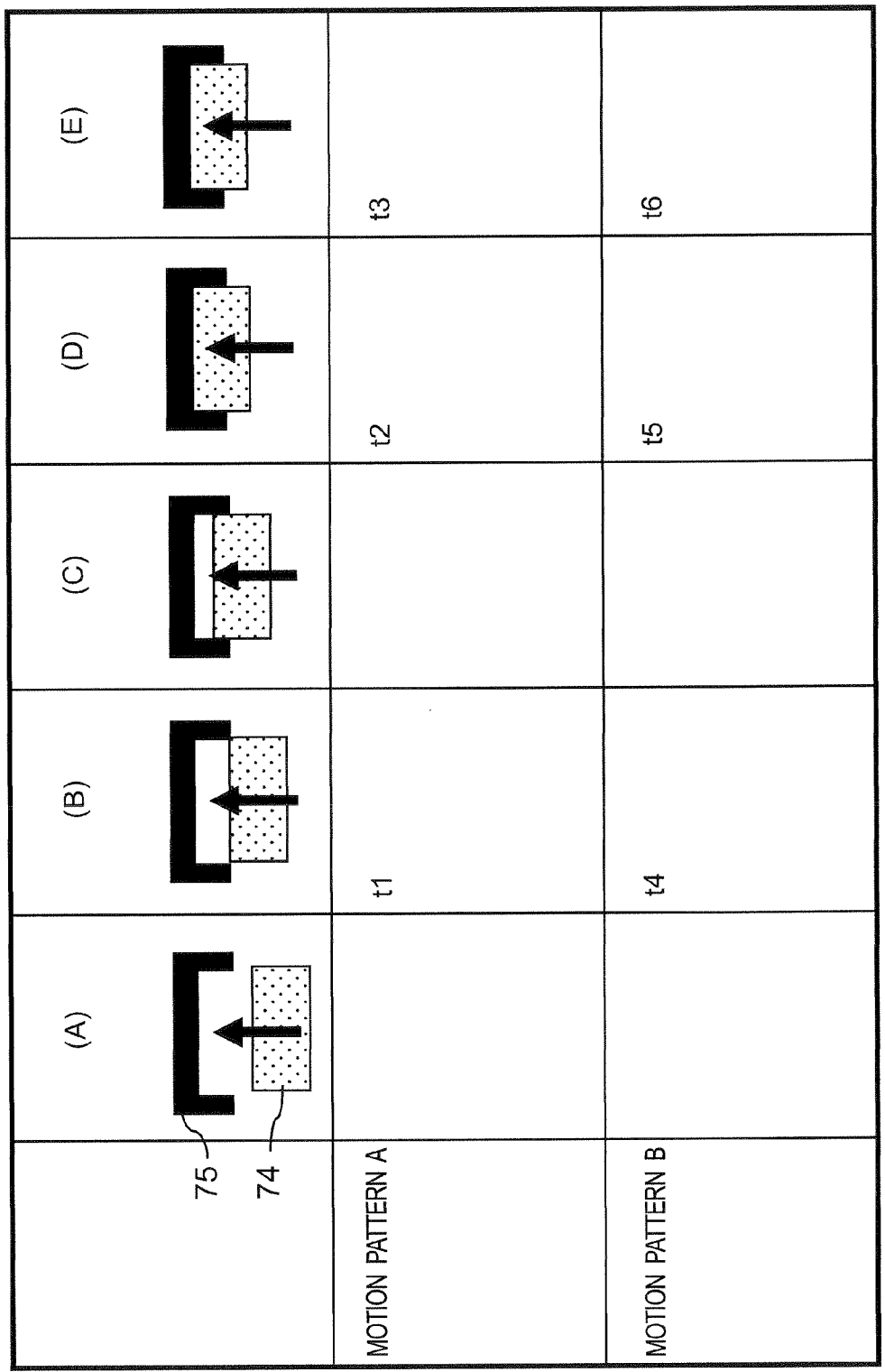
FIG. 29 is a view describing the motion for inserting the flexible substrate according to the second embodiment of the present invention.

As the motion pattern B of FIG. 28B, the section desired value setting section 9 sets the time points $t_4$, $t_5$, and $t_6$ detected based on the force information as the section desired values. FIG. 29 shows the section desired values set by the section desired value setting section 9 as well as the insertion states of the flexible substrate 74 in FIG. 29(A) to (E). The database input/output section 10 stores the section desired values set by the section desired value setting section 9 as well as the respective pieces of teaching information into the teaching information database 17B.

Then, in step S202, the reproduction control section 63 of the reproducing section 62 controls the dispersion level calculating section 12 so that the dispersion level is calculated at each section of up to the section desired value set by the section desired value setting section 9. The dispersion levels calculated by the dispersion level calculating section 12 are outputted from the dispersion level calculating section 12 into the motion creating section 13.

In this example, the reproduction control section 63 issues a command to the dispersion level calculating section 12 so that the dispersion level calculating section 12 calculates the dispersion level at each of the time point $t_1$ to the time point $t_6$ set by the section desired value setting section 9 based on the teaching information and the environmental information in the insertion direction shown in FIG. 28A and FIG. 28B.

The dispersion level calculating section 12 calculates the dispersion levels at the section (1) from the teaching start point to the time point $t_1$ in FIG. 28A.

The calculating method is similar to that in the first embodiment. In the dispersion level calculating section 12, the first threshold of the position in the insertion direction is 0.5 (mm), the second threshold of the force in the insertion direction is 0.5 (N), a fourth threshold of the object position in the insertion direction (a threshold for detecting the position deviation) is 0.5 (mm), and a fifth threshold of the sound volume in the insertion direction (a threshold for detecting a sound volume deviation) is 3 (dB).

Figure 30A:
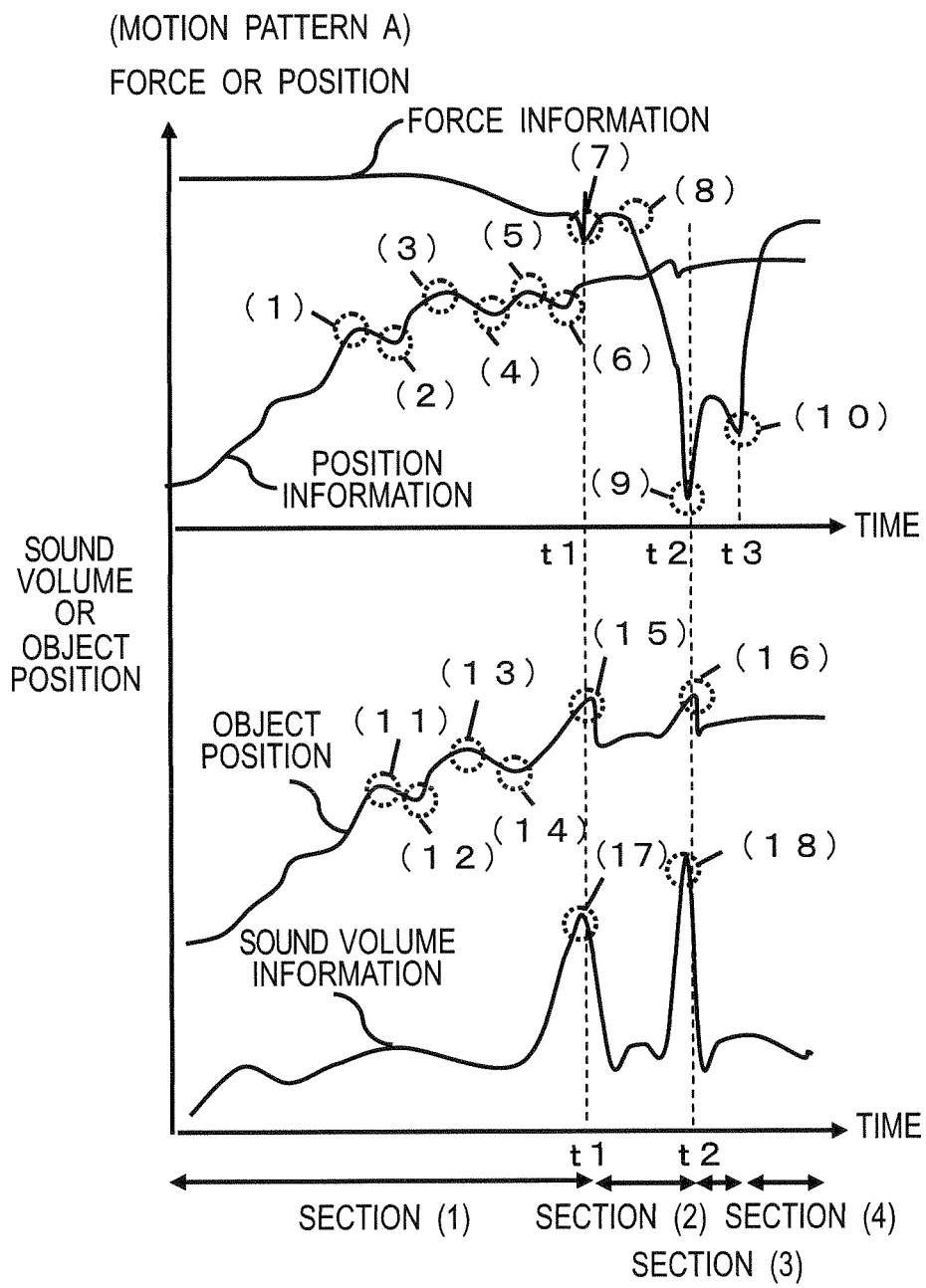
FIG. 30A is a graph illustrating the relationship between the position, the force, the object position, and the sound volume at the time of teaching by a person according to the second embodiment of the present invention.

In the section (1) from the teaching start time point to less than the time point $t_1$, the dispersion level calculating section 12 obtains a position deviation of the robot arm 5 in the insertion direction, and the section desired value setting section 9 counts places where the absolute values of the deviations obtained by the dispersion level calculating section 12 are the first threshold or more (here, the counted value is $b_{111}$). (1) to (6) of FIG. 30A show the places of being the first threshold or more. Since the section desired value setting section 9 detects six places, $b_{111}=6$. Then, as to the deviations where absolute values of the deviations obtained by the dispersion level calculating section 12 are the first threshold or more, a total of the absolute values of the deviations is calculated by the section desired value setting section 9 (here, the calculated value is denoted by $h_{111}$). Since the deviations in (1) to (6) are 0.51, 0.51, 0.50, 0.50, 0.53, and 0.54, when a total of these values is calculated by the section desired value setting section 9, $h_{111}=3.09$.

The dispersion level calculating section 12, then, obtains the deviation of the force in the insertion direction, and the dispersion level calculating section 12 counts places where the absolute value of the deviation obtained by the dispersion level calculating section 12 is the second threshold or more (here, the counted value is determined as $b_{121}$). Further, the dispersion level calculating section 12 calculates a total of the absolute values of the deviations on the places where the absolute values of the deviations obtained by the dispersion level calculating section 12 are the second threshold or more (here, the calculated value is denoted by $h_{121}$). In the section (1) from the teaching start time point to less than the time point $t_1$, as shown in FIG. 30A, a place of the second threshold or more is not present. For this reason, $b_{121}=0$, and $h_{121}=0$.

The section desired value setting section 9 obtains a deviation of the object position in the insertion direction, and counts places where the absolute values of the deviations obtained by the section desired value setting section 9 are the third threshold or more (here, the counted value is $b_{111}$). In the section (1) from the teaching start time point to less than the time point $t_1$, as shown in FIG. 30A, the places of being the third threshold or more are shown in (11) to (14). Since the section desired value setting section 9 detects four places, $b_{131}=6$. As to the deviations where absolute values of the deviations obtained by the section desired value setting section 9 are the third threshold or more, a total of the absolute values of the deviations is calculated by the section desired value setting section 9 (here, the calculated value is denoted by $h_{131}$). Since the deviations in (11) to (14) are 0.51, 0.51, 0.50, and 0.50, when a total of these values is calculated by the section desired value setting section 9, $h_{131}=2.02$.

The section desired value setting section 9 obtains a deviation of the sound volume in the insertion direction, and counts places where the absolute values of the deviations obtained by the section desired value setting section 9 are the fourth threshold or more (here, the counted value is $b_{141}$). Further, the section desired value setting section 9 calculates a total of the absolute values of the deviations on the places where the absolute values of the deviations obtained by the section desired value setting section 9 are the fourth threshold or more (here, the calculated value is denoted by $h_{141}$). In the section (1) from the teaching start time point to less than the time point $t_1$, as shown in FIG. 30A, a place of the fourth threshold or more is not present. For this reason, $b_{141}=0$, and $h_{141}=0$.

When the dispersion level calculating section 12, then, calculates the dispersion level $B_{11}$ at the section (1) from the teaching start time point to less than the time point $t_1$ according to the formula: $(c_1 \times b_{111} + c_2 \times b_{121} + c_3 \times b_{131} + c_4 \times b_{141} + c_5 \times h_{111} + c_6 \times h_{121} + c_7 \times h_{131} + c_8 \times h_{141})$, so that $B_{11}=9.892$. In this example, however, the constants $c_1$, $c_2$, $c_5$, and $c_6$ are 1.0, and $c_3$, $c_4$, $c_7$, and $c_8$ are 0.1.

As to the section (2) from the time point $t_1$ to less than the time point $t_2$, a dispersion level $B_{12}$ is calculated by the dispersion level calculating section 12 according to the similar method. The dispersion level on the section (3) from the time point $t_2$ or more to less than the time point $t_3$ where $B_{12}=2.0$ is such that $B_{13}=1.91$, and the dispersion level on the section (4) from the time point $t_3$ or more to the teaching end time point is such that $B_{14}=1.7$.

The dispersion level calculating section 12, then, calculates the dispersion level on the section (5) from the teaching start time point to the time point $t_4$ in FIG. 30B.

The calculating method is similar to that in the first embodiment. In the dispersion level calculating section 12, the first threshold of the position in the insertion direction is 0.5 (mm), and the second threshold of the force in the insertion direction is 0.5 (N).

The section desired value setting section 9 obtains a deviation of the position in the insertion direction on the section (5) from the teaching start time point to less than the time point $t_4$, and counts places where the absolute values of the deviations obtained by the section desired value setting section 9 are the first threshold or more (here, the counted value is $b_{211}$). (19) and (20) of FIG. 30A show the places of being the first threshold or more. Since the section desired value setting section 9 detects two places, $b_{211}=2$. As to the deviations where absolute values of the deviations obtained by the section desired value setting section 9 are the first threshold or more, a total of the absolute values of the deviations is calculated by the section desired value setting section 9 (here, the calculated value is denoted by $h_{211}$). Since the deviations in (19) to (20) are 0.51 and 0.50, when a total of these values is calculated by the section desired value setting section 9, $h_{211}=1.01$.

Then, the section desired value setting section 9 obtains a deviation of the force in the insertion direction, and counts places where the absolute values of the deviations obtained by the section desired value setting section 9 are the second threshold or more (here, the counted value is $b_{221}$). Further, the section desired value setting section 9 calculates a total of the absolute values of the deviations on the places where the absolute values of the deviations obtained by the section desired value setting section 9 are the second threshold or more (here, the calculated value is denoted by $h_{221}$). In the section (5) from the teaching start time point to less than the time point $t_4$, as shown in FIG. 30A, a place of the second threshold or more is not present. For this reason, $b_{221}=0$, and $h_{221}=0$.

Then, a dispersion level $B_{21}$ on the section (5) from the teaching start time point to less than $t_4$ is calculated by the dispersion level calculating section 12 according to the formula: $(c_1 \times b_{211} + c_2 \times b_{221} + c_5 \times h_{211} + c_6 \times h_{221})$ so that $B_{21}=3.01$. In this example, however, the constants $c_1$, $c_2$, $c_5$, and $c_6$ are 1.0.

As to the section (6) from the time point $t_4$ to less than the time point $t_5$, a dispersion level $B_{22}$ is calculated by the dispersion level calculating section 12 according to the similar method, and $B_{22}=3.5$. The dispersion level on the section (7) from the time point $t_5$ or more to less than the time point $t_6$ is such that $B_{23}=1.6$, and a dispersion level on the section (4) from the time point $t_3$ or more to the teaching end time point is such that $B_{24}=1.5$. The dispersion levels thus calculated for the respective sections in the above manner are shown in FIG. 31.

Then, in step S203, the reproduction control section 63 of the reproducing section 62 issues a command to the reaction time calculating section 15 so that the reaction time is calculated at each section of up to the section desired value set by the section desired value setting section 9. The calculated reaction time is outputted to the motion creating section 13.

In this example, the reaction time is calculated at each of $t_1$ to $t_6$ set by the section desired value setting section 9 based on the teaching information and the environmental information in the insertion direction shown in FIGS. 28A and 28B.

The reaction time may be a value that is obtained in such a manner that the dispersion level calculating section 12 obtains an information change point and an action change point and the time of the information change point may be subtracted from the time of the action change point at each environmental information similarly to the first embodiment, or may be calculated by the reaction time calculating section 15 based only on the environmental information in each environmental information where the reaction time is the shortest. It is generally said that the reaction times of the person are shorter with respect to a kinesthetic sense, an acoustic sense, and a visual sense in this order. The second embodiment describes an example in which the reaction time calculating section 15 calculates reaction times at the respective sections of up to the section desired value based only on information about the force whose reaction time is the shortest.

Figure 32A:
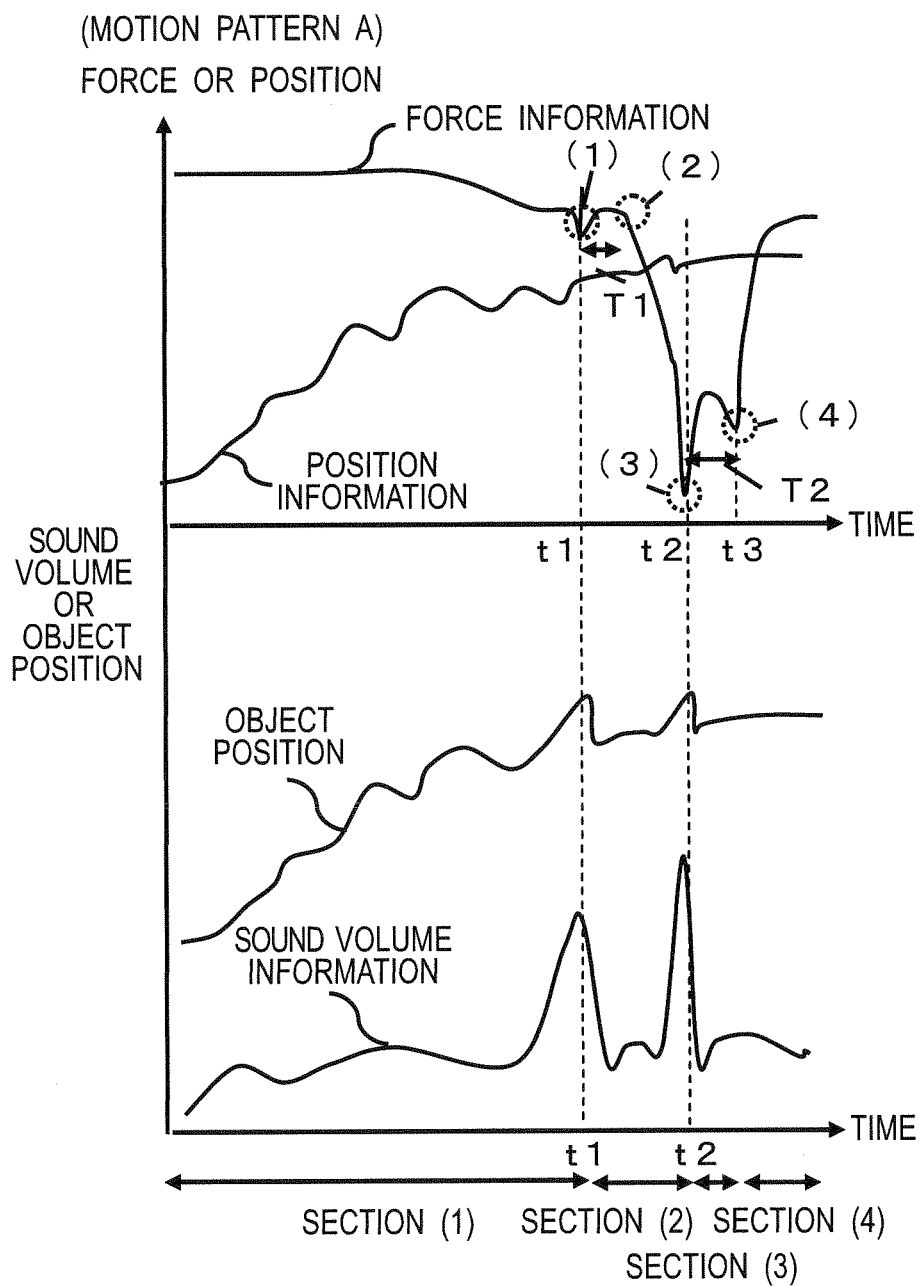
FIG. 32A is a graph illustrating the relationship between the position, the force, the object position, and the sound volume at the time of teaching by a person according to the second embodiment of the present invention.
Figure 32B:
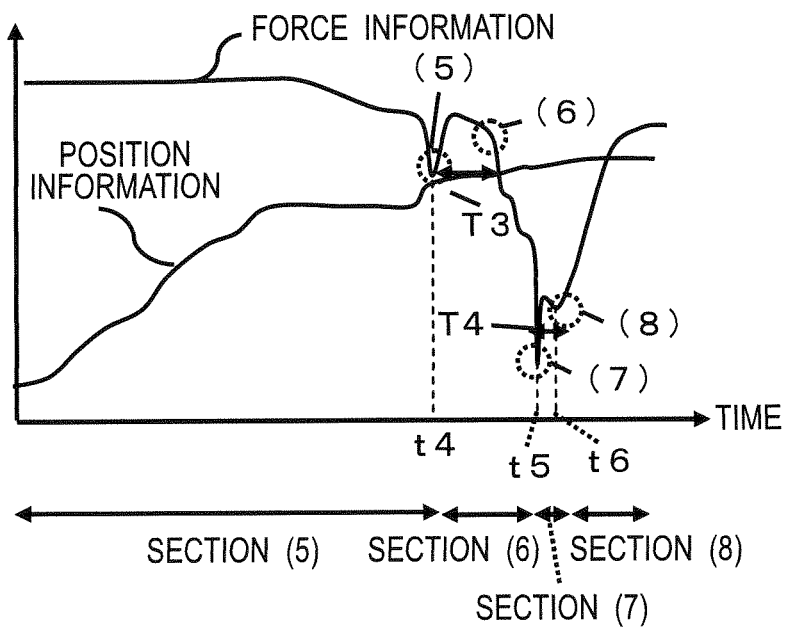
FIG. 32B is a graph illustrating the relationship between the position, the force, the object position, and the sound volume at the time of teaching by a person according to the second embodiment of the present invention.

The reaction time calculating section 15, then, calculates the reaction times using two pieces of teaching information and environmental information in FIGS. 32A and 32B obtained at the teaching time. The reaction time calculating section 15 calculates the reaction times based on information about the position and the force only in the insertion direction shown in FIG. 32A and FIG. 32B. As one example, the first threshold of the reaction time calculating section 15 is 0.5 (N), and the second threshold is 0.2(N).

Concretely, similarly to the first embodiment, the section desired value setting section 9 obtains deviations of the force in the insertion direction, and detects a time point at which codes of the deviations obtained by the section desired value setting section 9 are the same as each other and absolute values are the first threshold or more, as the information change point. The section desired value setting section 9 detects a time point at which the person 16 takes an action after the information change point, as the action change point.

(1) and (3) in FIG. 32A are the information change points detected by the section desired value setting section 9, and correspondingly (2) and (4) are the action change points. The reaction times $T_1$ (350 msec) and $T_2$ (280 msec) in the drawing are the detected reaction times. The reaction time calculating section 15 checks each of the sections of up to the section desired value (in this example, the sections (1) to (4)) where each of the detected reaction times is detected. Since the reaction time is not detected on the section (1), the reaction time on this section is determined as −1 by the reaction time calculating section 15. The reaction time $T_1$ is detected on the section (2) by the reaction time calculating section 15, and the reaction time $T_2$ is detected on the section (3) by the reaction time calculating section 15. Since the reaction time is not detected on the section (4) by the reaction time calculating section 15, it is determined as −1 by the reaction time calculating section 15.

Similarly, also in FIG. 32B, the reaction time is detected by the reaction time calculating section 15. In FIG. 32B, the reaction times $T_3$ (410 msec) and $T_4$ (80 msec) are detected by the reaction time calculating section 15. Then, the reaction time calculating section 15 checks each of the sections of up to the section desired value (in this example, the sections (5) to (8)) where each of the detected reaction times is detected.

Since the reaction time is not detected on the section (5) by the reaction time calculating section 15, the reaction time on this section is determined as −1 by the reaction time calculating section 15. The reaction time $T_3$ is detected on the section (6) by the reaction time calculating section 15, and the reaction time $T_4$ is detected on the section (7) by the reaction time calculating section 15. Since the reaction time is not detected on the section (8) by the reaction time calculating section 15, it is determined as −1 by the reaction time calculating section 15. The reaction times thus calculated on the respective sections in the above manner are shown in FIG. 31.

In step S204, the reproduction control section 63 of the reproducing section 62 issues a command to the order determining section 11 so that the order determining section 11 determines an order of motions on the respective sections in FIG. 28A and FIG. 28B providing a higher skilled level of the motion.

The reaction time calculating section 15 counts the number of pieces of used information in the information about the force, the object position, and the sound volume of the environmental information in the environmental information database 18, as the number of pieces of used environmental information E on each section.

In this example, in FIG. 28A, since the force, the object position, and the sound volume on all the sections are used, the number of pieces of used environmental information $E_1=3$.

In FIG. 28B, since only the force is used on all the sections, the number of pieces of used environmental information $E_2=1$. The number of pieces of used environmental information on the respective sections thus calculated in the above manner are shown in FIG. 31.

When the reaction time calculating section 15 calculates a plurality of reaction times calculated on the respective sections, the reaction time calculating section adds all the reaction times, and calculates a total reaction time on each section. In this example, since a plurality of reaction times are not present on each section, addition is not done.

The skill level on each section is calculated by the order determining section 11 according to $P=1/(aE+bB+cT)$ similarly to the first embodiment. However, a b, and c are constants, and in this example, $a=1$, $b=100$, and $c=1$. The respective constants are predetermined.

Further, E represents the number of pieces of used environmental information obtained on each section, B represents the dispersion level obtained on each section, and T represents a total reaction time on each section. When the reaction time is −1, the order determining section 11 carries out a calculation with the reaction time being 0. The skill level on each section calculated by the order determining section 11 is shown in FIG. 31.

The order determining section 11 determines that larger values indicate motions with higher skill levels. As shown in FIG. 31, FIG. 30B is a motion with the highest priority on the section (1), FIG. 30A is a motion with the highest priority on the section (2), FIG. 30B is a motion with the highest priority on the section (3), and FIG. 30B is a motion with the highest priority on the section (4).

Then, in step S205, the reproduction control section 63 of the reproducing section 62 issues a command to the control law extracting section 20 so that the control law extracting section 20 extracts a sensory feedback law.

The sensory feedback law may be calculated by the control law extracting section 20 in a manner that the information change point and the action change point are obtained for each environmental information similarly to the first embodiment, or may be calculated by the control law extracting section 20 based on only environmental information whose reaction time is the shortest in the respective environmental information. It is generally said that the reaction times of the person are shorter with respect to a kinesthetic sense, an acoustic sense, and a visual sense in this order. The second embodiment describes an example that the control law extracting section 20 extracts the sensory feedback law based on the information whose reaction time is the shortest.

The feedback laws are extracted by the control law extracting section 20 based on the information change point and the action change point detected by the dispersion level calculating section 12 in step S203 similarly to the first embodiment.

Concretely, the dispersion level calculating section 12 obtains the deviations of the force in the insertion direction, and the dispersion level calculating section 12 detects a time point at which codes of the deviations obtained by the dispersion level calculating section 12 are the same as each other and the absolute values are the first threshold or more, as the information change point (1) in FIG. 32A at which the person 16 receives sense stimuli.

Then, as to the action change point (2) after the time point $t_1$ at which the person 16 takes an action, the dispersion level calculating section 12 obtains deviations of the force in the insertion direction after the information change point (1), and detects a time point at which the codes of the deviations are the same as each other and the absolute values are the second threshold or more.

Thereafter, the dispersion level calculating section 12 detects the information change point and the action change point after (2) in the same method. The dispersion level calculating section 12 detects the information change point and the action change point detected by the dispersion level calculating section 12, as the information change point (3) and the action change point (4) as shown in FIG. 32A. With the first feedback law SB11, the control law extracting section 20 approximates information about the force from the time point of detecting the action change point (2) to the time point of next information change point (3) according to an approximate curve. The approximate curve is calculated by using, for example, the least squares method. The control law extracting section 20 extracts the second feedback law SB12 between the time point of detecting the action change point (4) to a next information change point, but in this example, since the information change point after the action change point (4) is not detected, the control law extracting section 20 performs approximation using the approximate curve from the action change point (4) to a time point at which the force information ends.

Similarly in FIG. 32B, the control law extracting section 20 extracts a feedback law. With the first feedback law SB21, the control law extracting section 20 approximates information about the force from the time point of detecting the action change point (6) to the time point of next information change point (7) according to an approximate curve. The approximate curve is calculated by using, for example, the least squares method. The control law extracting section 20 detects the action change point (8) after the information change point (7) so as to extract the second feedback law SB22, but since the reaction time $T_4$ from the information change point (7) to the action change point (8) ($T_4$=80 msec) is the third threshold (in this example, 200 msec) or less, the control law extracting section 20 determines that the person 16 does not perform the sensory feedback and performs the teaching based on prediction, and thus the second sensory feedback is not extracted.

Then, in step S206, the reproducing section 62 of the motion creating section 13 reproduces the motion of the robot arm 5 on each section of up to the section desired value based on the sensory feedback laws extracted by the control law extracting section 20 and the order determined by the order determining section 11.

Since the control law extracting section 20 extracts the feedback laws using the information about the force, this example is described by using the feedback law of the force.

Figure 33:
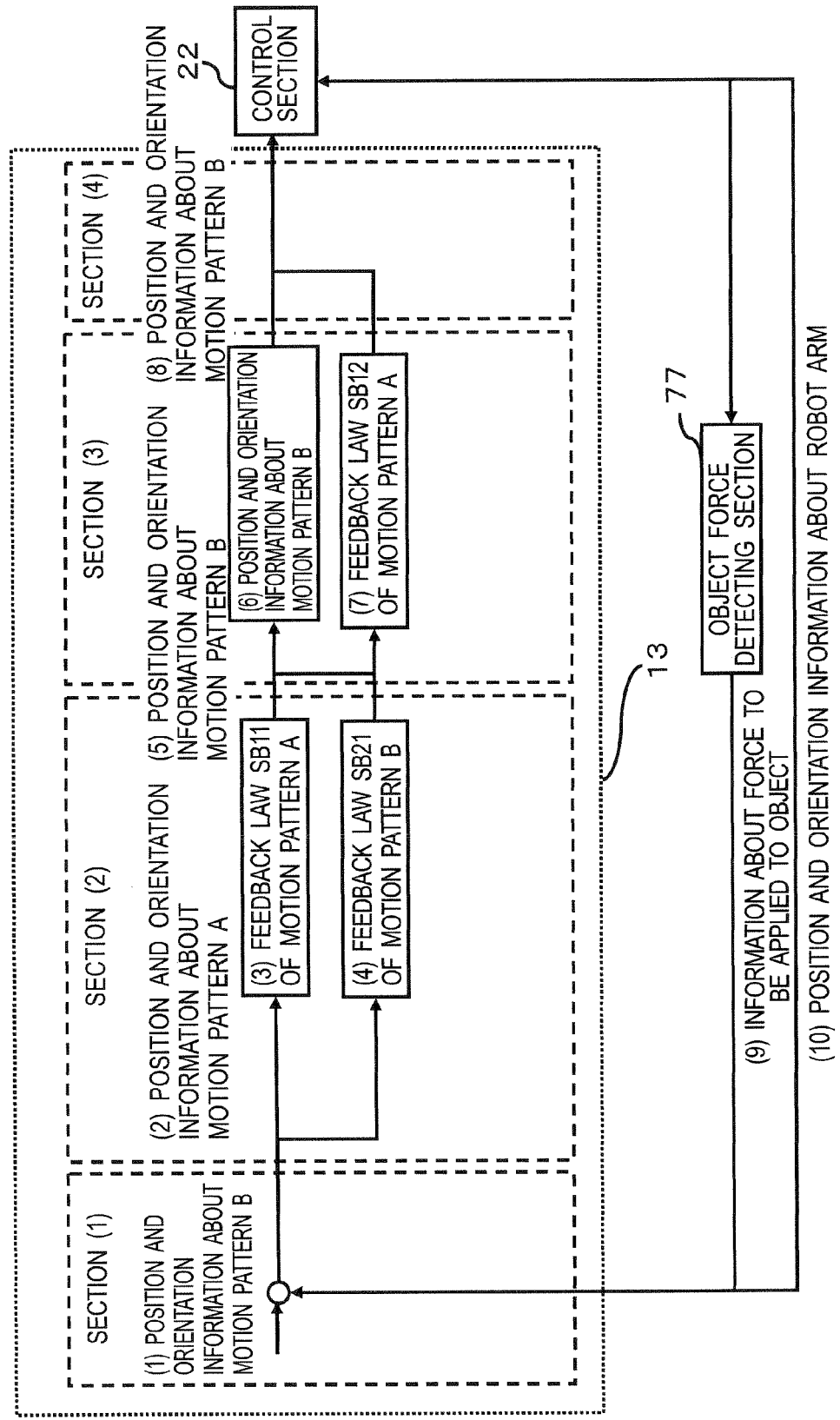
FIG. 33 is a view illustrating configurations of the motion creating section, the control section, and an object force detecting section according to the second embodiment of the present invention.
Figure 34A:
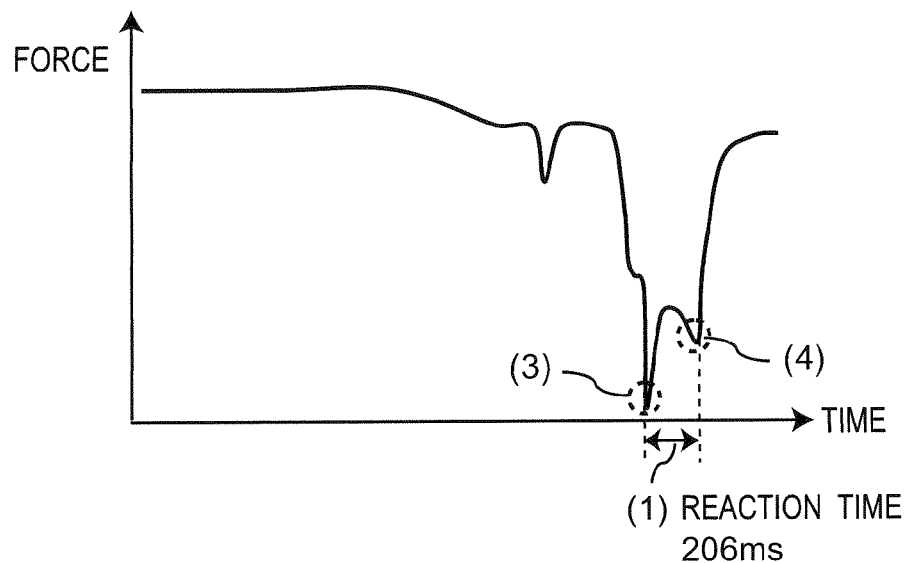
FIG. 34A is a graph relating to the force at the time of teaching by a person in a conventional example.
Figure 34B:
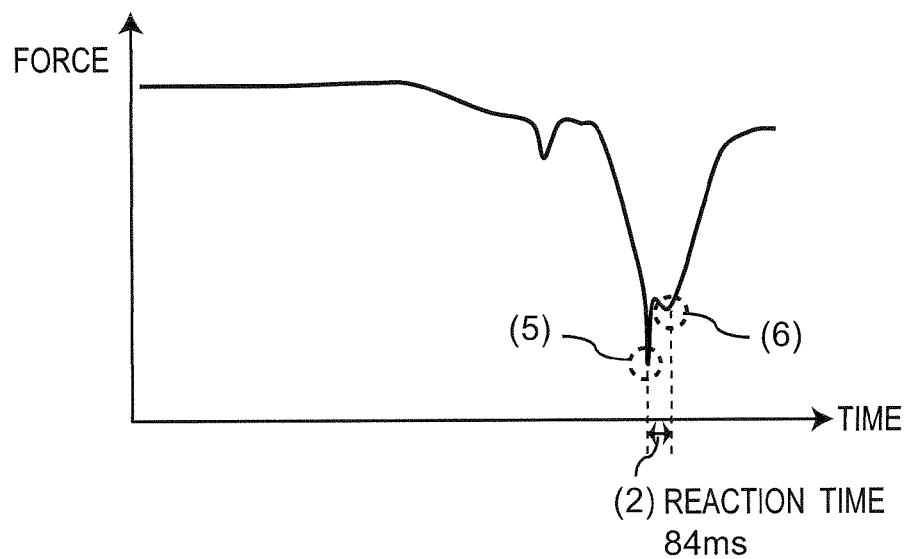
FIG. 34B is a graph relating to the force at the time of teaching by a person in a conventional example.
Figure 34C:
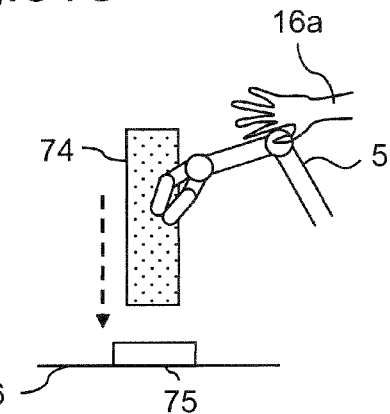
FIG. 34C is a view describing a motion of the robot at the time of teaching by a person in a conventional example.
Figure 34D:
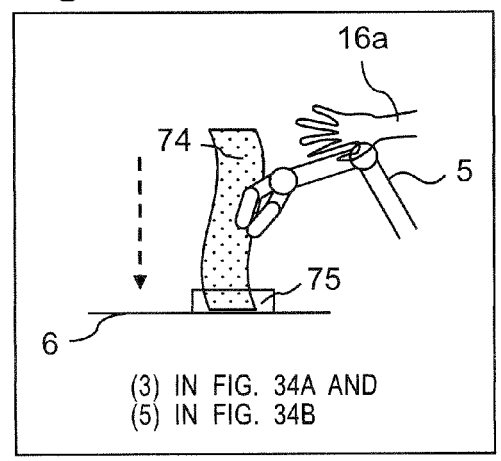
FIG. 34D is a view describing a motion of the robot at the time of teaching by a person in a conventional example.
Figure 34E:
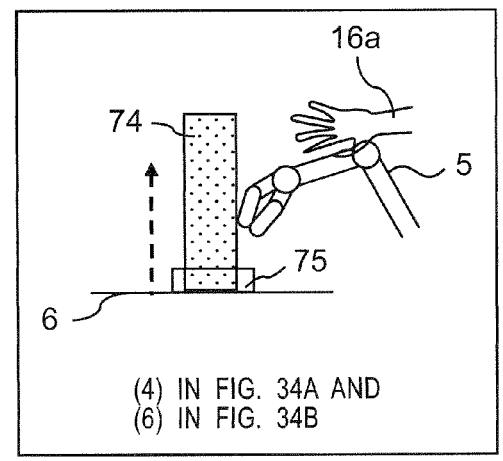
FIG. 34E is a view describing a motion of the robot at the time of teaching by a person in a conventional example.

FIG. 33 illustrates a procedure for making the motion created by the motion creating section 13.

The motion creating section 13 creates the motions on the respective sections according to the method similar to the first embodiment.

Since the sensory feedback law of the force is not extracted on the section (1), the motion creating section 13 sets teaching information with the highest priority determined by the order determining section 11 as desired position and orientation information. In this example, since the priority of the motion pattern B is high on the section (1), the motion creating section 13 sets the position and orientation information of the operation pattern B in FIG. 28B as a desired trajectory ((1) of FIG. 33), and outputs it to the control section 22 so that the motion is made in the position control mode. In this example, as shown in FIG. 29(A), the flexible substrate 74 starts to insert towards the insertion slot 75 in the position control mode. Since the robot arm 5 is moved by using the position and orientation information of the motion pattern B of less dispersion level, a fluctuation of the position is less than the position and orientation information on the section (1) of the motion pattern A in FIG. 28A, and the flexible substrate 74 can be moved stably to the insertion slot 75.

Similarly to the first embodiment, during the motion of robot arm 5, the position and orientation information of the robot arm 5 is inputted into the motion creating section 13 via the control section 22 ((10) of FIG. 33). In addition, the force to be applied to the object (in this example, the flexible substrate 74) is measured by the object force detecting section 78, and is inputted from the object force detecting section 78 into the motion creating section 13 ((9) of FIG. 33).

As shown in FIG. 29(B), the flexible substrate 74 contacts with the insertion slot 75. The time point of contact is start of the section (2).

On the section (2), since the teaching information with the highest priority is teaching information of the motion pattern A in FIG. 28A, the control mode (in this example, the position control mode) is not changed by the motion creating section 13 and the position and orientation information is outputted from the motion creating section 13 to the control section 22 so that the motion is made along the desired trajectory of the motion pattern A from the desired trajectory of the motion pattern B ((2) of FIG. 33).

Then, in step S207, when the desired trajectory of the motion pattern B is switched into the desired trajectory of the motion pattern A, the desired trajectory creating section 55 carries out interpolation such as polynomial interpolation so that the motion is not suddenly switched.

When the sensory feedback law extracted by the control law extracting section 20 at the time point at which the flexible substrate 74 contacts with the insertion slot 75 is present, the order rearranging section 64 applies the sensory feedback law. As to the sensory feedback law to be applied by the order determining section 64, the sensory feedback law that is determined by the order determining section 11 on the section (2) and is obtained from the teaching information with the highest priority is applied by the order rearranging section 64, and when the determining section 65 determines that the motion is not made properly, the sensory feedback law obtained from the teaching information with the second highest priority is applied by the order rearranging section 64. When the determining section 65 determines that the motion is properly made, the order rearranging section 64 does not apply the feedback law extracted from the teaching information and the environmental information with lower priority by the control law extracting section 20.

In this example, the order rearranging section 64 applies the sensory feedback law SB11 extracted by the control law extracting section 20 after the action change point (2) of FIG. 32A as the more skilled motion ((3) in FIG. 33), and when the determining section 65 determines that the motion is not properly made, the feedback law SB21 ((4) of FIG. 33) extracted by the control law extracting section 20 after the action change point (6) in FIG. 32B as an unskilled motion is outputted from the order rearranging section 64 to the control section 22 according to the similar method to that in the first embodiment. The determining section 65 determines whether the insertion succeeds according to the similar method to that in the first embodiment.

Then, like (D) of FIG. 29, the flexible substrate 74 contacts with the inner bottom part of the connector 75. The time point of contact is start of the section (3).

On the section (3), since the teaching information with the highest priority is teaching information in FIG. 28B, the control mode (in this example, the position control mode) is not changed by the motion creating section 13 and the position and orientation information is outputted from the motion creating section to the control section 22 so that the motion is made from the desired trajectory in FIG. 28A to the desired trajectory in FIG. 28B ((5) of FIG. 33).

When the desired trajectory in FIG. 28A is switched into the desired trajectory in FIG. 28B, the desired trajectory creating section 55 carried out interpolation such as polynomial interpolation so that the motion is not suddenly switched.

Then, when the sensory feedback law extracted by the control law extracting section 20 at the time point at which the flexible substrate 74 contacts with the inner bottom part of the insertion slot 75 is present, the order rearranging section 64 applies the sensory feedback law. As to the sensory feedback law to be applied by the order determining section 64, the sensory feedback law that is determined by the order determining section 11 in the section (3) and obtained from the teaching information with the highest priority is applied by the order determining section 64, and when the determining section 65 determines that the motion is not made properly, the sensory feedback law obtained from the teaching information with the second highest priority is applied by the order rearranging section 64.

In this example, the sensory feedback laws extracted by the control law extracting section 20 at the information change point (7) in FIG. 32B as a more skilled motion are applied by the order rearranging section 64, but in this example, since $T_4=80$ msec is the third threshold (in this example, 200 msec) or less, the control law extracting section 20 determines that the person 16 does not carry out sensory feedback and performs the teaching based on speculation, and thus does not extract sensory feedback.

Therefore, after the time point of FIG. 32B(8) as the action change point, the position and orientation information including the position of the insertion direction in FIG. 32B is outputted from the motion creating section 13 to the control section 22 so that the motion is made in the position control mode ((6) in FIG. 33). In this example, the flexible substrate 74 is slightly returned to the front at the time point at which the flexible substrate 74 contacts with the inner bottom part of the insertion slot 75 of the connector. The person 16 who is skilled does not carry out sensory feedback and makes the motion based on speculation, but its trajectory less fluctuates, and thus the motion is stably made.

Then, similarly to the first embodiment, the determining section 65 determines that the proper motion is not made due to model change of the flexible substrate 74, the order rearranging section 64 applies the sensory feedback law extracted from teaching information with next priority by the control law extracting section 20. In this example, the order rearranging section 64 applies the sensory feedback law SB12 ((7) in FIG. 33). The sensory feedback law SB12 controls the force so that when the strong force to the flexible substrate 74 is detected, the force is weakened.

Finally, since the section (4) is a section where the sensory feedback law is not extracted, the teaching information with the highest priority in the teaching information of FIG. 28B makes the motion in the control mode ((8) in FIG. 33).

As a result, the motion is reproduced while the desired trajectory is being switched on each section set by the section desired value, so that the motion flexible to environmental fluctuation can be realized.

When the teaching mode is set, the control section 22 makes the motion with the impedance control so as to move the robot arm 5 based on the force applied by the person 16. However, the robot arm 5 may be operated to be moved in an off-servo state.

Further, as to the entire task, the order or the skill level P determined by the order determining section 11 may be presented to a display section provided to the task bench 7, for example. As a result, the person 16 who performs the operation can check his/her skill level or order.

Further, the skill level P set by the section desired value setting section 9 is displayed at the respective sections of up to the section desired value, so that the skill level of a part of a task can be checked.

Further, there may be provided a storage section for storing the skill levels calculated for the respective people who teaches. As a result, when the person performs the teaching operation, a mechanical impedance setting value of the control section 22 may be changed according to a previous skill level. Concretely, viscosity D and rigidity K are set to be larger for an unskilled person, so that the motion of the robot arm 5 provides a feeling of resistance or hardness, and thus it becomes difficult to move. On the contrary, viscosity D and rigidity K are set to be smaller for a skilled person, so that a feeling of resistance or hardness is difficult to be caused on the motion of the robot arm, and thus it becomes easy to move.

Thus, the operational feeling of the robot arm is changed according to the skill level, so that an unskilled person can perform the operation safely, and a skilled person can perform the operation quickly. In addition, the mechanical impedance setting value can be changed according to the skill levels at the sections of up to the section desired value set by the section desired value setting section 9.

According to the second embodiment, the motion creating section 13 combines the teaching information at the time of being unskilled in the task with the information at the time of being skilled in the teaching task so as to create a motion at each of the sections of up to the section desired value, thereby enabling the motion flexible to the environmental fluctuation to be created. Further, since the person 16 can directly operate and teach the robot arm 5, even if the person 16 does not have knowledge of the robot, the person 16 can perform the operation intuitively. Therefore, the person 16 can easily teach the motion of the robot arm 5.

Though the present disclosure has been described above based on the above first to second embodiments and the modified examples, the present disclosure should not be limited to the above-described first to second embodiments and the modified examples. For example, the present invention also includes the following cases.

A part or entirety of each of the above-described control devices is actually a computer system that includes, for example, a microprocessor, ROM, RAM, hard disk unit, display unit, keyboard, mouse, and the like. A computer program is stored on the RAM or the hard disk unit. Functions of each section (part/unit) of the control devices can be achieved by the microprocessor operating according to the computer program. The computer program mentioned here is a combination of a plurality of instruction codes that indicate commands to a computer for achieving predetermined functions.

For example, each component can be implemented as a result that a program executing section (part/unit) such as a CPU reads and executes software programs recorded in a recording medium such as a hard disk or semiconductor memory. Here, software that implements a part or entirety of the control device according to each of the above-mentioned embodiments or modified examples is a following program.

That is to say, this program has a computer execute the units/steps defined in claims. The program has a computer execute the sections (parts/units) defined in claims. That is, such a program is a control program of a robot arm for controlling a motion of the robot arm, the program allowing a computer to execute:

a step of obtaining a plurality of pieces of time-series teaching information at a time when a person operates the robot arm and teaches a motion, by a first information obtaining section;

a step of obtaining (i) reaction time information and (ii) dispersion information at the time of teaching the robot arm, by a second information obtaining section;

a step of determining an order of the plurality of pieces of teaching information obtained by the first information obtaining section based on the reaction time information and the dispersion information obtained by the second information obtaining section, by an order determining section, the time-series teaching information including at least one or more of a position, an orientation, and a speed of the robot arm, the reaction time information being time information from a time when the person receives perceptual information to a time when the person operates the robot arm, the perceptual information being at least one of information about a force applied from the robot arm to a target object for a task by the robot arm, information about a position of the target object for the task by the robot arm, and sound information of a circumference environment, the dispersion information being information about dispersion levels in chronological order between at least one or more pieces of the teaching information in chronological order or the perceptual information in chronological order;

a step of creating motion information as information about the motion of the robot arm based on the plurality of pieces of teaching information and the order, by a motion creating section; and a step of controlling the motion of the robot arm based on the motion information created by the motion creating section.

In addition, it may be possible to execute the program by downloading it from a server or reading it from a predetermined storage medium (an optical disc such as a CD-ROM, a magnetic disc, a semiconductor memory, or the like).

Further, one or more computers can be used to execute the program. That is, centralized processing or distributed processing can be performed.

By properly combining the arbitrary embodiment(s) or modified example(s) of the aforementioned various embodiments and modifications, the effects possessed by the embodiment(s) or modified example(s) can be produced.

The present invention is useful for the control device and the control method of the robot arm of a domestic robot for controlling the motion of the robot arm at the time of doing the task with it being adaptable to the environmental fluctuation, the robot having the control device of the robot arm, a robot arm control program, and an integrated electronic circuit. Further, the present invention can be applied to, not limited to the domestic robot, an industrial robot, or the control device and the control method of the robot arm of a movable mechanism in a productive facility, a robot having the control device of the robot arm, a control program for the robot arm, and an integrated electronic circuit.

The entire disclosure of Japanese Patent Application No. 2011-193882 filed on Sep. 6, 2011, including specification, claims, drawings, and summary are incorporated herein by reference in its entirety.

Although the present invention has been fully described in connection with the embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A control device of a robot arm for controlling a motion of the robot arm, the control device comprising:

a first information obtaining section that obtains a plurality of pieces of time-series teaching information at a time when a person operates the robot arm and teaches a motion;

a second information obtaining section that obtains (i) reaction time information and (ii) dispersion information at the time of teaching the robot arm;

an order determining section that determines an order of the plurality of pieces of time-series teaching information obtained by the first information obtaining section based on the reaction time information and the dispersion information obtained by the second information obtaining section; and a motion creating section that creates motion information as information about the motion of the robot arm based on the plurality of pieces of time-series teaching information and the order, wherein the time-series teaching information includes at least one or more of a position, an orientation, and a speed of the robot arm, the reaction time information is time information from a time when the person receives perceptual information to a time when the person operates the robot arm, the perceptual information being at least one of information about a force applied from the robot arm to a target object for a task by the robot arm, information about a position of the target object for the task by the robot arm, and sound information of a circumference environment, the dispersion information is information about a dispersion level in chronological order between at least one or more pieces of the time-series teaching information in chronological order and the perceptual information in chronological order, and the motion of the robot arm is controlled based on the motion information created by the motion creating section.

2. The control device of the robot arm according to claim 1, wherein the perceptual information is obtained by the second information obtaining section, and the dispersion level is levels of fluctuations in chronological order in respective directions as to the time-series teaching information about the position or the orientation of the robot arm, or the perceptual information about the force information, or the position information about the target object, or the sound information obtained by the second information obtaining section.

3. The control device of the robot arm according to claim 1, wherein the perceptual information is obtained by the second information obtaining section, and the control device further comprises:

a dispersion level calculating section that calculates dispersion levels in chronological order as information about the dispersion levels between the time-series teaching information obtained by the first information obtaining section and the perceptual information obtained by the second information obtaining section, wherein the dispersion levels calculated by the dispersion level calculating section are obtained as the dispersion information by the second information obtaining section.

4. The control device of the robot arm according to claim 1, wherein the perceptual information is obtained by the second information obtaining section, and the control device further comprises:

a perceptual information presenting section that presents only information minimally needed to complete an operation in information obtained by the second information obtaining section as a force, a position of the target object or a sound volume at a time when the person operates the robot arm, wherein the perceptual information in the information obtained by the second information obtaining section is information whose type is same as the information presented by the perceptual information presenting section.

5. The control device of the robot arm according to claim 1, wherein the perceptual information is obtained by the second information obtaining section, and the order determining section determines teaching information using less pieces of the perceptual information in the plurality of pieces of time-series teaching information as information with higher priority.

6. The control device of the robot arm according to claim 1, wherein the order determining section determines teaching information based on information about a shorter reaction time in the plurality of pieces of time-series teaching information as information with higher priority.

7. The control device of the robot arm according to claim 1, wherein the perceptual information is obtained by the second information obtaining section, and the control device further comprises:

a reaction time calculating section that adds reaction times for each perceptual information and calculates total reaction time information, wherein the order determining section determines teaching information where the total reaction time information calculated by the reaction time calculating section in the plurality of pieces of time-series teaching information is larger as information with higher priority.

8. The control device of the robot arm according to claim 1, wherein the order determining section determines teaching information where the dispersion level is smaller in the plurality of pieces of time-series teaching information as information with higher priority.

9. The control device of the robot arm according to claim 1, further comprising: a determining section that determines whether the robot arm normally moves based on the motion information created by the motion creating section, wherein when the determining section determines that normal motion is not made based on the motion information, the motion creating section creates the motion information as the information about the motion of the robot arm based on teaching information different from the time-series teaching information.

10. The control device of the robot arm according to claim 9, wherein the motion creating section creates the motion information as information about the motion of the robot arm based on the time-series teaching information with highest priority in the plurality of pieces of time-series teaching information, and when the determining section determines that the motion is not normally made based on the motion information, the motion creating section creates the motion information as the information about the motion of the robot arm based on teaching information with second highest priority.

11. The control device of the robot arm according to claim 9, wherein the motion creating section determines the motion information that should be corrected based on the order, and the control device further comprises:

a control law extracting section that extracts control law information as information for controlling the motion based on the motion information; and an order rearranging section that, when the determining section determines that the motion is not normally made based on the motion information, rearranges the control law information into a control law of second highest priority, wherein the motion creating section corrects the motion information according to the control law rearranged by the order rearranging section and creates new motion information.

12. The control device of the robot arm according to claim 9, wherein the order determining section respectively weights the reaction time information and the dispersion information, and determines the order of the plurality of pieces of time-series teaching information.

13. The control device of the robot arm according to claim 1, further comprising: a section desired value setting section that sets a plurality of section desired values as end time points of a plurality of sections obtained by dividing the motion information, wherein the order determining section determines the order of the time-series teaching information at the sections of up to the section desired values set by the section desired value setting section, and the motion creating section creates the motion information at the respective sections based on the time-series teaching information with highest priority.

14. A robot, comprising:

the robot arm; and the control device of the robot arm that controls the robot arm, according to claim 1.

15. A control method of a robot arm for controlling a motion of the robot arm, the control method comprising:
- obtaining a plurality of pieces of time-series teaching information at a time when a person operates the robot arm and teaches a motion, by a first information obtaining section;
- obtaining (i) reaction time information and (ii) dispersion information at the time of teaching the robot arm, by a second information obtaining section;
- determining an order of the plurality of pieces of time-series teaching information obtained by the first information obtaining section based on the reaction time information and the dispersion information obtained by the second information obtaining section, by an order determining section, the time-series teaching information including at least one or more of a position, an orientation, and a speed of the robot arm, the reaction time information being time information from a time when the person receives perceptual information to a time when the person operates the robot arm, the perceptual information being at least one of information about a force applied from the robot arm to a target object for a task done by the robot arm, information about a position of the target object for the task done by the robot arm, and sound information of a circumference environment, and the dispersion information being information about dispersion levels in chronological order between at least one or more pieces of the time-series teaching information in chronological order or the perceptual information in chronological order;
- creating motion information as information about the motion of the robot arm based on the plurality of pieces of time-series teaching information and the order, by a motion creating section; and
- controlling the motion of the robot arm based on the motion information created by the motion creating section.

16. A non-transitory computer-readable recording medium including a control program of a robot arm for controlling a motion of the robot arm, the control program allowing a computer to execute a method comprising:
- a step of obtaining a plurality of pieces of time-series teaching information at a time when a person operates the robot arm and teaches a motion, by a first information obtaining section;
- a step of obtaining (i) reaction time information and (ii) dispersion information at the time of teaching the robot arm, by a second information obtaining section;
- a step of determining an order of the plurality of pieces of time-series teaching information obtained by the first information obtaining section based on the reaction time information and the dispersion information obtained by the second information obtaining section, by an order determining section, the time-series teaching information including at least one or more of a position, an orientation, and a speed of the robot arm, the reaction time information being time information from a time when the person receives perceptual information to a time when the person operates the robot arm, the perceptual information being at least one of information about a force applied from the robot arm to a target object for a task by the robot arm, information about a position of the target object for the task by the robot arm, and sound information of a circumference environment, and the dispersion information being information about dispersion levels in chronological order between at least one or more pieces of the time-series teaching information in chronological order or the perceptual information in chronological order;
- a step of creating motion information as information about the motion of the robot arm based on the plurality of pieces of time-series teaching information and the order, by a motion creating section; and
- a step of controlling the motion of the robot arm based on the motion information created by the motion creating section.

17. An integrated electronic circuit of a robot arm for controlling a motion of the robot arm, the integrated electronic circuit comprising:
- a first information obtaining section that obtains a plurality of pieces of time-series teaching information at a time when a person operates the robot arm and teaches a motion;
- a second information obtaining section that obtains (i) reaction time information and (ii) dispersion information at the time of teaching the robot arm;
- an order determining section that determines an order of the plurality of pieces of time-series teaching information obtained by the first information obtaining section based on the reaction time information and the dispersion information obtained by the second information obtaining section; and
- a motion creating section that creates motion information as information about the motion of the robot arm based on the plurality of pieces of time-series teaching information and the order, wherein
- the time-series teaching information includes at least one or more of a position, an orientation, and a speed of the robot arm,
- the reaction time information is time information from a time when the person receives perceptual information to a time when the person operates the robot arm,
- the perceptual information is at least one piece of information about a force applied from the robot arm to a target object for a task done by the robot arm, information about a position of the target object for the task done by the robot arm, and sound information of a circumference environment,
- the dispersion information is information about dispersion levels in chronological order between at least one or more pieces of the time-series teaching information in chronological order or the perceptual information in chronological order, and
- the motion of the robot arm is controlled based on the motion information created by the motion creating section.

* * * * *